US012456826B2

(12) United States Patent
Wang et al.

(10) Patent No.: US 12,456,826 B2
(45) Date of Patent: Oct. 28, 2025

(54) ELECTRONIC DEVICE

(71) Applicant: Huawei Technologies Co., Ltd., Shenzhen (CN)

(72) Inventors: Hanyang Wang, Reading (GB); Yuanpeng Li, Shenzhen (CN); Dawei Zhou, Shenzhen (CN); Chuanbo Shi, Shanghai (CN); Xiaowei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 18/249,444

(22) PCT Filed: Sep. 23, 2021

(86) PCT No.: PCT/CN2021/119918
§ 371 (c)(1),
(2) Date: Apr. 18, 2023

(87) PCT Pub. No.: WO2022/083398
PCT Pub. Date: Apr. 28, 2022

(65) Prior Publication Data
US 2023/0387609 A1 Nov. 30, 2023

(30) Foreign Application Priority Data
Oct. 19, 2020 (CN) ........................ 202011120282.0

(51) Int. Cl.
*H01Q 1/24* (2006.01)
*H01Q 1/38* (2006.01)
(Continued)

(52) U.S. Cl.
CPC ............. *H01Q 21/28* (2013.01); *H01Q 1/243* (2013.01); *H01Q 1/38* (2013.01); *H01Q 1/50* (2013.01); *H01Q 9/42* (2013.01)

(58) Field of Classification Search
CPC .......... H01Q 1/24; H01Q 1/243; H01Q 1/245; H01Q 1/48; H01Q 1/50; H01Q 9/04;
(Continued)

(56) References Cited

U.S. PATENT DOCUMENTS 7,768,466 B2 * 8/2010 Chi .......................... H01Q 7/00 343/741
10,276,916 B2 * 4/2019 Hasaba ................ H01Q 9/0421
10,886,621 B2 * 1/2021 Tanaka ..................... H01Q 1/36

FOREIGN PATENT DOCUMENTS

CN 1816941 A 8/2006
CN 102017300 A 4/2011
(Continued)

OTHER PUBLICATIONS

Chang Le et al: "Orthogonally Polarized Dual Antenna Pair With High Isolation and Balanced High Performance for 5G MIMO Smartphone", IEEE Transactions on Antennas and Propagation, vol. 68, No. 5, Jan. 9, 2020, pp. 3487-3495, XP011786952.
(Continued)

*Primary Examiner* — Thai Pham
(74) *Attorney, Agent, or Firm* — Slater Matsil, LLP

(57) ABSTRACT

Embodiments of this application provide an electronic device. The electronic device includes an antenna structure, the antenna structure includes a plurality of antenna units, and the plurality of antenna units are electrically connected to a ground. When a feed unit feeds the antenna units, the ground bears a part of a mode current.

19 Claims, 57 Drawing Sheets

(51) Int. Cl.

| | |
|---|---|
| ***H01Q 1/50*** | (2006.01) |
| ***H01Q 5/378*** | (2015.01) |
| ***H01Q 9/42*** | (2006.01) |
| ***H01Q 21/28*** | (2006.01) |

(58) Field of Classification Search

CPC ............ H01Q 9/42; H01Q 21/28; H01Q 5/30; H01Q 5/342; H01Q 5/378

See application file for complete search history.

(56) References Cited

FOREIGN PATENT DOCUMENTS

| | | | |
|---|---|---|---|
| CN | 104157966 | A | 11/2014 |
| CN | 108713277 | A | 10/2018 |
| CN | 210518976 | U | 5/2020 |
| CN | 111244616 | A | 6/2020 |
| CN | 111628274 | A | 9/2020 |
| JP | H0932663 | A | 2/1997 |
| JP | H11312923 | A | 11/1999 |
| JP | 2018207209 | A | 12/2018 |
| JP | 2020527310 | A | 9/2020 |
| WO | 0118909 | A1 | 3/2001 |
| WO | 2020133111 | A1 | 7/2020 |

OTHER PUBLICATIONS

Shen Wang, Hiroyuki Arai, "Characteristic Modes Analysis on Neutralizing Effect of Shorted Line for Two Adjacent PIFA Elements", The 2014 International Workshop on Antenna Technology, Nov. 1, 2014, total 2 pages.

Zijian Shao, IEEE Transactions on Antennas and Propagation, vol. 67, "Differential Shorted Patch Antennas",Jul. 7, 2019, total 7 pages.

* cited by examiner 3.52 GHz 3.78 GHz 4.5 GHz

ELECTRONIC DEVICE

CROSS-REFERENCE TO RELATED APPLICATIONS

This application is a National Stage of International Patent Application No. PCT/CN2021/119918, filed on Sep. 23, 2021, which claims priority to Chinese Patent Application No. 202011120282.0, filed on Oct. 19, 2020. Both of the aforementioned applications are hereby incorporated by reference in their entireties.

TECHNICAL FIELD

This application relates to the field of wireless communication, and in particular, to an electronic device.

BACKGROUND

Wireless communication technologies are evolving rapidly. In the past, a second generation (second generation, 2G) mobile communication system mainly supports a call function. An electronic device is only a tool used by people to send and receive SMS messages and perform voice communication. A wireless network access function is very slow because data transmission is performed by using a voice channel. Nowadays, in addition to making a call, sending an SMS message, and taking a photo, an electronic device may be used to listen to music online, watch an online movie, perform real-time video calling, and the like, which cover various applications such as calls, movie and television entertainment, and E-commerce in people's life. A plurality of functional applications need to upload and download data over a wireless network. Therefore, high-speed transmission of the data becomes very important.

A multiple-input multiple-output (multi-input multi-output, MIMO) technology plays a very important role in a 5th generation (5th generation, 5G) wireless communication system, and can provide a higher rate for data transmission. However, it is still a great challenge for the electronic device, such as a mobile phone, to achieve good MIMO performance. One reason is that very limited space inside the electronic device limits a frequency band that a MIMO antenna can cover and high performance. How to obtain an antenna with higher performance and a wide band coverage feature becomes an important research topic in the industry.

SUMMARY

Embodiments of this application provide an electronic device. The electronic device includes an antenna structure and a ground. A plurality of antenna units included in the antenna structure may be electrically connected to the ground. Energy is transferred, by using the ground, between the plurality of antenna units disposed on the ground, strong coupling is implemented, the antenna structure works in an HWM and an OWM, and a plurality of operating frequency bands are generated, to meet a communication requirement. In addition, because energy is transferred between the plurality of antenna units by using the ground, currents of the antenna units are evenly distributed, and a SAR of the antenna units is low.

According to a first aspect, an electronic device is provided, including: a ground; a first antenna unit, where the first antenna unit includes a first end; and a second antenna unit, where the second antenna unit includes a first end and a second end, and the second antenna unit and the first antenna unit do not touch each other. A first ground point is disposed at the first end of the first antenna unit, and the first antenna unit is electrically connected to the ground at the first ground point. A second ground point is disposed at the first end of the second antenna unit, and the second antenna unit is electrically connected to the ground at the second ground point. A distance between the second ground point and the first ground point is greater than a distance between the second end of the second antenna unit and the first ground point. An electrical length of the first antenna unit is the same as an electrical length of the second antenna unit.

According to the technical solutions in this embodiment of this application, because the ground bears a part of a mode current between the antenna units, strong coupling is implemented between the antenna units by using the ground. Therefore, radiation energy is not concentrated on an excitation unit to cause a high SAR. In addition, the first antenna unit, the second antenna unit, and a part of the ground jointly form a dipole antenna, and the overall dipole antenna can work in an HWM and an OWM, and a plurality of operating frequency bands are generated, to meet a communication requirement.

With reference to the first aspect, in some implementations of the first aspect, projections that are of a part of the first antenna unit and a part of the second antenna unit and that are on a plane on which the ground is located are disposed along a same straight line.

According to the technical solutions in this embodiment of this application, that the two antenna units may be disposed along the same straight line may be understood as that the two antenna units are collinear in a length direction, or a maximum distance between the two antenna units in a length direction is less than a quarter of an operating wavelength.

With reference to the first aspect, in some implementations of the first aspect, both the first antenna unit and the second antenna unit are disposed on one side of the ground, and are completely projected on the ground in a first direction. The first direction is a direction perpendicular to the plane on which the ground is located.

With reference to the first aspect, in some implementations of the first aspect, projections that are of a part of the first antenna unit and a part of the second antenna unit and that are on a plane on which the ground is located are parallel with each other in a second direction and at least partially overlap in a direction perpendicular to the second direction. The second direction is a length direction of the first antenna unit.

According to the technical solutions in this embodiment of this application, when the two antenna units are in a parallel layout, and the projections that are of the first antenna unit and the second antenna unit and that are on the plane on which the ground is located are parallel with each other and are not collinear in the length direction, the two antenna units may have a specific misplacement.

With reference to the first aspect, in some implementations of the first aspect, the projections that are of the part of the first antenna unit and the part of the second antenna unit and that are on the plane on which the ground is located completely overlap in a direction perpendicular to the second direction.

With reference to the first aspect, in some implementations of the first aspect, projections that are of a part of the first antenna unit and a part of the second antenna unit and that are on a plane on which the ground is located are perpendicular to each other, and an extension line of the part of the second antenna unit intersects with the part of the first antenna unit on the first antenna unit.

According to the technical solutions in this embodiment of this application, an included angle between the extension line of the part of the second antenna unit and the first antenna unit is about 80 degrees to 100 degrees, that is, one of the antenna units may rotate to some extent along one end of a radiator of the antenna unit.

With reference to the first aspect, in some implementations of the first aspect, the extension line of the part of the second antenna unit intersects with the part of the first antenna unit at a midpoint of the first antenna unit.

With reference to the first aspect, in some implementations of the first aspect, the first antenna unit is a metal frame antenna of the electronic device, and the first antenna unit is a section of the metal frame antenna.

With reference to the first aspect, in some implementations of the first aspect, the first antenna unit and the second antenna unit each are one or more of a laser-direct-structuring LDS antenna, a flexible printed circuit FPC antenna, a floating metal FLM antenna, and a printed circuit board PCB antenna.

According to the technical solutions in this embodiment of this application, the first antenna unit is a metal frame antenna, the second antenna unit is one of an LDS antenna, an FPC antenna, an FLM antenna, or a PCB antenna, and space occupied by an antenna structure in the electronic device is reduced in a parallel layout manner.

With reference to the first aspect, in some implementations of the first aspect, the electronic device further includes: A feed point is disposed on the first antenna unit or the second antenna unit, and the feed point is used to feed an electrical signal.

With reference to the first aspect, in some implementations of the first aspect, a distance between the feed point and the first ground point or the second ground point is less than a quarter of a first wavelength, and the first wavelength is an operating wavelength of the electronic device.

With reference to the first aspect, in some implementations of the first aspect, the first antenna unit further includes a second end, and the feed point is disposed at the second end of the first antenna unit or the second end of the second antenna unit.

According to the technical solutions in this embodiment of this application, a feed unit in the electronic device may feed the first antenna unit or the second antenna unit, so that the antenna structure including the first antenna unit and the second antenna unit can work in the HWM and the OWM, and a plurality of operating frequency bands are generated, to meet a communication requirement. To implement better impedance matching, a capacitor may be connected in series between the feed unit and the first antenna unit, or the feed unit feeds the antenna structure at the feed point in a capacitive indirect coupling feeding manner.

With reference to the first aspect, in some implementations of the first aspect, when the feed point feeds an electrical signal, the first antenna unit and the second antenna unit generate resonance. The resonance is determined by the electrical length of the first antenna unit, the electrical length of the second antenna unit, and an electrical length between electrical connection points between the ground and the first antenna unit and the second antenna unit.

According to the technical solutions in this embodiment of this application, the first antenna unit, the second antenna unit, and a part of the ground jointly form a dipole antenna, and the overall dipole antenna can work in the HWM and the OWM. A path for a mode current of the dipole antenna includes the first antenna unit, the second antenna unit, and the part of the ground. Therefore, an operating frequency band of the antenna structure including the first antenna unit and the second antenna unit may be adjusted by adjusting lengths of radiators of the first antenna unit and the second antenna unit, or by adjusting the distance between the first ground point and the second ground point. A manner of adjusting the operating frequency band of the antenna structure may be selected based on actual space in the electronic device.

With reference to the first aspect, in some implementations of the first aspect, a dipole antenna is formed between the first antenna unit, the second antenna unit, and a part of the ground.

According to the technical solutions in this embodiment of this application, the ground bears a part of the mode current. Therefore, different from a conventional excitation unit and a parasitic unit, the first antenna unit and the second antenna unit are strongly coupled by using the ground. In addition, due to this structure, currents of the first antenna unit and the second antenna unit are evenly distributed, and radiation energy is not concentrated on an excitation unit to cause a high SAR.

With reference to the first aspect, in some implementations of the first aspect, the electronic device further includes a floating metal piece. The floating metal piece is disposed between the first antenna unit and the second antenna unit. The floating metal piece partially overlaps the first antenna unit and the second antenna unit in the first direction, and the first direction is a direction perpendicular to the ground.

According to the technical solutions in this embodiment of this application, after the floating metal is added between the first antenna unit and the second antenna unit, a coupling amount between the first antenna unit and the second antenna unit may be increased. This may be used to control a frequency of resonance generated by the first antenna unit and the second antenna unit, that is, the frequency of the resonance generated by the first antenna unit and the second antenna unit is shifted towards a low frequency.

With reference to the first aspect, in some implementations of the first aspect, an opening is disposed on a side that is of the first antenna unit and that is close to the second antenna unit.

According to the technical solutions in this embodiment of this application, after the opening is disposed on the first antenna unit or the second antenna unit, the coupling amount between the first antenna unit and the second antenna unit may be reduced. This may be used to control the frequency of the resonance generated by the first antenna unit and the second antenna unit, that is, the frequency of the resonance generated by the first antenna unit and the second antenna unit is shifted towards a high frequency.

With reference to the first aspect, in some implementations of the first aspect, the electronic device further includes a first connecting piece and a second connecting piece. One end of the first connecting piece is electrically connected to the first antenna unit at the first ground point, and the other end of the first connecting piece is electrically connected to the ground. One end of the second connecting piece is electrically connected to the second antenna unit at the second ground point, and the other end of the second connecting piece is electrically connected to the ground.

According to the technical solutions in this embodiment of this application, the first antenna unit and the second antenna unit may be electrically connected to the ground by using the first connecting piece and the second connecting piece.

With reference to the first aspect, in some implementations of the first aspect, the first antenna unit is an inverted L antenna ILA, an inverted F antenna IFA, or a planar inverted F antenna PIFA. The second antenna unit is an ILA, an IFA, or a PIFA.

According to the technical solutions in this embodiment of this application, types of the first antenna unit and the second antenna unit may be selected based on an actual design or production requirement.

According to a second aspect, an electronic device is provided, including: a ground; a first antenna unit, where the first antenna unit includes a first end; and a second antenna unit, where the second antenna unit includes a first end and a second end, and the second antenna unit and the first antenna unit do not touch each other. A first ground point is disposed at the first end of the first antenna unit, and the first antenna unit is electrically connected to the ground at the first ground point. A second ground point is disposed at the first end of the second antenna unit, and the second antenna unit is electrically connected to the ground at the second ground point. A distance between the second ground point and the first ground point is greater than a distance between the second end of the second antenna unit and the first ground point. An electrical length of the first antenna unit is the same as an electrical length of the second antenna unit. Projections that are of a part of the first antenna unit and a part of the second antenna unit and that are on a plane on which the ground is located are parallel with each other in a second direction and at least partially overlap in a direction perpendicular to the second direction, and the second direction is a length direction of the first antenna unit. The first antenna unit is a metal frame antenna of the electronic device, and the first antenna unit is a section of the metal frame antenna. The second antenna unit is one of a laser-direct-structuring LDS antenna, a flexible printed circuit FPC antenna, a floating metal FLM antenna, and a printed circuit board PCB antenna.

DETAILED DESCRIPTION OF ILLUSTRATIVE EMBODIMENTS

The following describes technical solutions of this application with reference to accompanying drawings.

It should be understood that, in this application, "electrical connection" may be understood as a form in which components are physically in contact and are electrically conducted, or may be understood as a form in which different components in a line structure are connected through a physical line that can transmit an electrical signal, such as a printed circuit board (printed circuit board, PCB) copper foil or a conducting wire. "Communication connection" may refer to electrical signal transmission, including a wireless communication connection and a wired communication connection. The wireless communication connection requires no physical medium, and does not belong to a connection relationship that limits a product structure. Both "connection" and "being connected to" may refer to a mechanical connection relationship or a physical connection relationship, that is, a connection between A and B or that A is connected to B may mean that there is a fastening component (such as a screw, a bolt, or a rivet) between A and B, or A and B are in contact with each other and A and B are difficult to be separated.

The technical solutions provided in this application are applicable to an electronic device that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, a SUB-6G communication technology, and other future communication technologies. An electronic device in embodiments of this application may be a mobile phone, a tablet computer, a notebook computer, a smart band, a smartwatch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device, another processing device connected to a wireless modem, a vehicle-mounted device, a terminal device in a 5G network, a terminal device in a future evolved public land mobile network (public land mobile network, PLMN), or the like. This is not limited in embodiments of this application.

Figure 1:
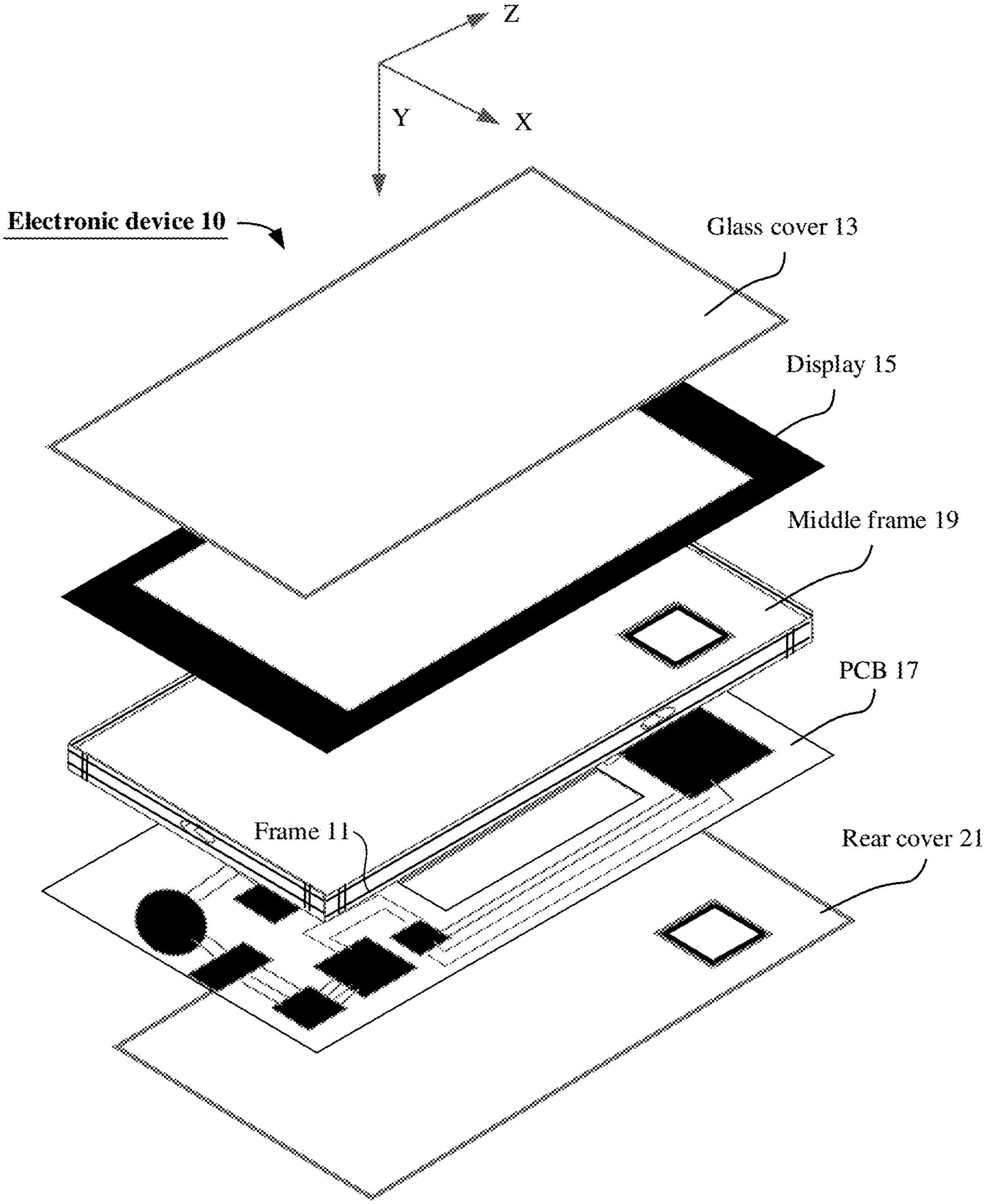
FIG. 1 is a schematic diagram of an electronic device according to an embodiment of this application.

FIG. 1 shows an example of an internal environment of an electronic device according to this application. An example in which the electronic device is a mobile phone is used for description.

As shown in FIG. 1, an electronic device 10 may include a glass cover (cover glass) 13, a display (display) 15, a printed circuit board (printed circuit board, PCB) 17, a middle frame (housing) 19, and a rear cover (rear cover) 21.

The glass cover 13 may be disposed closely against the display 15, and may be mainly used to protect the display 15 and prevent the display 15 against dust.

Optionally, the display 15 may be a liquid crystal display (liquid crystal display, LCD), a light-emitting diode (light-emitting diode, LED), an organic light-emitting diode (organic light-emitting diode, OLED), or the like. This is not limited in this application.

The printed circuit board PCB 17 may use a flame-retardant (FR-4) dielectric plate, or may use a Rogers (Rogers) dielectric plate, or may use a hybrid dielectric plate of Rogers and FR-4, or the like. Herein, FR-4 is a grade designation for a flame-retardant material, and the Rogers dielectric plate is a high frequency plate. A metal layer may be disposed on a side that is of the printed circuit board PCB 17 and that is close to the middle frame 19, and the metal layer may be formed by etching metal on a surface of the PCB 17. The metal layer may be used to ground an electronic element carried on the printed circuit board PCB 17, to prevent a user from an electric shock or the device from damage. The metal layer may be referred to as a PCB ground. Not limited to the PCB ground, the electronic device 10 may further have another ground used for grounding, for example, a metal middle frame or a metal plane in another electronic device. In addition, a plurality of electronic components are disposed on the PCB 17. The plurality of electronic components include a processor (for example, one or more of a power management module, a memory, a sensor, and a SIM card interface), and metal is also disposed inside or on a surface of the electronic components.

The electronic device 10 may further include a battery, which is not shown herein. The battery may be disposed in the middle frame 19. The battery may divide the PCB 17 into a mainboard and a subboard. The mainboard may be disposed between a frame 11 of the middle frame 19 and an upper edge of the battery, and the subboard may be disposed between the middle frame 19 and a lower edge of the battery. A metal layer is also disposed inside or on a surface of the battery.

The middle frame 19 is mainly used to support the entire device. The middle frame 19 may include the frame 11, and the frame 11 may be made of a conductive material such as metal. The frame 11 may extend around peripheries of the electronic device 10 and the display 15. The frame 11 may specifically surround four sides of the display 15 to help fasten the display 15. In an implementation, the frame 11 made of the metal material may be directly used as a metal frame of the electronic device 10 to form a metal frame appearance. This is applicable to a metal industrial design (industrial design, ID). In another implementation, an outer surface of the frame 11 may be a non-metal material such as a plastic frame to form a non-metal frame appearance. This is applicable to a non-metal ID.

The rear cover 21 may be a rear cover made of a metal material, or may be a rear cover made of a non-conductive material, for example, a non-metal rear cover such as a glass rear cover or a plastic rear cover.

FIG. 1 shows only an example of some components included in the electronic device 10. Actual shapes, actual sizes, and actual construction of these components are not limited in FIG. 1. In addition, the electronic device 10 may further include components such as a camera and a sensor.

Figure 2:
FIG. 2 is a common antenna solution in the conventional technology.

FIG. 2 is a common antenna solution in the conventional technology.

As shown in FIG. 2, an antenna unit 31 is used as an excitation unit, an antenna unit 32 is used as a parasitic unit, and both the antenna unit 31 and the antenna unit 32 work in a quarter wavelength mode. This manner generates double resonance, to obtain two operating frequency bands. The two operating frequency bands are respectively controlled by the antenna unit 31 and the antenna unit 32, that is, different operating frequency bands may be obtained by adjusting electrical lengths of the antenna unit 31 and the antenna unit 32.

It should be understood that, in the antenna structure shown in FIG. 2, radiators of the antenna units are coupled in a mid-air manner. As a distance between the antenna units grows, coupling becomes weaker. Although double resonance can be generated, the two antenna units are separately in control, and radiation energy is concentrated on the excitation unit. As a result, an electromagnetic wave specific absorption rate (specific absorption rate, SAR) is high.

Embodiments of this application provide an antenna structure. The antenna structure may include a plurality of grounded antenna units, for example, an inverted L antenna (inverted L antenna, ILA), an inverted F antenna (inverted F antenna, IFA), or a planar inverted F antenna (planar Inverted F antenna, PIFA). The antenna structure may be based on two modes: a half wavelength mode (half wavelength mode, HWM) and a one wavelength mode (one wavelength mode, OWM), and two resonances corresponding to the HWM and the OWM are generated at the same time, to widen antenna bandwidth. Currents in the corresponding two modes of the antenna structure are distributed on both the antenna unit and a ground in a large manner, and are not concentrated on an excitation unit. Therefore, a SAR is low.

Figure 3:
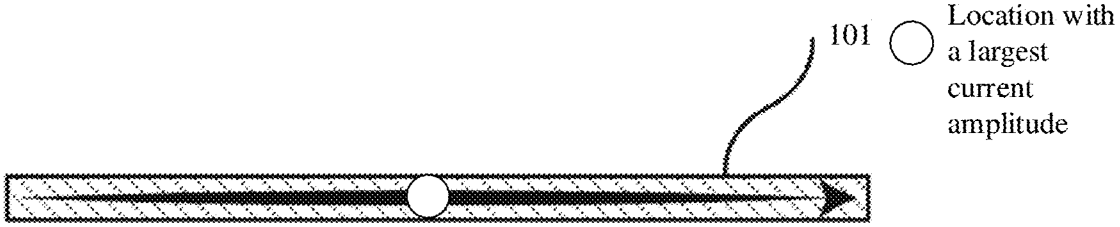
FIG. 3 is a schematic diagram of current distribution corresponding to an HWM of a dipole antenna according to this application.
Figure 4:
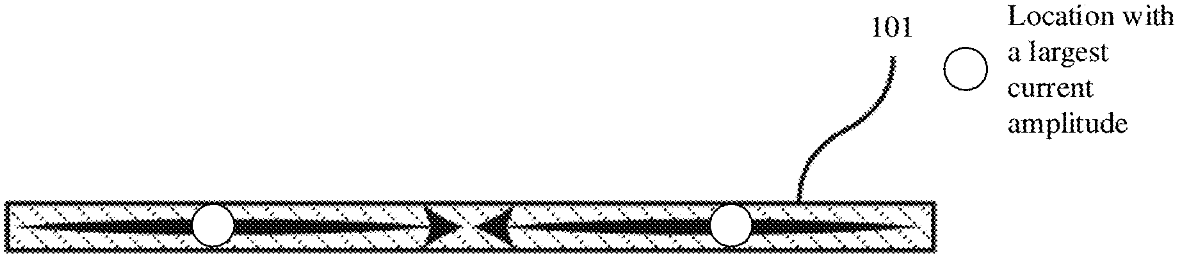
FIG. 4 is a schematic diagram of current distribution corresponding to an OWM of a dipole antenna according to this application.

First, a dipole antenna is used as an example, and FIG. 3 and FIG. 4 describe the two antenna modes in this application. FIG. 3 is a schematic diagram of current distribution corresponding to the HWM of the dipole antenna according to this application. FIG. 4 is a schematic diagram of current distribution corresponding to the OWM of the dipole antenna according to this application.

1. Half Wavelength Mode

As shown in FIG. 3, a dipole antenna 101 is in the HWM. Features of this mode are as follows: Directions of currents on an antenna radiator are the same, a current amplitude in the middle is the largest, and current amplitudes at two ends are the smallest.

2. One Wavelength Mode

As shown in FIG. 4, the dipole antenna 101 is in the OWM. Features of this mode are as follows: Directions of currents on the antenna radiator are reverse, current amplitudes at the two ends and a central point of the radiator are the smallest, and current amplitudes at midpoints between the end of the radiator and the central point are the largest.

Figure 5:
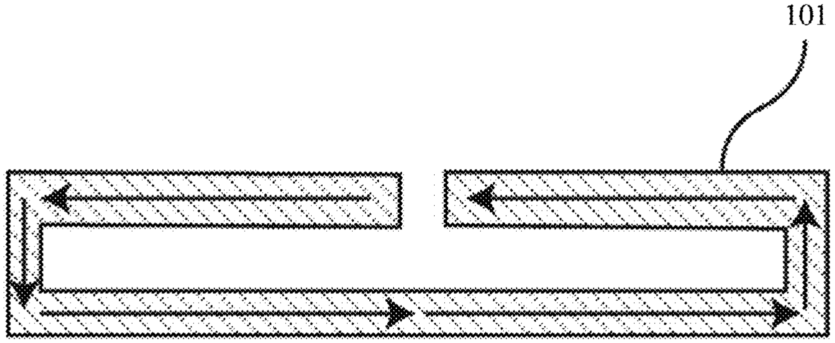
FIG. 5 is a schematic diagram of current distribution after the dipole antenna shown in FIG. 3 is bent.
Figure 6:
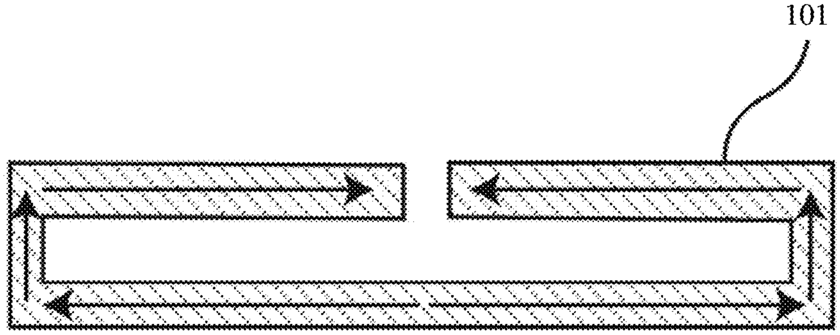
FIG. 6 is a schematic diagram of current distribution after the dipole antenna shown in FIG. 4 is bent.

FIG. 5 and FIG. 6 are schematic diagrams of current distribution after the dipole antenna is bent according to embodiments of this application.

The two ends of the dipole antennas shown in FIG. 3 and FIG. 4 are bent inwards to form shapes shown in FIG. 5 and FIG. 6. The HWM and the OWM still exist. In this case, currents generated by the dipole antenna 101 in the HWM are shown in FIG. 5, and the currents are co-directionally distributed around a middle gap. Currents generated by the dipole antenna 101 in the OWM are shown in FIG. 6, and the currents are reversely distributed around the middle gap. Current amplitude features are the same as the features shown in FIG. 3 and FIG. 4.

Figure 7:
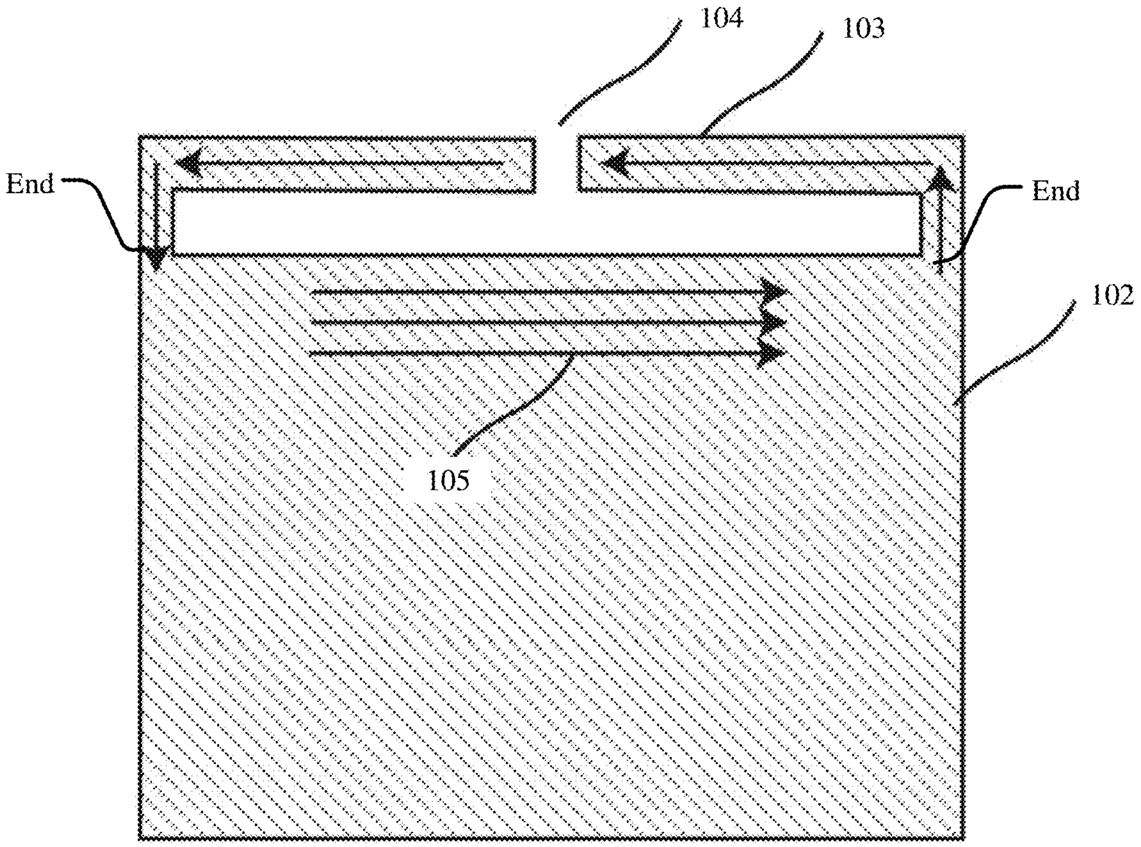
FIG. 7 is a schematic diagram of current distribution after the dipole antenna shown in FIG. 3 is bent and a ground is added.
Figure 8:
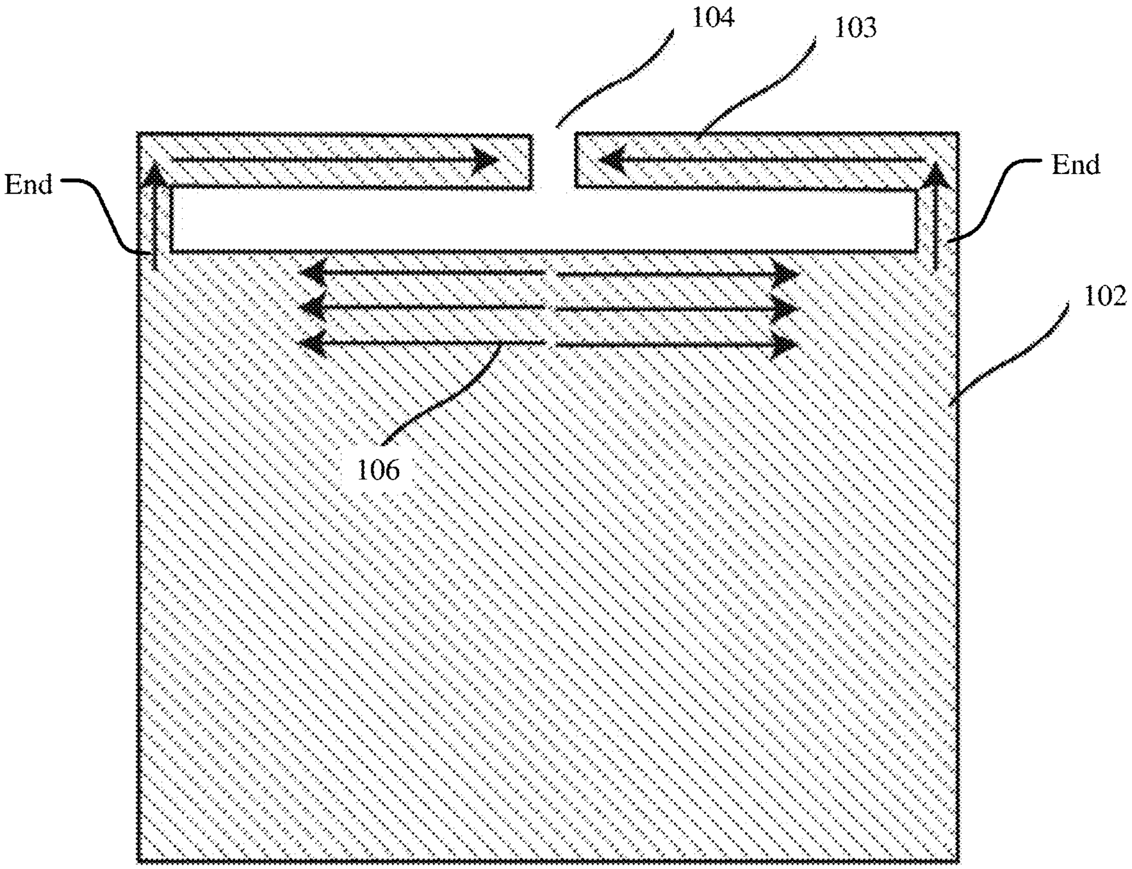
FIG. 8 is a schematic diagram of current distribution after the dipole antenna shown in FIG. 4 is bent and a ground is added.

FIG. 7 and FIG. 8 are schematic diagrams of current distribution of after the dipole antenna is bent and a ground is added according to embodiments of this application.

Based on the bent dipole antennas shown in FIG. 5 and FIG. 6, a ground 102 electrically connected to the dipole antenna is added. As shown in FIG. 7 and FIG. 8, the ground 102 may be a PCB, a middle frame, or another metal layer of an electronic device. As shown in FIG. 7 and FIG. 8, the ground is added to a structure of the dipole antenna. In this case, the dipole antenna includes an antenna unit 103 and a part of the ground 102, and the HWM and the OWM still exist. In this case, currents generated by the dipole antenna in the HWM are shown in FIG. 7, and the currents are co-directionally distributed around a middle gap 104. Currents generated by the dipole antenna in the OWM are shown in FIG. 8, and the currents are reversely distributed around the middle gap. Current amplitude features are the same as the features in the foregoing figures. In this case, the ground 102 bears a part of a mode current of the dipole antenna, that is, the ground 102 bears a mode current between two antenna units at ends (connection points with the ground 102) of the two bent antenna units.

Figure 9:
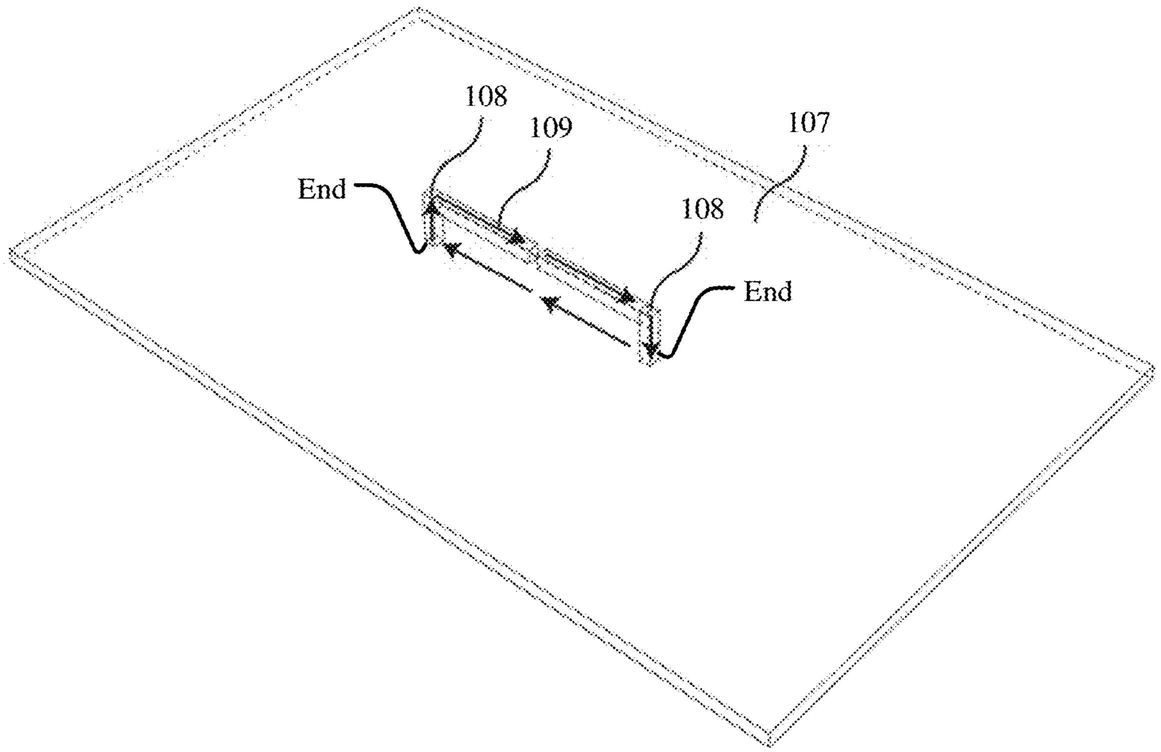
FIG. 9 is a schematic diagram of current distribution after the dipole antenna shown in FIG. 3 is bent and a ground perpendicular to an antenna unit is added.
Figure 10:
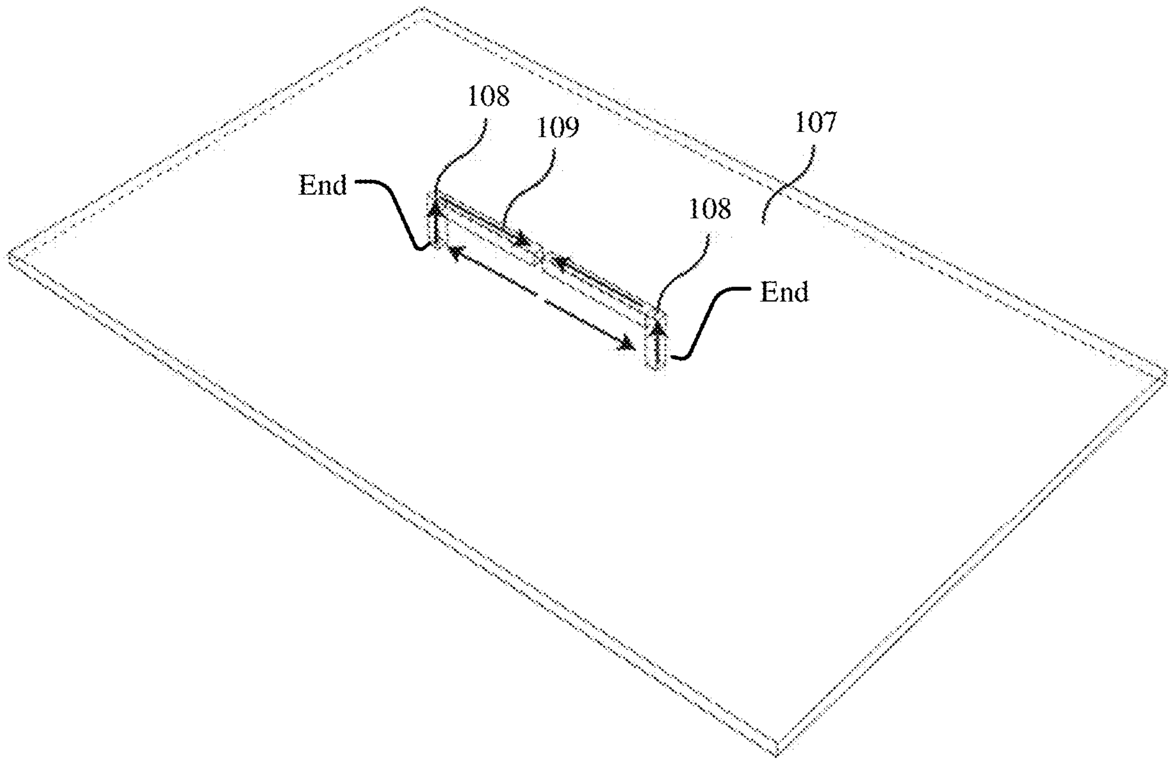
FIG. 10 is a schematic diagram of current distribution after the dipole antenna shown in FIG. 4 is bent and a ground perpendicular to an antenna unit is added.

FIG. 9 and FIG. 10 are schematic diagrams of current distribution after the dipole antenna is bent and a ground perpendicular to an antenna unit is added according to embodiments of this application.

Based on the bent dipole antennas shown in FIG. 5 and FIG. 6, a ground 107 is added to connect to the antenna. After the connection, an antenna unit 108 is perpendicular to the ground 107, that is, in this case, it is equivalent to that two antenna units are disposed on the ground, as shown in FIG. 9 and FIG. 10. The ground 107 may be a PCB, a middle frame, or another metal layer of an electronic device. In this case, the dipole antenna includes an antenna unit 108 and a part of the ground 107, and the HWM and the OWM still exist. In this case, currents generated by the dipole antenna in the HWM are shown in FIG. 9, and the currents are co-directionally distributed around a middle gap. Currents generated by the dipole antenna in the OWM are shown in FIG. 10, and the currents are reversely distributed around the middle gap. Current amplitude features are the same as the features in the foregoing figures. In this case, the ground 107 bears a part of a mode current of the antenna, and the ground 107 bears a mode current between two antenna units at ends (connection points with the ground 107) of the two bent antenna units.

It should be understood that, in the antenna structure provided in embodiments of this application, the ground bears a part of the mode current. Therefore, energy is transferred, by using the ground, between the plurality of antenna units disposed on the ground, strong coupling is implemented, working is performed in the HWM and the OWM, and a plurality of operating frequency bands are generated, to meet a communication requirement. In addition, because energy is transferred between the plurality of antenna units by using the ground, currents of the antenna units are evenly distributed, an antenna structure with a plurality of antenna units in this way may be referred to as a "distributed antenna", and a SAR of the distributed antenna is low.

Figure 11A:
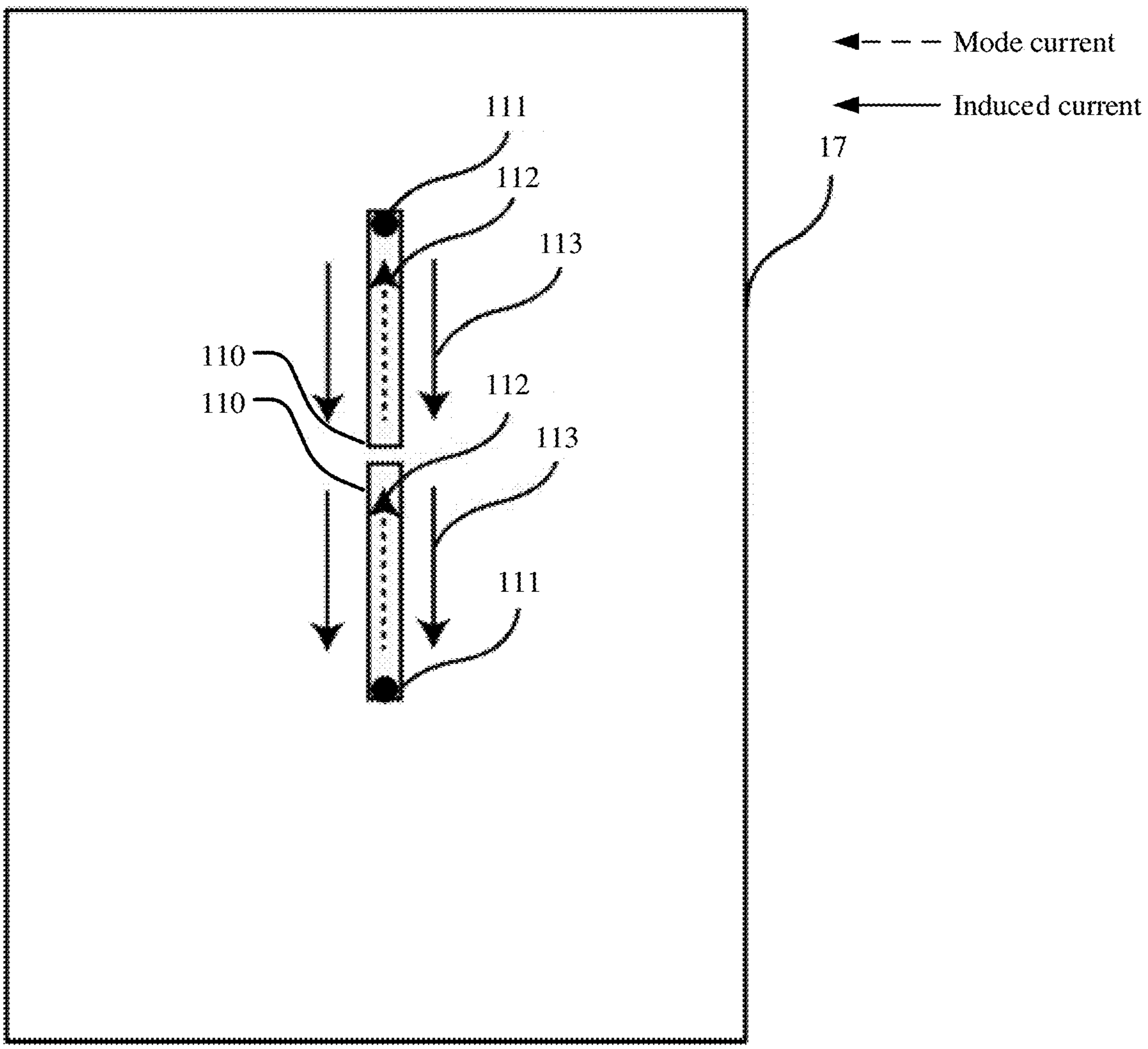
FIG. 11A to FIG. 11C are a schematic diagram of a structure of two antenna units in series layout according to this application.
Figure 11B:
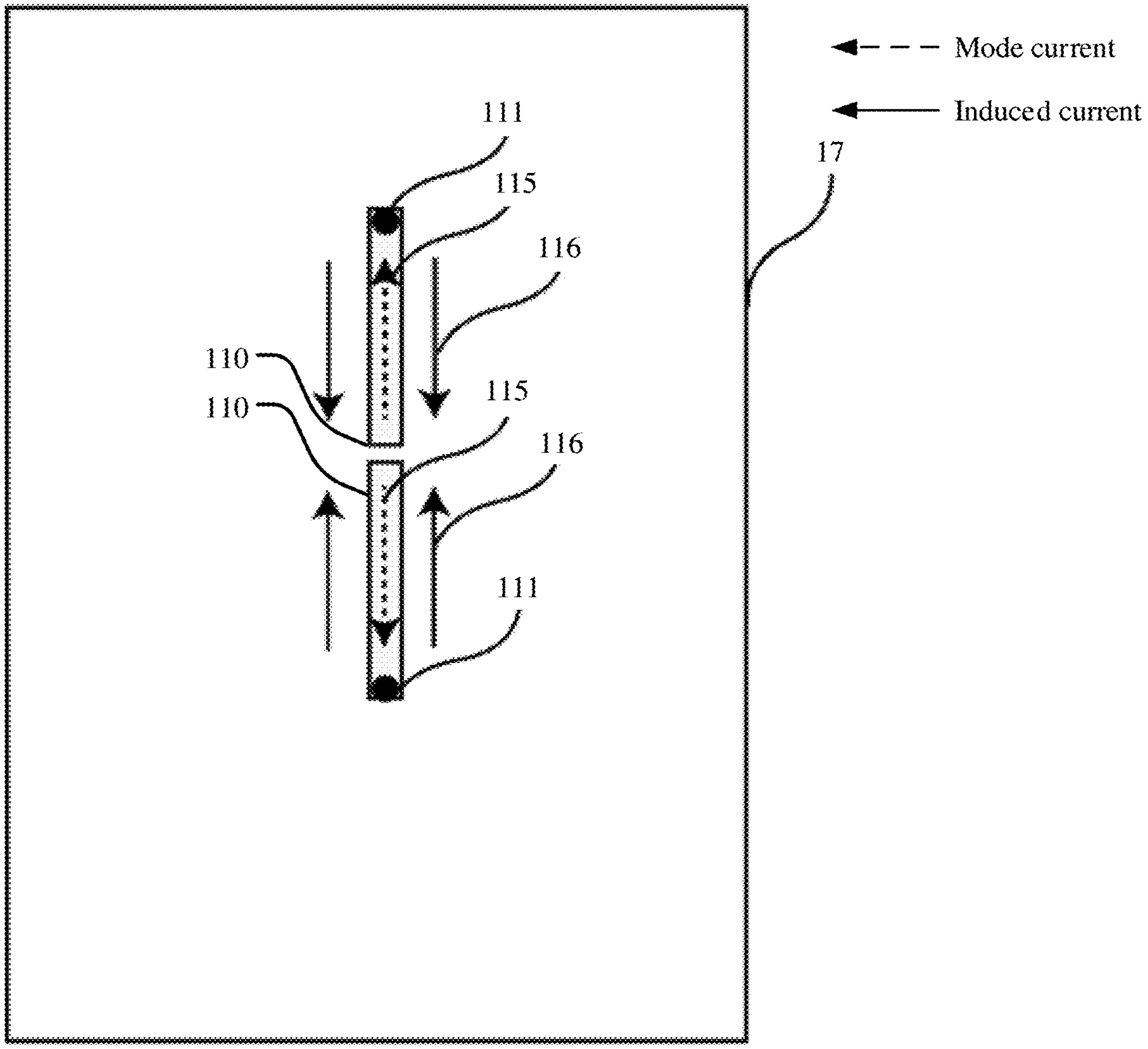
Figure 11C:
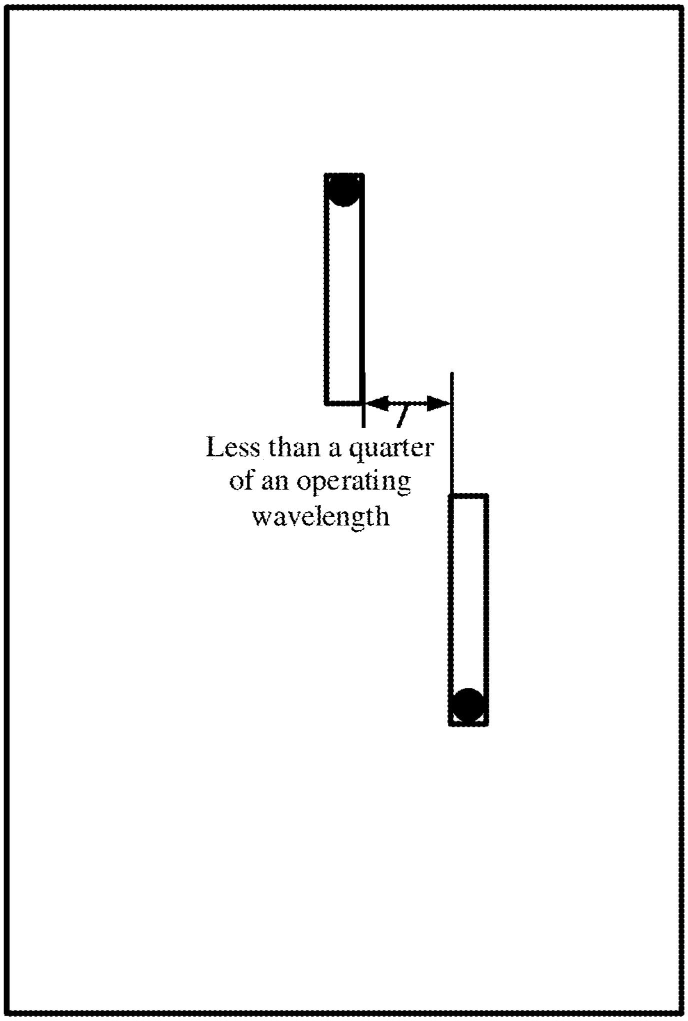
Figure 12A:
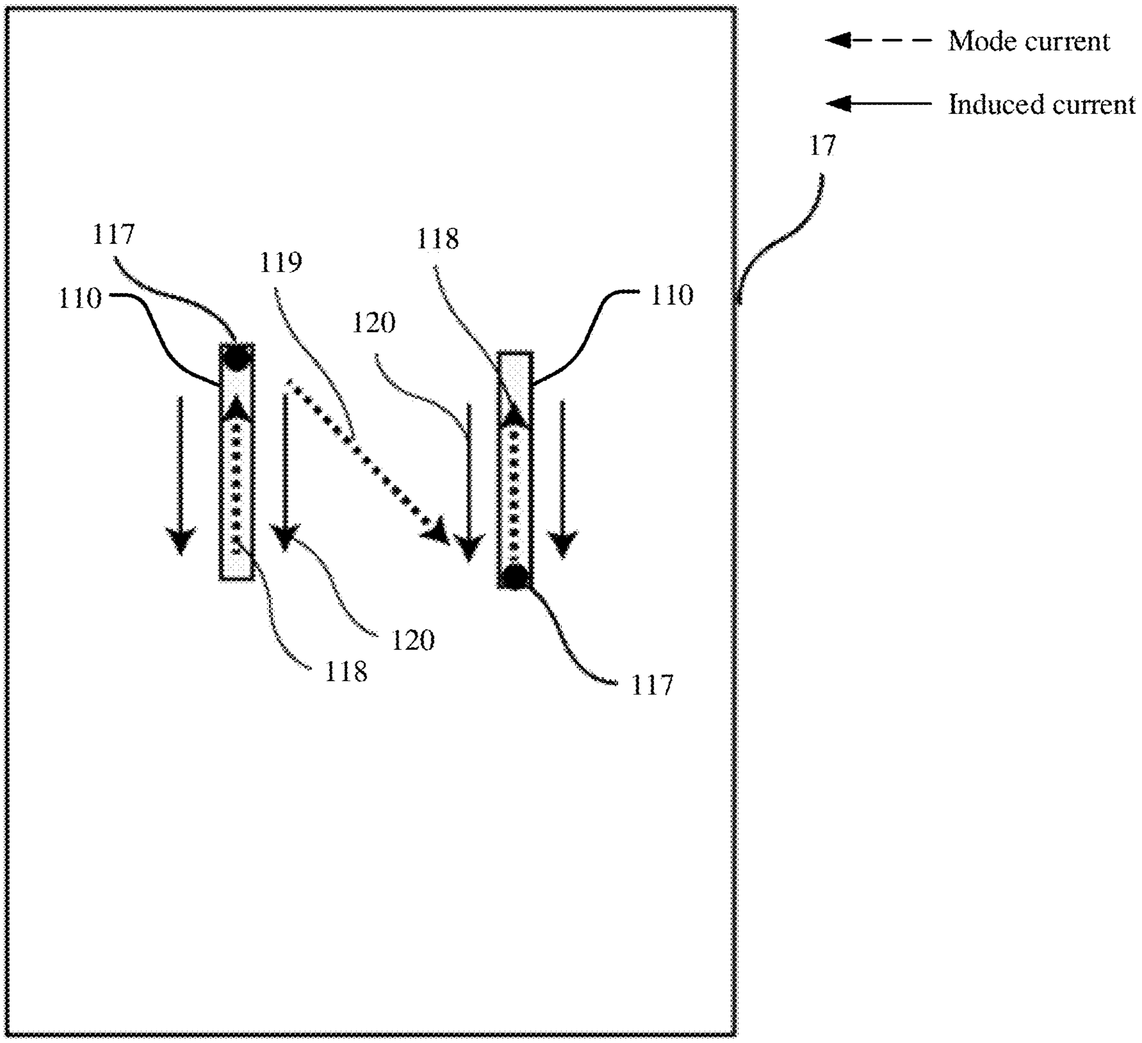
FIG. 12A to FIG. 12C are a schematic diagram of a structure of two antenna units in parallel layout according to this application.
Figure 12B:
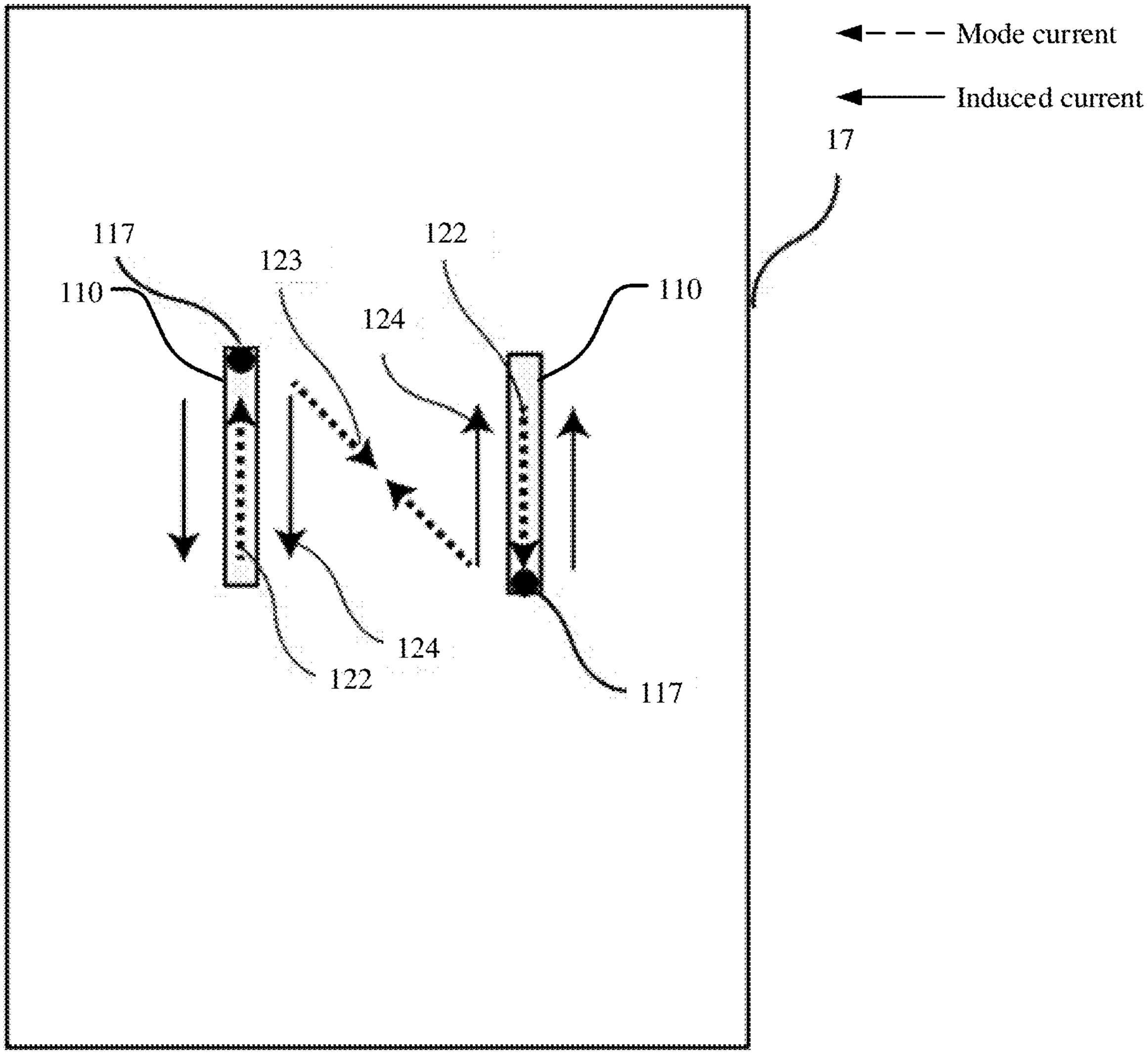
Figure 12C:
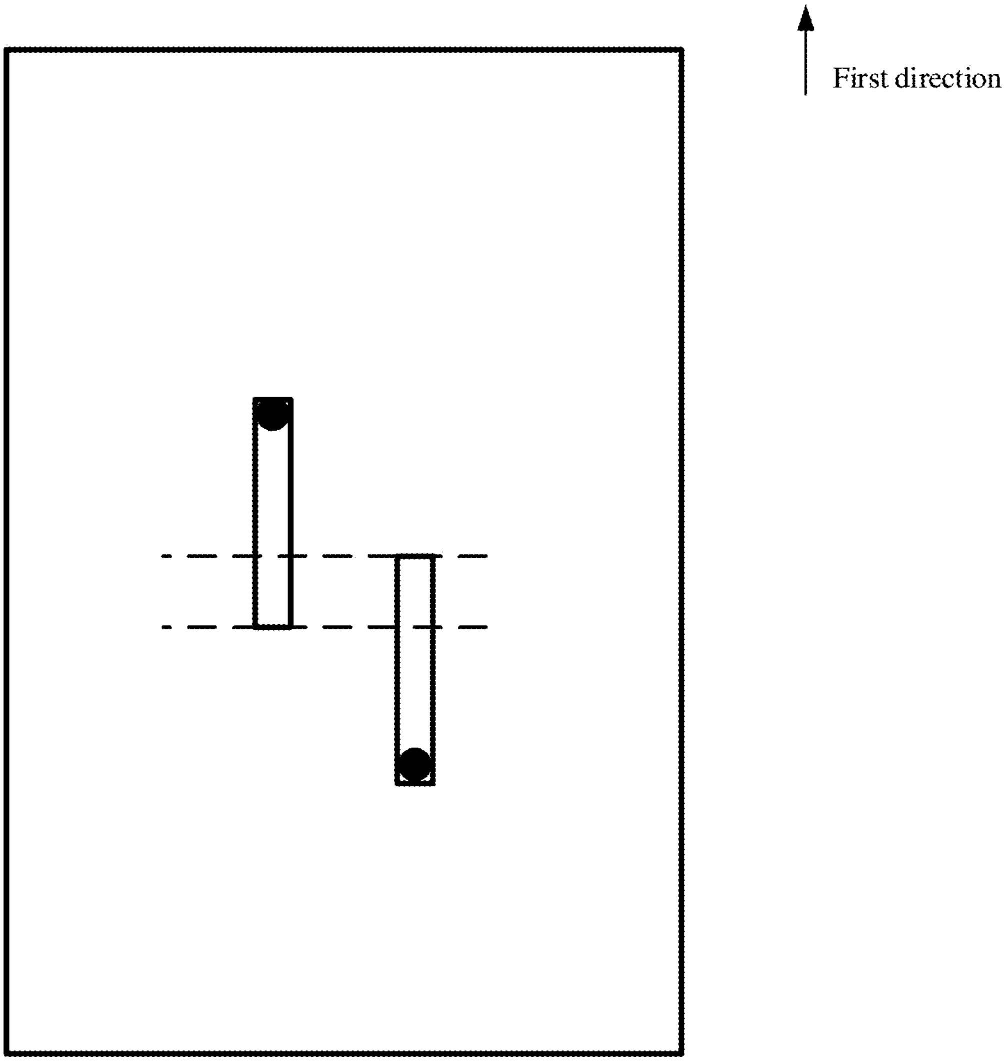
Figure 13A:
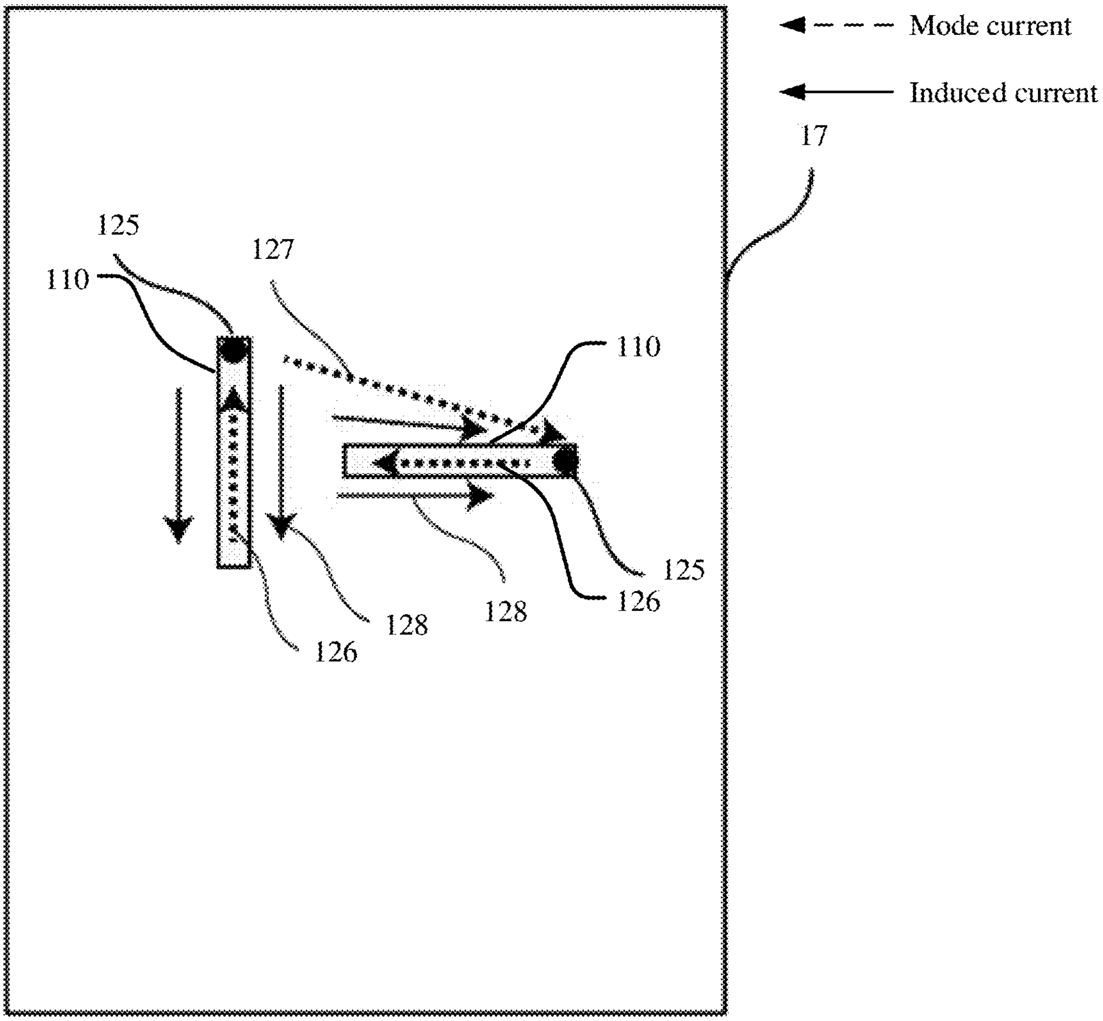
FIG. 13A to FIG. 13C are a schematic diagram of a structure of two antenna units in orthogonal layout according to this application.
Figure 13B:
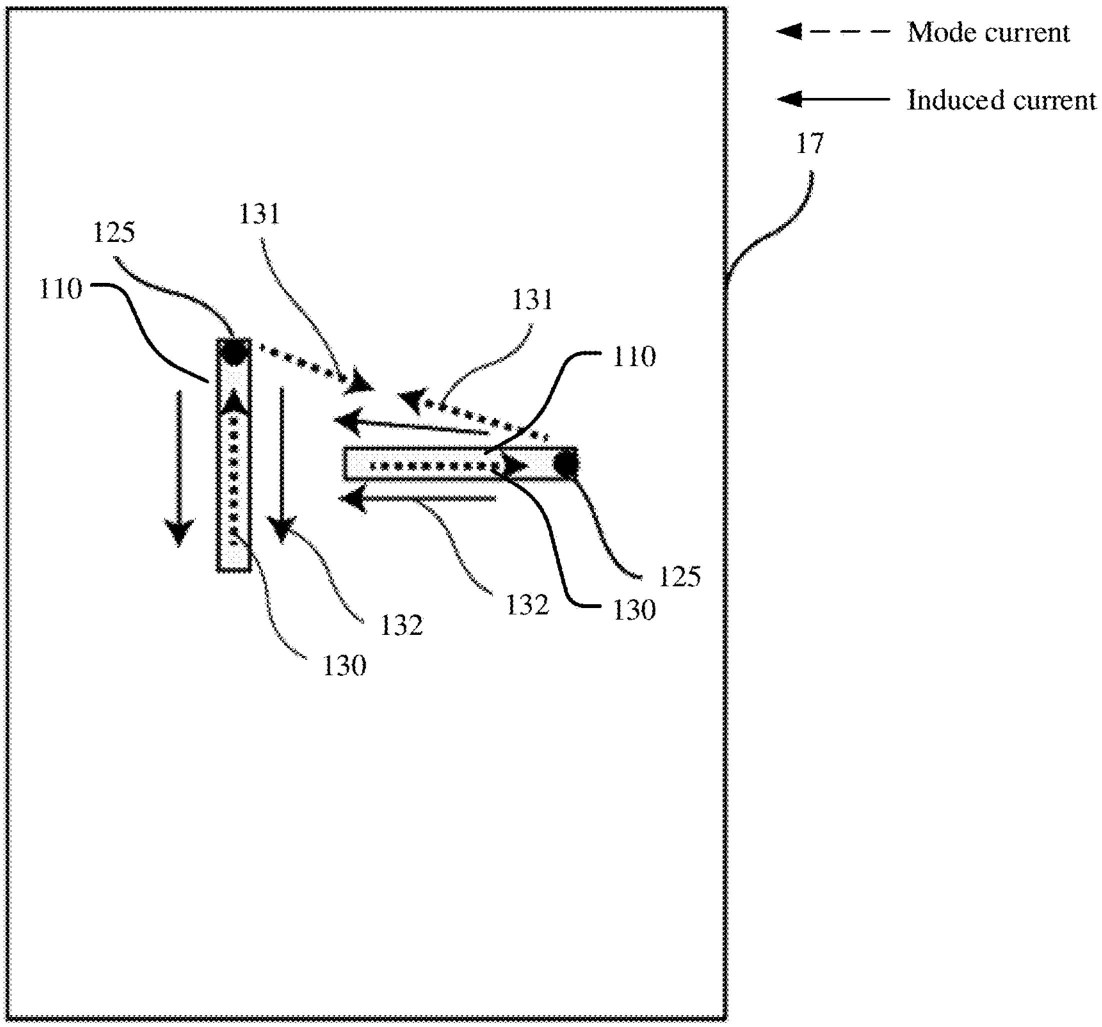
Figure 13C:
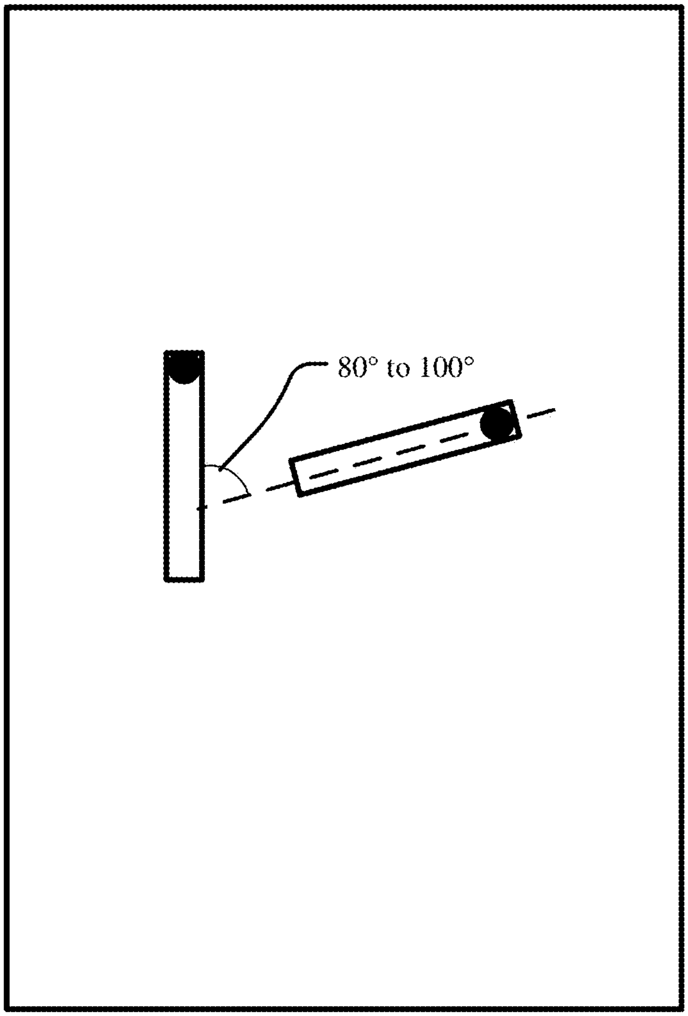

Next, FIG. 11A to FIG. 11C to FIG. 13A to FIG. 13C are used as examples to describe an arrangement form between two antenna units included in the antenna structure provided in this embodiment of this application. The two antenna units do not touch each other. "Do not touch each other" may be understood as that there is no direct physical contact between the two antenna units. FIG. 11A to FIG. 11C are a schematic diagram of a structure of a series layout (for example, arrangement in a straight line) of two antenna units. FIG. 12A to FIG. 12C are a schematic diagram of a structure of a parallel layout (for example, arrangement in an aligned manner) of two antenna units. FIG. 13A to FIG. 13C are a schematic diagram of a structure of an orthogonal layout (for example, arrangement in a staggered manner) of two antenna units. It should be understood that the schematic layout diagrams in FIG. 11A to FIG. 11C to FIG. 13A to FIG. 13C are all plane structures of top views, that is, schematic layout diagrams of projections that are of antenna units and that are on a plane on which a ground is located.

Solution 1: Series Layout

As shown in FIG. 11A to FIG. 11C, the antenna structure includes two antenna units 110, and the antenna units 110 may be ILA, IFA, or PIFA antenna units. The two antenna units 110 may be disposed along a same straight line on a plane of projection, and the antenna unit 110 is connected to a PCB (ground) 17 by using a ground part 111. Ground points of the two antenna units 110 are away from each other, that is, the ground points may be respectively disposed at ends that are of the two antenna units 110 and that are away from each other. This layout is a distributed antenna of a series layout.

It should be understood that, in a case in which feeding is not considered, a conductor of any shape may have a plurality of characteristic modes (characteristic mode), the two antenna units 110 spaced from each other along the same straight line are connected to a same PCB 17 by using the ground parts 111, and the two antenna units 110 and a part of the ground jointly form the dipole antenna. According to an eigenmode feature of the dipole antenna, as shown in FIG. 11A, the two antenna units 110 may generate co-directional mode currents 112, and mode currents between two ground parts in of the antenna unit no on the PCB 17 are in directions opposite to the mode currents 112 on the antenna unit no. In addition, the mode currents 112 on the antenna unit no excite induced currents 113 on the PCB 17. It can be learned from an electromagnetic induction theorem that directions of the mode currents 112 are opposite to directions of the corresponding induced currents 113. For the mode current of the antenna unit no between the two ground parts in on the PCB 17, the direction of the mode current is the same as the direction of the induced current 113, and the mode current and the induced current 113 may be superimposed, which indicates that this mode meets a boundary condition and may exist. That is, the antenna structure shown in FIG. 11A to FIG. 11C may excite the HWM.

It should be understood that, for the boundary condition, between the induced current and the mode current generated on the antenna unit, a component in a same direction exists, and no component in an opposite direction exists, so that the boundary condition is met.

Similarly, as shown in FIG. 11B, the two antenna units 110 may generate reverse mode currents 115, and mode currents between the two ground parts nil of the antenna unit 110 on the PCB 17 are in directions opposite to the mode currents 115 on the antenna unit 110. In addition, the mode currents 115 on the antenna unit 110 excite induced currents 116 on the PCB 17. It can be learned from the electromagnetic induction theorem that directions of the mode currents 115 are opposite to directions of the corresponding induced currents 116. For the mode current of the antenna unit 110 between the two ground parts 111 on the PCB 17, the direction of the mode current is the same as the direction of the induced current 113, and the mode current and the induced current 113 may be superimposed, which indicates that this mode meets a boundary condition and may exist. That is, the antenna structure shown in FIG. 11A to FIG. 11C may excite the OWM.

As shown in FIG. 11A and FIG. 11B, the two antenna units 110 may be disposed along the same straight line, that is, the two antenna units 110 are collinear in a length direction. As shown in FIG. 11C, the two antenna units 110 are spaced from each other in a parallel and non-overlapping manner in the length direction, and a spacing between the two antenna units 110 in the length direction is less than a quarter of an operating wavelength, that is, in FIG. 11A and FIG. 11B, a specific misplacement may exist in respective length directions of the two antenna units 110. The operating wavelength may be considered as a wavelength corresponding to a radiation signal generated when the antenna unit works. For example, in a frequency band corresponding to 5G new radio (new radio, NR), a spacing between two antenna units 110 in the length direction may be less than 3 mm.

A wavelength of a radiated signal in the air may be calculated as follows: Wavelength=Speed of light/Frequency, where the frequency is a frequency of the radiated signal. A wavelength of a radiated signal in a medium may be calculated as follows: Wavelength=(Speed of light/$\sqrt{\varepsilon}$)/Frequency, where $\varepsilon$ is a relative dielectric constant of the medium, and the frequency is a frequency of the radiated signal.

Solution 2: Parallel Layout

As shown in FIG. 12A to FIG. 12C, an antenna structure includes two antenna units 110, and the antenna units 110 may be ILA, IFA, or PIFA antenna units. The two antenna units 110 may be disposed in a parallel and non-collinear manner on a plane of projection. Specifically, the two antenna units 110 are parallel in the length direction and overlap in the length direction, and the two antenna units 110 are connected to the PCB (ground) 17 by using ground parts 117. Ground points of the two antenna units 110 are away from each other. For example, the ground points are disposed at two ends that are of the two antenna units 110 and that are away from each other in a staggered manner. This layout is a distributed antenna of a parallel layout.

It should be understood that, in a case in which feeding is not considered, a conductor of any shape may have a plurality of characteristic modes, the two antenna units 110 that are disposed in a parallel and non-collinear manner and that overlap in a parallel direction are connected to a same PCB 17 by using the ground parts 117, and the two antenna units 110 and a part of the ground jointly form the dipole antenna. According to an eigenmode feature of the dipole antenna, as shown in FIG. 12A, the two antenna units 110 may generate co-directional mode currents 118, and the antenna unit 110 may generate mode currents 119 between two ground parts 117 on the PCB 17. In addition, the mode currents 118 on the antenna unit 110 excite induced currents 120 on the PCB 17. It can be learned from the electromagnetic induction theorem that directions of the mode currents 118 are opposite to directions of the corresponding induced currents 120. For the mode current 119 of the antenna unit 110 between the two ground parts 117 on the PCB 17, the mode current 119 has a component with a same direction as the direction of the induced current 120, and the component and the induced current 120 may be superimposed, which indicates that this mode meets the boundary condition and may exist. That is, the antenna structure shown in FIG. 12A to FIG. 12C may excite the HWM.

Similarly, as shown in FIG. 12B, the two antenna units 110 may generate reverse mode currents 122, and the antenna unit 110 may generate mode currents 123 between the two ground parts 117 on the PCB 17. In addition, the mode currents 122 on the antenna unit 110 excite induced currents 124 on the PCB 17. It can be learned from the electromagnetic induction theorem that directions of the mode currents 122 are opposite to directions of the corresponding induced currents 124. For the mode current 123 of the antenna unit 110 between the two ground parts 117 on the PCB 17, the mode current 123 has a component with a same direction as the direction of the induced current 124, and the component and the induced current 124 may be superimposed, which indicates that this mode meets the boundary condition and may exist. That is, the antenna structure shown in FIG. 12A to FIG. 12C may excite the OWM.

As shown in FIG. 12A and FIG. 12B, the two antenna units 110 are disposed in a parallel and non-collinear manner and overlap in a first direction, where the first direction may be the length direction of the antenna units 110. As shown in FIG. 12C, the two antenna units 110 are disposed in a parallel and non-collinear manner and only partially overlap in the first direction. That is, when the two antenna units 110 in FIG. 12A and FIG. 12B are parallel and not collinear, a specific misplacement may exist in a direction perpendicular to the parallel direction, where an overlapping part of the two antenna units 110 in the first direction is greater than a quarter of the operating wavelength. For example, in a frequency band corresponding to 5G NR, a misplacement distance between two antenna units 110 in the length direction is less than 3 mm. It should be understood that, as the overlapping part of the two antenna units 110 in the first direction becomes larger, radiation performance of the two antenna units 110 becomes better. When the two antenna units 110 completely overlap in the first direction, performance of the two antenna units 110 is optimal. Because an error may exist in actual production, that the two antenna units 110 completely overlap in the first direction may be understood as that an overlap rate of the two antenna units 110 in the first direction is greater than 90%.

Solution 3: Orthogonal Layout

As shown in FIG. 13A to FIG. 13C, an antenna structure includes two antenna units 110, and the antenna units 110 may be ILA, IFA, or PIFA antenna units. The two antenna units 110 may be disposed in a mutual vertical manner on a plane of projection, that is, respective length directions of the two antenna units 110 are perpendicular to each other, and the two antenna units 110 are connected to the PCB (ground) 17 by using ground parts 117. Ground points of the two antenna units 110 are away from each other, and a grounded end of one antenna unit is away from the other antenna unit relative to the other end, for example, away from a middle position of the other antenna unit. This layout is a distributed antenna of an orthogonal layout. It should be understood that the middle position may be an area surrounding a midpoint between a ground point of the antenna unit and an ungrounded end of the antenna unit. Alternatively, extension lines of the two antenna units 110 in the length directions of the two antenna units 110 may intersect on one of the antenna units.

It should be understood that, in a case in which feeding is not considered, a conductor of any shape may have a plurality of characteristic modes, and the two antenna units spaced from each other vertically are connected to a same PCB 17 by using the ground parts 125. According to an eigenmode feature of the dipole antenna, as shown in FIG. 13A, the two antenna units 110 may generate co-directional mode currents 126, and the antenna unit 110 may generate mode currents 127 between two ground parts 125 on the PCB 17. In addition, the mode currents 126 on the antenna unit 110 excite induced currents 128 on the PCB 17. It can be learned from the electromagnetic induction theorem that directions of the mode current 126 are opposite to directions of the corresponding induced current 128. For the mode current 127 of the antenna unit 110 between the two ground parts 125 on the PCB 17, the mode current 127 has a component with a same direction as the direction of the induced current 128, and the component and the induced current 128 may be superimposed, which indicates that this mode meets the boundary condition and may exist. That is, the antenna structure shown in FIG. 13A to FIG. 13C may excite the HWM.

Similarly, as shown in FIG. 13B, the two antenna units 110 may generate reverse mode currents 130, and the antenna unit 110 may generate mode currents 131 between the two ground parts 125 on the PCB 17. In addition, the mode currents 130 on the antenna unit 110 excite induced currents 132 on the PCB 17. It can be learned from the electromagnetic induction theorem that directions of the mode current 130 are opposite to directions of the corresponding induced current 132. For the mode current 131 of the antenna unit 110 between the two ground parts 117 on the PCB 17, the mode current 131 has a component with a same direction as the direction of the induced current 132, and the component and the induced current 132 may be superimposed, which indicates that this mode meets the boundary condition and may exist. That is, the antenna structure shown in FIG. 13A to FIG. 13C may excite the OWM.

As shown in FIG. 13A and FIG. 13B, the respective length directions of the two antenna units 110 are perpendicular to each other and are spaced apart, and one antenna unit is symmetrically disposed relative to the other antenna unit, that is, a virtual extension line of one antenna unit in the length direction of the antenna unit is perpendicular to the other antenna unit and passes through a midpoint of the other antenna unit in the length direction of the antenna unit. As shown in FIG. 13C, an included angle formed by the two antenna units 110 in the respective length directions is between 80 degrees and 100 degrees, that is, one of the antenna units in FIG. 13A and FIG. 13B may rotate to a specific extent along one end of a radiator of the antenna unit or along any point on the radiator of the antenna unit.

It should be understood that the "distributed antenna" provided in this embodiment of this application may also include a plurality of antenna units. The plurality of antenna units do not touch each other, the plurality of antenna units are electrically connected to a same ground, and ground points of adjacent antenna units in the plurality of antenna units are arranged in a staggered manner. Different from a concept in a circuit, in the foregoing embodiment, the series layout, the parallel layout, and the orthogonal layout are all examples of layouts among the plurality of antenna units, and the plurality of antenna units do not touch each other. In addition, the series layout, the parallel layout, and the orthogonal layout may also be converted with each other. For example, in the parallel layout, one antenna unit moves in a length direction of the antenna unit, and the series layout may be converted to. In addition, if one antenna unit rotates along an end point of the antenna unit, the orthogonal layout may be converted to.

In addition, in layouts of some electronic devices, due to space limitation, antenna units may not be distributed along a straight line, and may be in an L shape or another irregular shape. This does not constitute a limitation on the layouts provided in this embodiment of this application. It may be considered that a condition is met provided that some of the antenna units meet the layouts in the foregoing embodiment. This is not limited in this application. For example, if the two antenna units are both of an L-shaped structure, and the series layout, the parallel layout, or the orthogonal layout may be satisfied in a direction of a longest side of the two antenna units, it may be considered that the two antenna units are distributed antennas in a corresponding layout.

Figure 14:
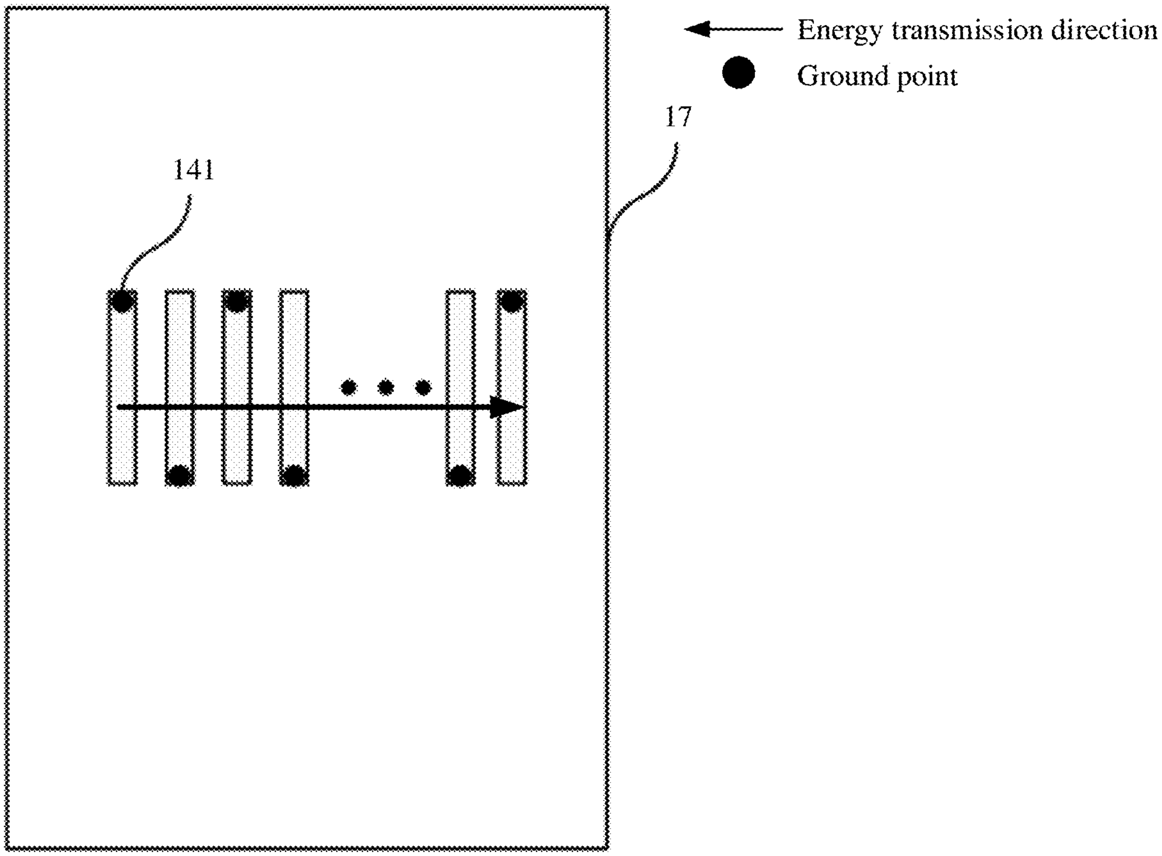
FIG. 14 is a schematic diagram of a structure of a plurality of antenna units in parallel layout according to this application.
Figure 15:
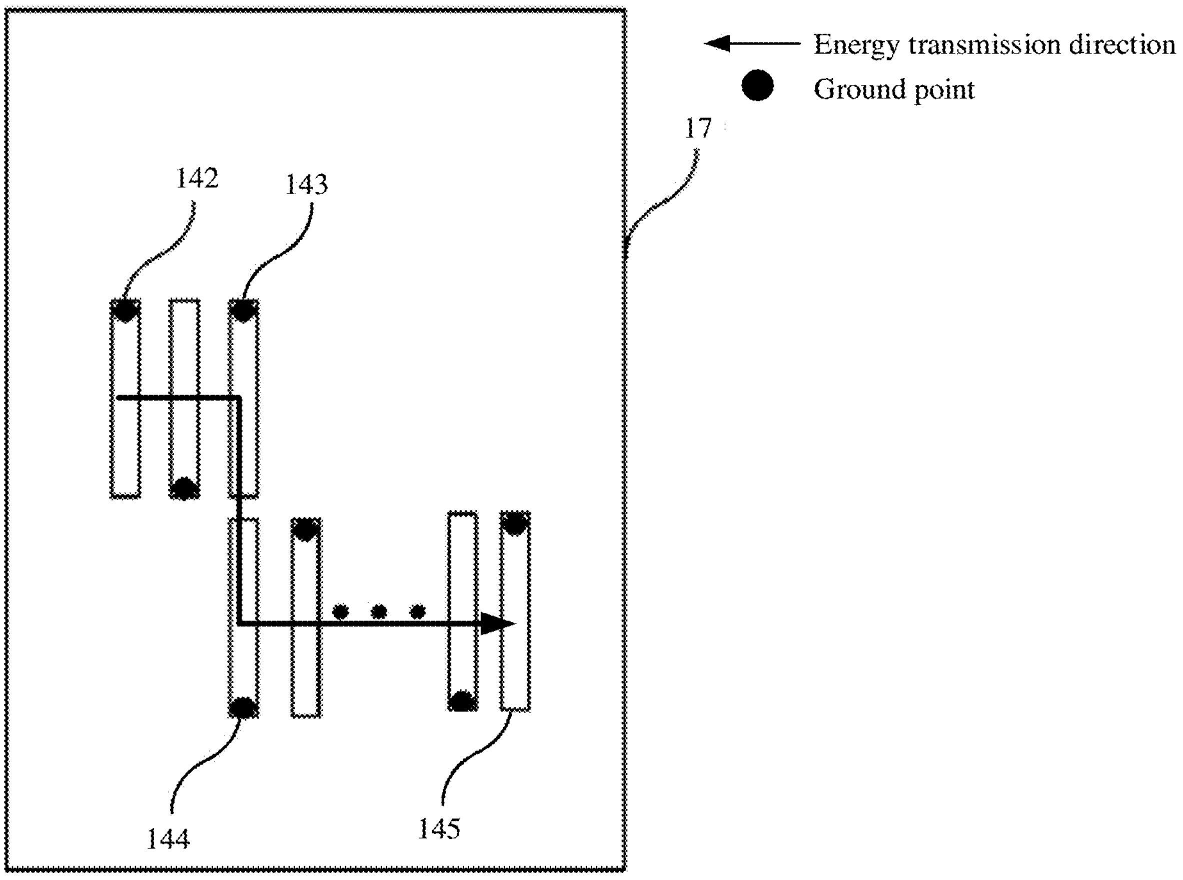
FIG. 15 is a schematic diagram of a structure of a plurality of antenna units in series-parallel layout according to this application.
Figure 16:
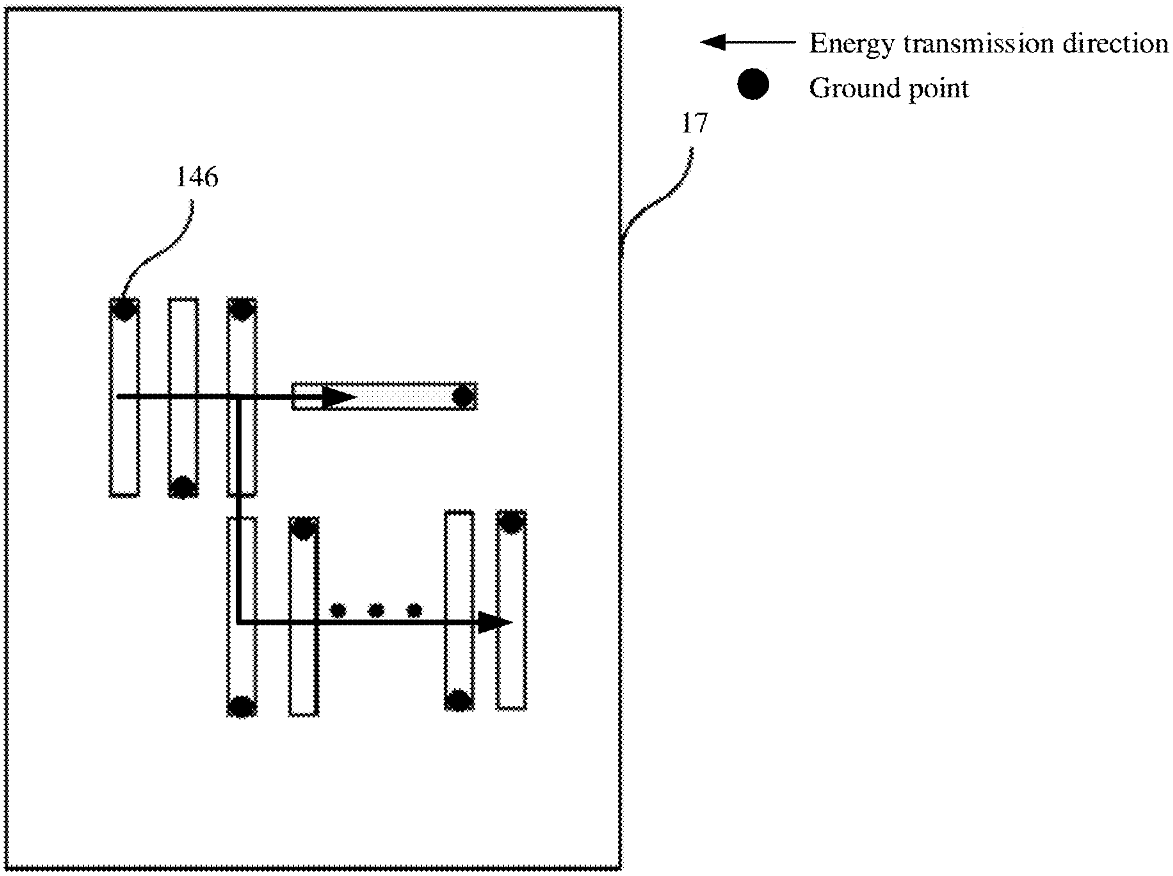
FIG. 16 is a schematic diagram of a structure of a plurality of antenna units in series-parallel-orthogonal layout according to this application.
Figure 17:
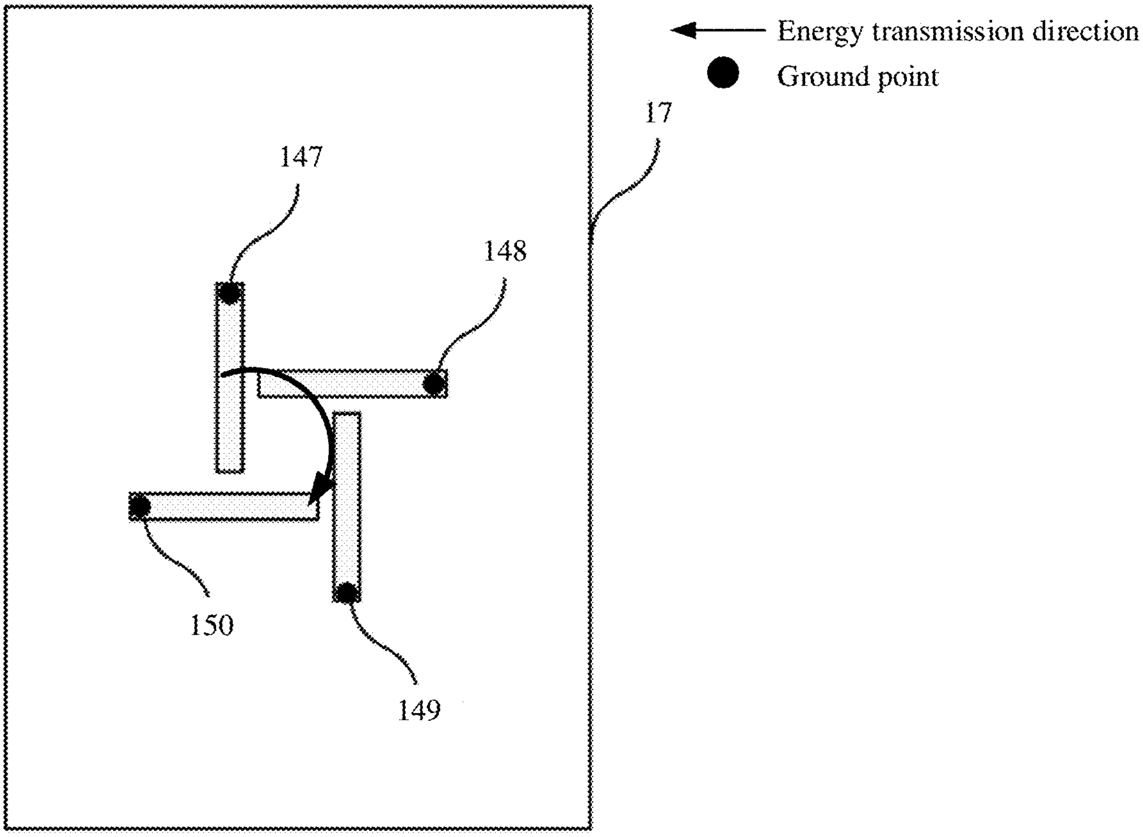
FIG. 17 is a schematic diagram of a structure of a plurality of antenna units in orthogonal layout according to this application.

FIG. 14 to FIG. 17 are used as examples to describe an arrangement form between more than two antenna units included in the antenna structure provided in this embodiment of this application. FIG. 14 is a schematic diagram of a structure of a plurality of antenna units in parallel layout. FIG. 15 is a schematic diagram of a structure of a plurality of antenna units in series-parallel layout. FIG. 16 is a schematic diagram of a structure of a plurality of antenna units in series-parallel-orthogonal layout. FIG. 17 is a schematic diagram of a structure of a plurality of antenna units in orthogonal layout.

It should be understood that the antenna unit included in the antenna structure in this embodiment of this application may be one of an ILA, an IFA, or a PIFA antenna unit, or may be another type of antenna. This is not limited in this application.

As shown in FIG. 14, a plurality of antenna units are in the parallel layout, and ground points of each antenna unit in the antenna structure are arranged in a staggered manner, that is, ground points between two adjacent antenna units are away from each other. When an antenna unit 141 performs feeding, an energy transmission direction of the antenna unit 141 is from left to right, as shown in FIG. 14.

As shown in FIG. 15, a plurality of antenna units are in the series-parallel layout, and ground points of each antenna unit in the antenna structure are arranged in a staggered manner, that is, ground points between two adjacent antenna units are away from each other. An antenna unit 142 to an antenna unit 143 are in a parallel layout, the antenna unit 143 and an antenna unit 144 are arranged in parallel, and the antenna unit 144 to an antenna unit 145 are in a parallel layout. When the antenna unit 142 performs feeding, energy is transmitted from left to right, and reaches the antenna unit 143, and the energy is transmitted downward to the antenna unit 144, and then continues to be transmitted rightward to the antenna unit 145.

As shown in FIG. 16, an antenna unit in an orthogonal layout is added to the antenna structure shown in FIG. 15. When the antenna unit 142 performs feeding, energy transmission of the antenna unit 142 also generates a path to the antenna unit in the orthogonal layout.

As shown in FIG. 17, a plurality of antenna units are in the orthogonal layout, and ground points of each antenna unit in the antenna structure are arranged in a staggered manner, that is, ground points between two adjacent antenna units are away from each other. When an antenna unit 147 performs feeding, energy is transmitted from the antenna unit 147 to an antenna unit 148, an antenna unit 149, and an antenna unit 150 in sequence in a clockwise direction.

In embodiments provided in FIG. 14 to FIG. 17, an example in which an antenna unit is an ILA unit is used. The following FIG. 18 and FIG. 19 are schematic diagrams described by using an example in which an antenna unit is a PIFA unit.

Figure 18:
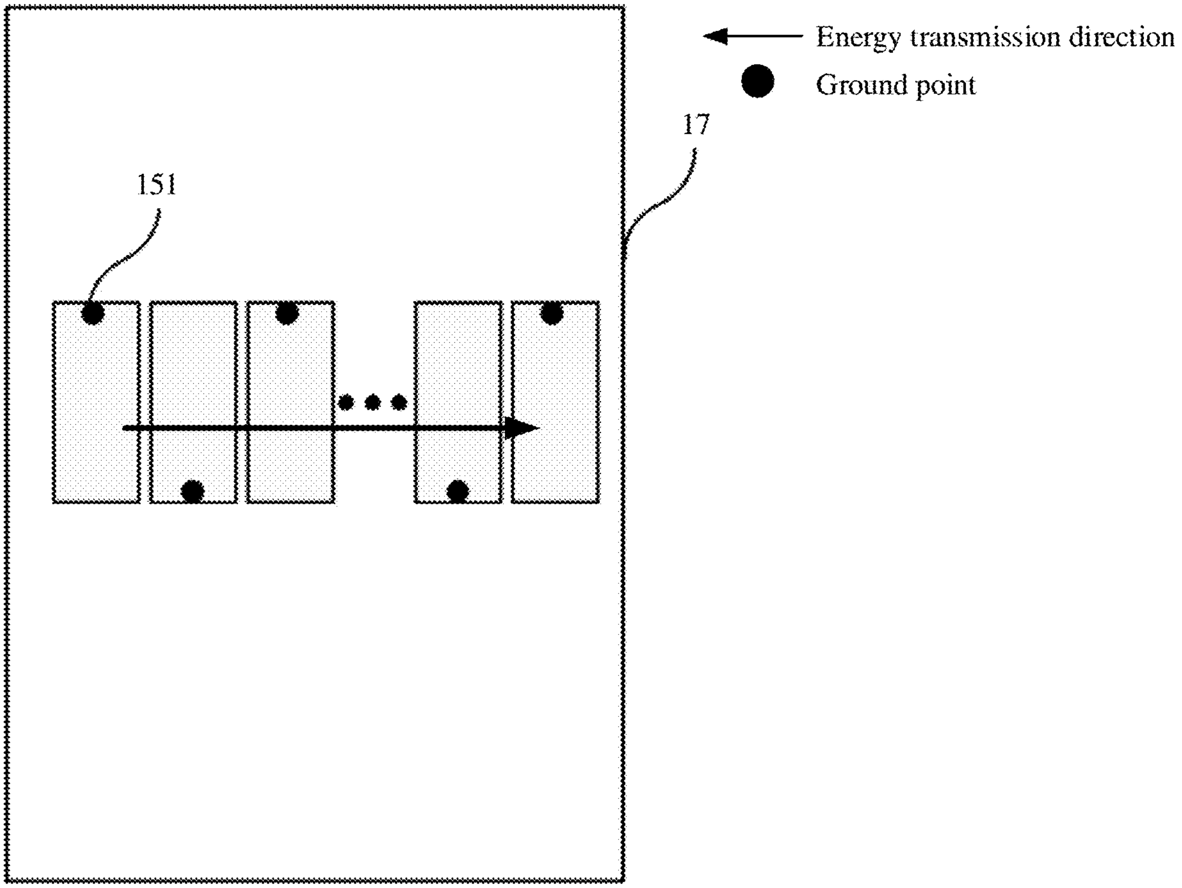
FIG. 18 is a schematic diagram of description by using an example in which an antenna unit is a PIFA unit according to this application.

As shown in FIG. 18, a plurality of PIFA units are in a parallel layout, and ground points of each PIFA unit in an antenna structure are arranged in a staggered manner, that is, ground points between two adjacent PIFA units are away from each other. When a PIFA unit 151 performs feeding, an energy transmission direction of the PIFA unit 151 is shown in FIG. 18 from left to right.

Figure 19:
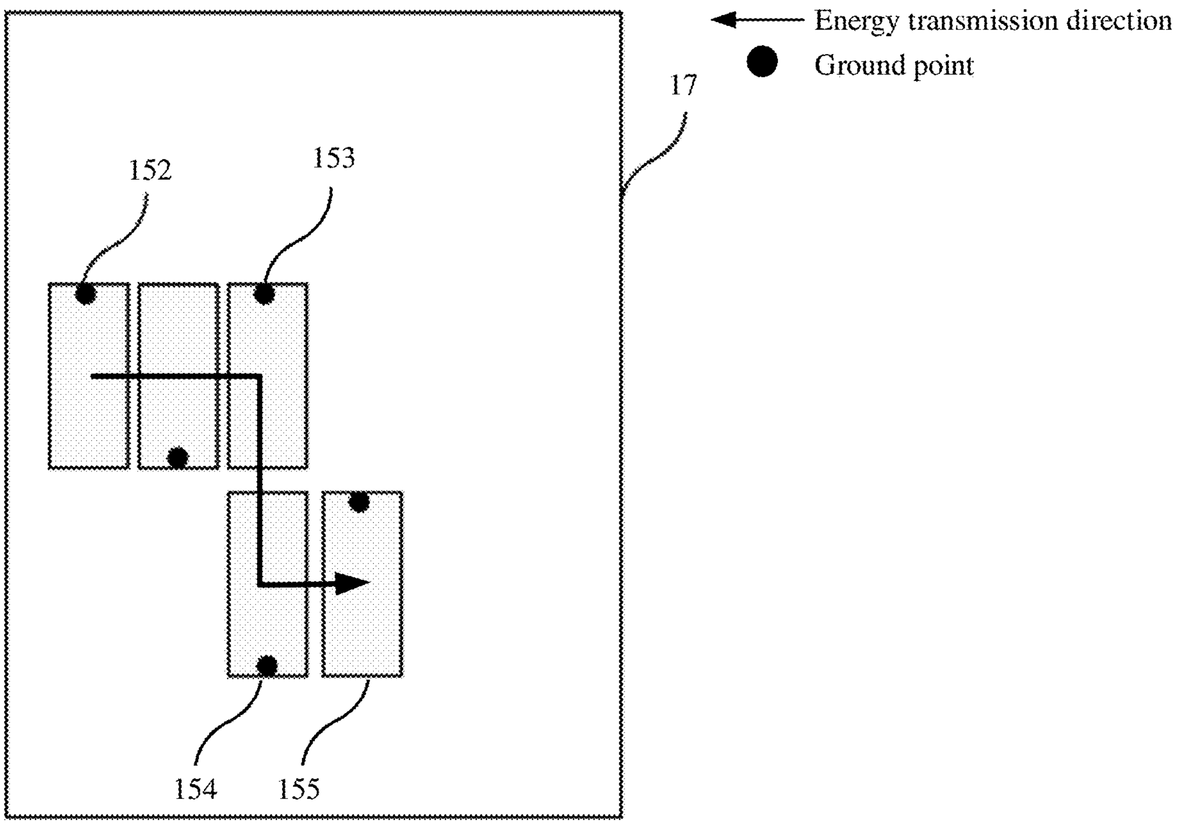
FIG. 19 is a schematic diagram of description by using an example in which an antenna unit is a PIFA unit according to this application.

As shown in FIG. 19, a plurality of PIFA units are in a series-parallel layout, and ground points of each PIFA unit in an antenna structure are arranged in a staggered manner, that is, ground points between two adjacent PIFA units are away from each other. A PIFA unit 152 to a PIFA unit 153 are in a parallel layout, the PIFA unit 153 and a PIFA unit 154 are arranged in parallel, and the PIFA unit 154 to a PIFA unit 155 are in a parallel layout. When the PIFA unit 152 performs feeding, energy is transmitted from left to right, and reaches the PIFA unit 153, the energy is transmitted downward to the PIFA unit 154, and then continues to be transmitted rightward to the PIFA unit 155.

Optionally, the plurality of PIFA units may be in an orthogonal layout, or the plurality of PIFA units may be in a series layout, or a parallel layout and an orthogonal layout are arranged in another combination manner. This is not limited in this embodiment of this application, and may be selected based on actual production or design.

It should be understood that, in the antenna structure provided in this embodiment of this application, as a quantity of antenna units in the antenna structure increases, a multi-frequency mode may be generated. In addition, each of the plurality of antenna units in the antenna structure provided in this embodiment of this application may be of a different type. For example, the plurality of antenna units may be an ILA, an IFA, or a PIFA, or may include another antenna type. This is not limited in this application.

Figure 20A:
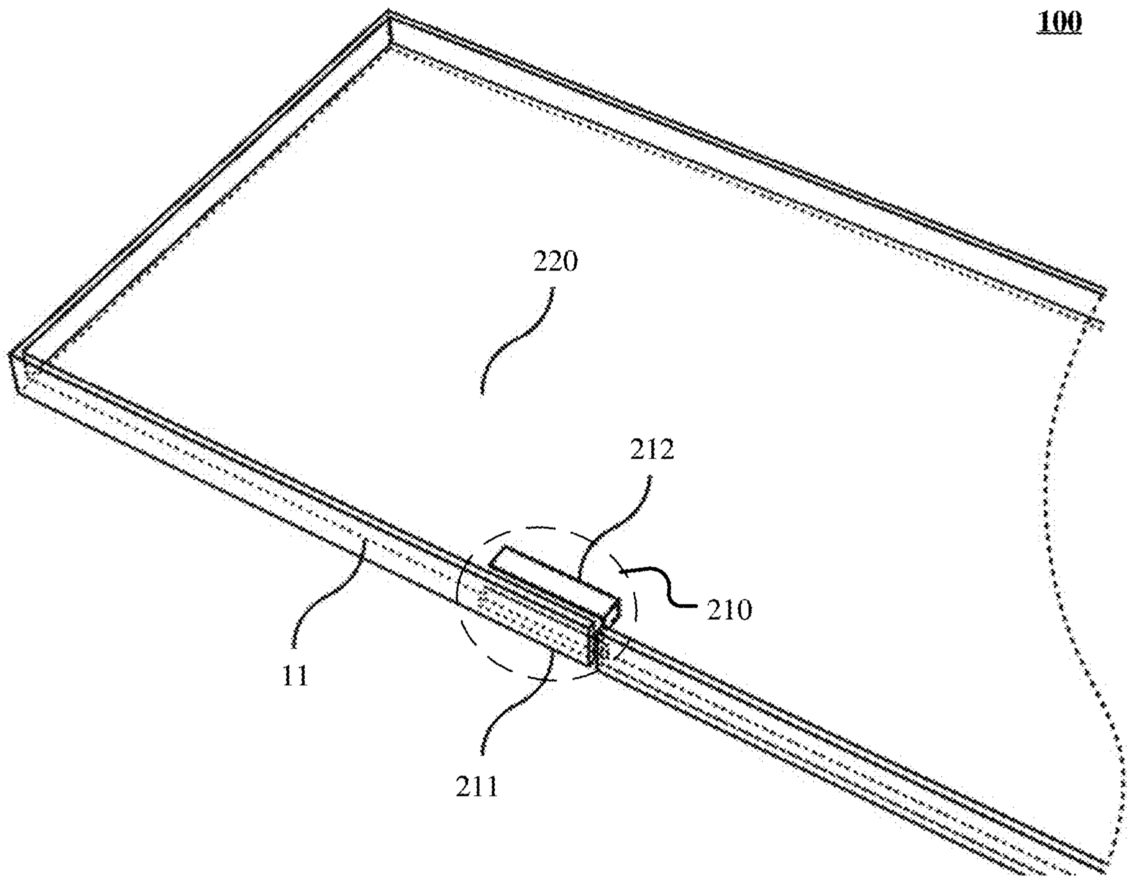
FIG. 20A to FIG. 20C are a schematic diagram of a structure of an electronic device according to this application.
Figure 20B:
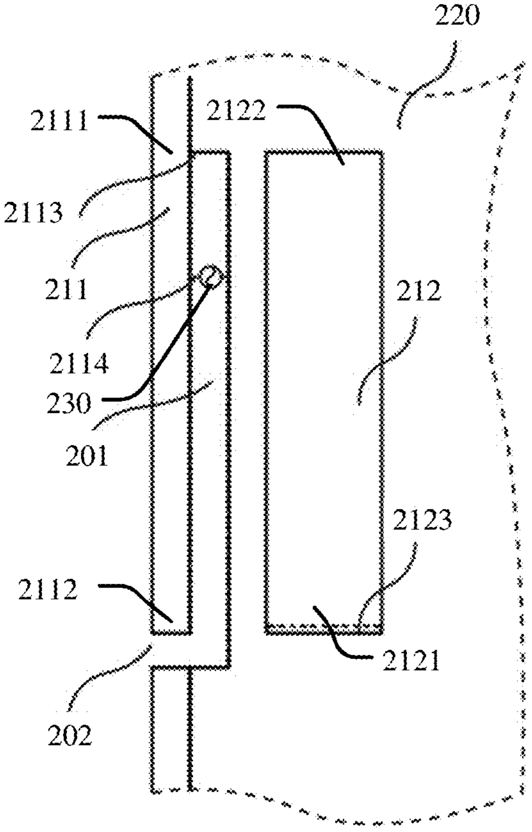
Figure 20C:
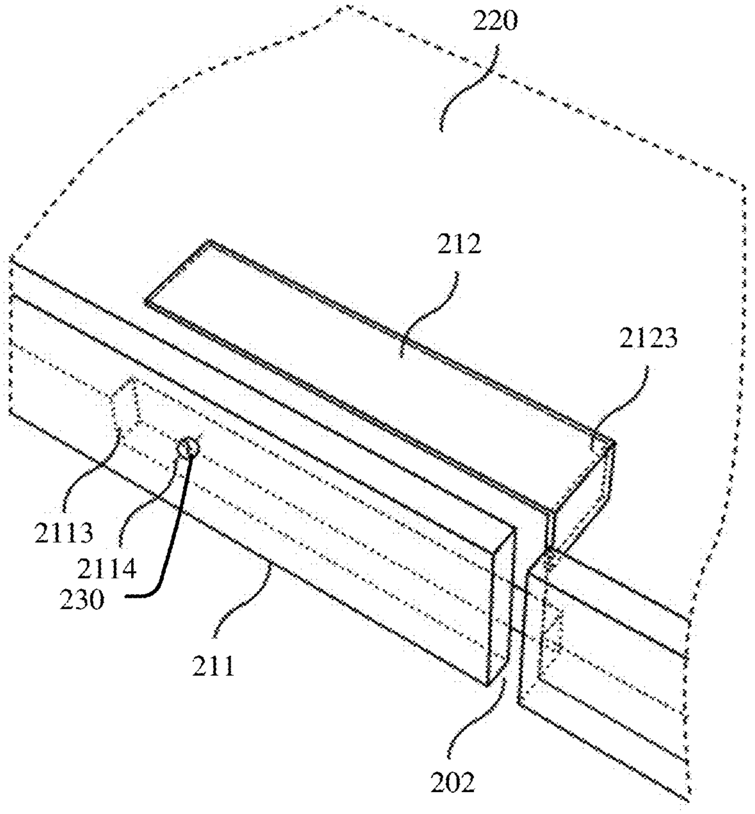

FIG. 20A to FIG. 20C are a schematic diagram of a structure of an electronic device according to an embodiment of this application.

As shown in FIG. 20A to FIG. 20C, the electronic device 100 may include an antenna structure 210 and a ground 220, and the antenna structure 210 may include a first antenna unit 211 and a second antenna unit 212.

The first antenna unit 211 may include a first end 2111 and a second end 2112, and the second antenna unit 212 may include a first end 2121 and a second end 2122. A first ground point 2113 is disposed at the first end 2111 of the first antenna unit 211, and the first antenna unit 211 is electrically connected to the ground 220 at the first ground point 2113. A second ground point 2123 is disposed at the first end 2121 of the second antenna unit 212, and the second antenna unit 212 is electrically connected to the ground 220 at the second ground point 2123. A distance between the second ground point 2123 and the first ground point 2113 is greater than a distance between the second end 2122 of the second antenna unit 212 and the first ground point 2113. An electrical length of the first antenna unit 211 is the same as an electrical length of the second antenna unit 212. Because an error may exist in actual production, that the electrical length of the first antenna unit 211 is the same as the electrical length of the second antenna unit 212 may be understood as that an error between the electrical length of the first antenna unit 211 and the electrical length of the second antenna unit 212 is within 15%.

It should be understood that the electrical length of the first antenna unit 211 may be an electrical length between the second end 2112 of the first antenna unit 211 and the first ground point 2113. The electrical length of the second antenna unit 212 may be an electrical length between the second end 2122 of the second antenna unit 212 and the second ground point 2123.

An electrical length may be represented by multiplying a physical length (that is, a mechanical length or a geometric length) by a ratio of transmission time of an electrical or electromagnetic signal in a medium to time required by the signal to travel, in free space, a distance the same as the physical length in the medium. The electrical length may meet the following formula:

$$\bar{L} = L \times \frac{a}{b},$$

where

L is the physical length, a is the transmission time of the electrical or electromagnetic signal in the medium, and b is the transmission time in the free space.

Alternatively, an electrical length may be a ratio of a physical length (that is, a mechanical length or a geometric length) to a wavelength of a transmitted electromagnetic wave, and the electrical length may meet the following formula:

$$\bar{L} = \frac{L}{\lambda},$$

where

L is the physical length, and λ is the wavelength of the electromagnetic wave.

In addition, it should be understood that the first end 2111 of the first antenna unit 211 may be a section, a surface, or a part of the first antenna unit 211 from an endpoint, that is, distances between all points on the first end 2111 and the endpoint are less than a first threshold, and the first end 2111 cannot be understood as one point in a narrow sense. The second end 2112 of the first antenna unit 211, the first end 2121 of the second radiator 212, and the second end 2122 of the second radiator 212 may also be correspondingly understood as the foregoing concept.

Optionally, the first end 2111 of the first antenna unit 211 may be connected to a frame of the electronic device, or may be connected to another antenna unit.

Optionally, the ground 220 may be a middle frame of the electronic device 100, a metal layer of a PCB, or another metal layer in the electronic device.

Optionally, the first antenna unit 211 may be disposed on a frame 11 of the electronic device 100, and the first antenna unit 211 may be a metal frame antenna, as shown in FIG. 20A.

Optionally, the first antenna unit 211 is separated from the ground 220 by using a gap 201 and a gap 202, as shown in FIG. 20B. The gap 201 and the gap 202 are clearance of the first antenna unit 211 relative to the ground 220, that is, a distance between a projection that is of the first antenna unit 211 and that is on a plane on which the ground 220 is located and the ground is clearance. As the clearance increases, bandwidth of the antenna structure can be effectively increased.

Optionally, the second antenna unit 212 may be disposed on the ground 220. The first antenna unit 211 and the second antenna unit 212 may be in a parallel layout. It should be understood that the first antenna unit 211 is a metal frame antenna and the second antenna unit 212 may be disposed on the ground 220. The second antenna unit 212 occupies no space of a conventional metal frame antenna, but is disposed by using other space in the electronic device. The antenna structure 210 generates a plurality of operating frequency bands, and occupies no additional space of another metal frame antenna in the conventional technology.

Optionally, the second antenna unit 212 may be a laser-direct-structuring (laser-direct-structuring, LDS) antenna, a flexible printed circuit (flexible printed circuit, FPC) antenna, or a floating metal (floating metal, FLM) antenna, or may be a PCB antenna. This is not limited in this application.

Optionally, the electronic device 100 may further include a feed unit 230. A feed point 2114 may be disposed on the first antenna unit 211, and the feed unit 230 may be electrically connected to the first antenna unit 211 at the feed point 2114 to feed the antenna structure 210.

Optionally, a distance between the feed point 2114 and the first ground point 2113 is less than a quarter of a first wavelength, and the first wavelength is an operating wavelength of the electronic device, that is, a wavelength at which the antenna structure operates when the feed unit 230 performs feeding.

It should be understood that, in this embodiment provided in this application, the feed point 2114 is disposed at any location. The foregoing disposition location of the feed point 2114 is merely used as an example, and may be flexibly disposed based on an actual design and production requirement.

It should be understood that the operating wavelength of the antenna structure may be understood as a wavelength corresponding to a resonance point of generated resonance, or a wavelength corresponding to a center frequency of an operating frequency band.

Figure 21:
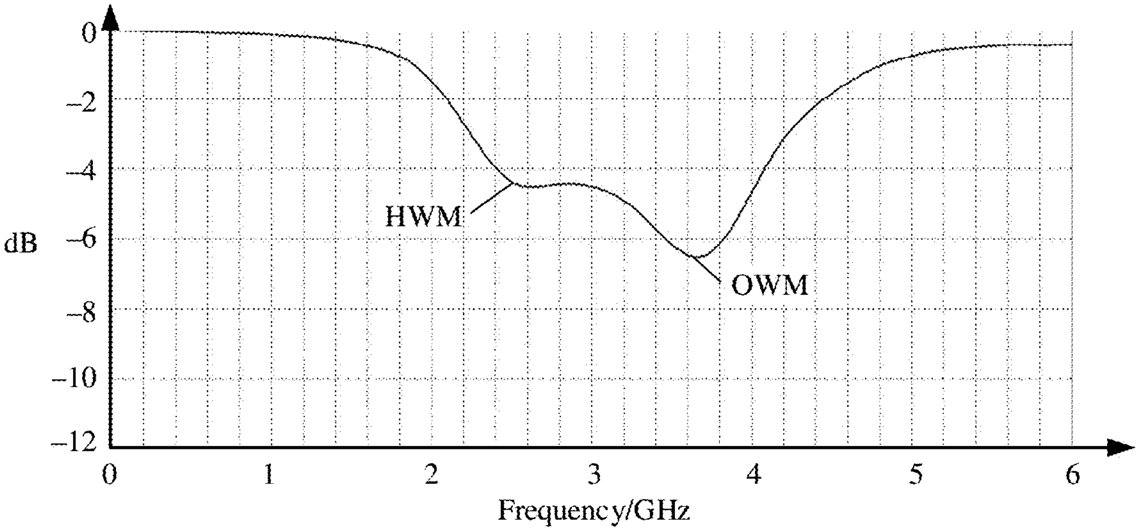
FIG. 21 is a simulation diagram of an S parameter of the antenna structure shown in FIG. 20A to FIG. 20C.
Figure 22:
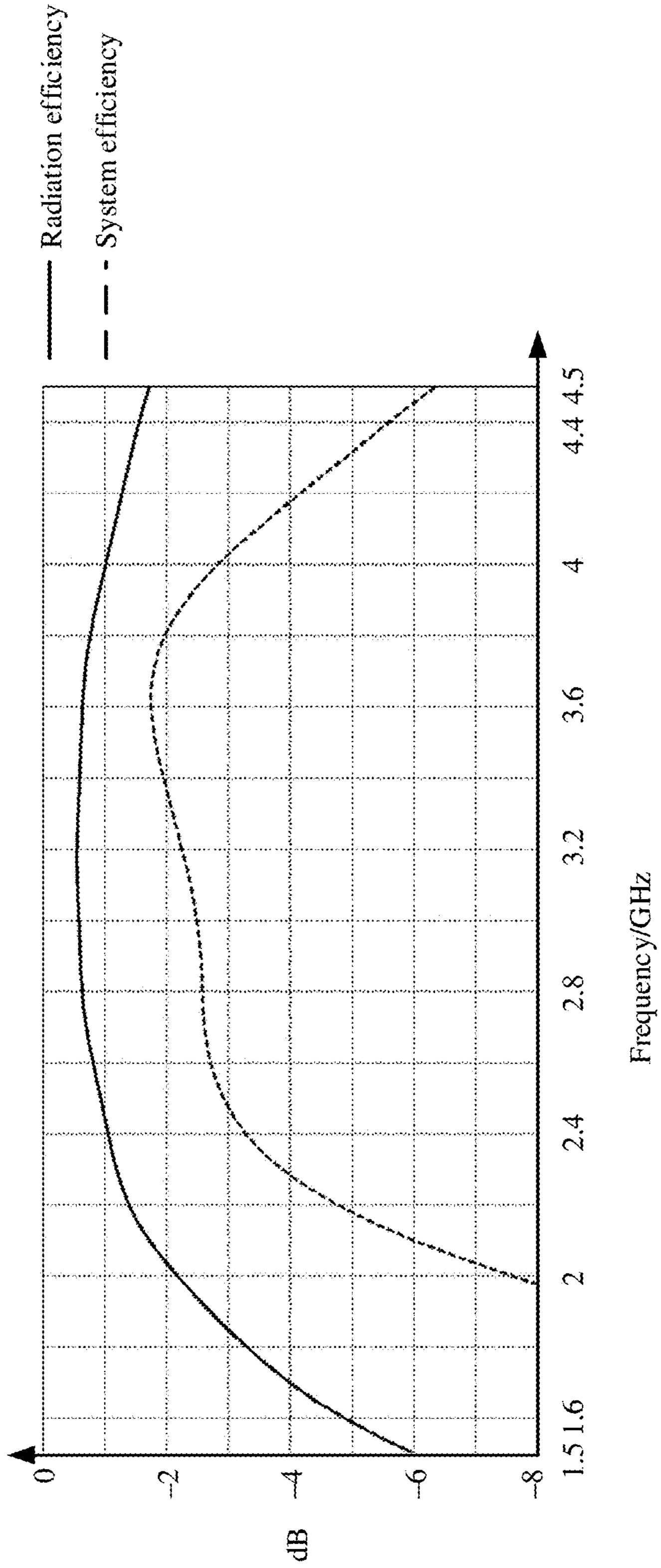
FIG. 22 is a simulation diagram of efficiency of the antenna structure shown in FIG. 20A to FIG. 20C.

FIG. 21 and FIG. 22 are diagrams of simulation results corresponding to the antenna structure shown in FIG. 20A to FIG. 20C. FIG. 21 is a simulation diagram of an S parameter of the antenna structure shown in FIG. 20A to FIG. 20C. FIG. 22 is a simulation diagram of efficiency of the antenna structure shown in FIG. 20A to FIG. 20C.

As shown in FIG. 21, in the antenna structure shown in FIG. 20A to FIG. 20C, the ground bears a part of a mode current, energy is transferred, by using the ground, between the two antenna units disposed on the ground to implement strong coupling, and an HWM and an OWM may be generated at the same time, to meet a communication requirement.

It should be understood that the first antenna unit, the second antenna unit, and a part of the ground jointly form a dipole antenna, and the overall dipole antenna can work in the HWM and the OWM. A path for a mode current of the dipole antenna includes the first antenna unit, the second antenna unit, and a part of the ground. Therefore, an operating frequency band of the antenna structure may be adjusted by adjusting lengths of radiators of the first antenna unit and the second antenna unit, or by adjusting a distance between the first ground point and the second ground point. A manner of adjusting the operating frequency band of the antenna structure may be selected based on actual space in the electronic device. To be specific, the operating frequency band of the antenna structure is determined by the electrical length of the first antenna unit, the electrical length of the second antenna unit, and an electrical length of the mode current carried on the ground (an electrical length between electrical connection points between the ground and the two antenna units). In addition, the electrical length of the part of ground that carries the mode current may be changed by performing an operation such as slotting on the part of ground that carries the mode current, or the operating frequency band of the antenna structure may be adjusted. As a distance between the first antenna unit and the second antenna unit increases, resonance generated in the HWM and resonance generated in the OWM are close to each other (a resonance frequency corresponding to the HWM is lower than a resonance frequency corresponding to the OWM). As the distance between the first antenna unit and the second antenna unit decreases, the resonance generated in the HWM and the resonance generated in the OWM are away from each other.

As shown in FIG. 22, the simulation result includes radiation efficiency (radiation efficiency) and system efficiency (total efficiency). In a corresponding operating frequency band, the radiation efficiency and the system efficiency may also meet a requirement.

Figure 23A:
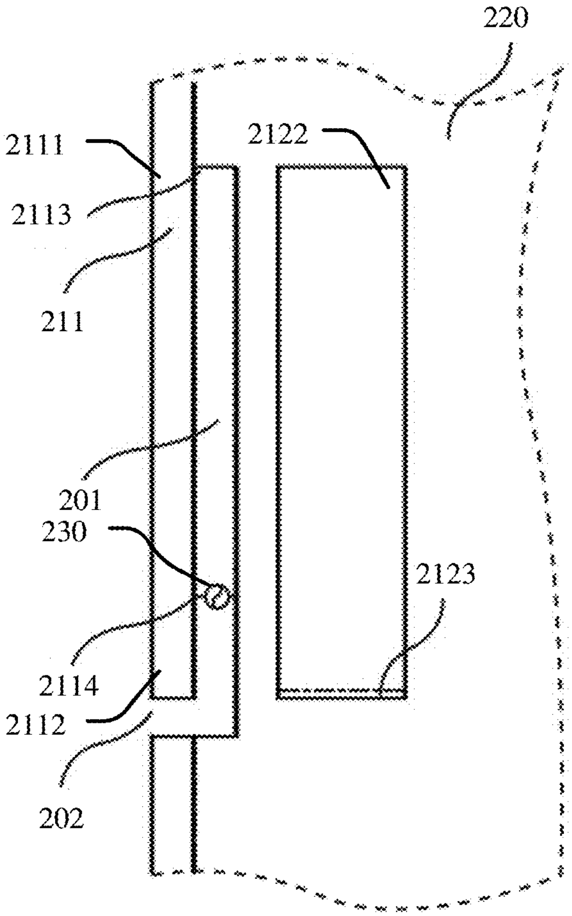
FIG. 23A and FIG. 23B are a schematic diagram of a structure of another electronic device according to an embodiment of this application.
Figure 23B:
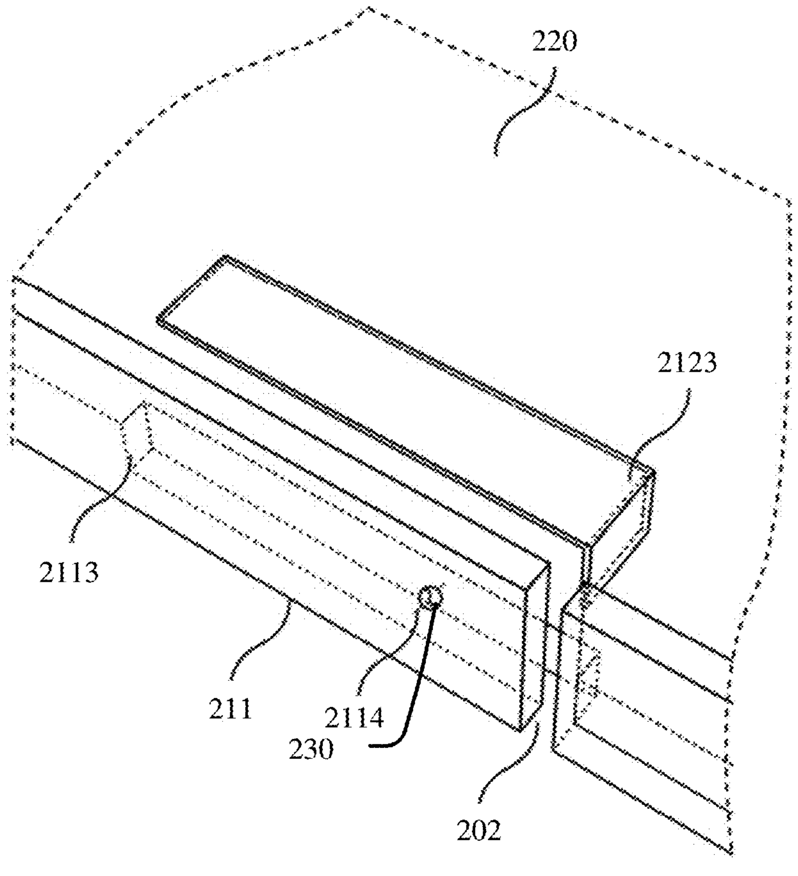

FIG. 23A and FIG. 23B are a schematic diagram of a structure of another electronic device according to an embodiment of this application.

As shown in FIG. 23A and FIG. 23B, the feed point 2114 may alternatively be disposed at the second end 2112 of the first antenna unit 211.

Optionally, to implement better impedance matching, a capacitor may be connected in series between the feed unit 230 and the first antenna unit 211, or the feed unit 230 feeds the antenna structure at the feed point 2114 in a capacitive indirect coupling feeding manner.

It should be understood that indirect coupling, namely, mid-air coupling, is a concept relative to direct coupling, and means that a direct electrical connection is not used. Direct coupling means a direct electrical connection, and direct feeding at a feed point.

In addition, the feed point 2124 may alternatively be disposed on the second antenna unit 212, the second antenna unit 212 is used as an excitation unit, and the first antenna unit 211 is used as a parasitic element.

Figure 24A:
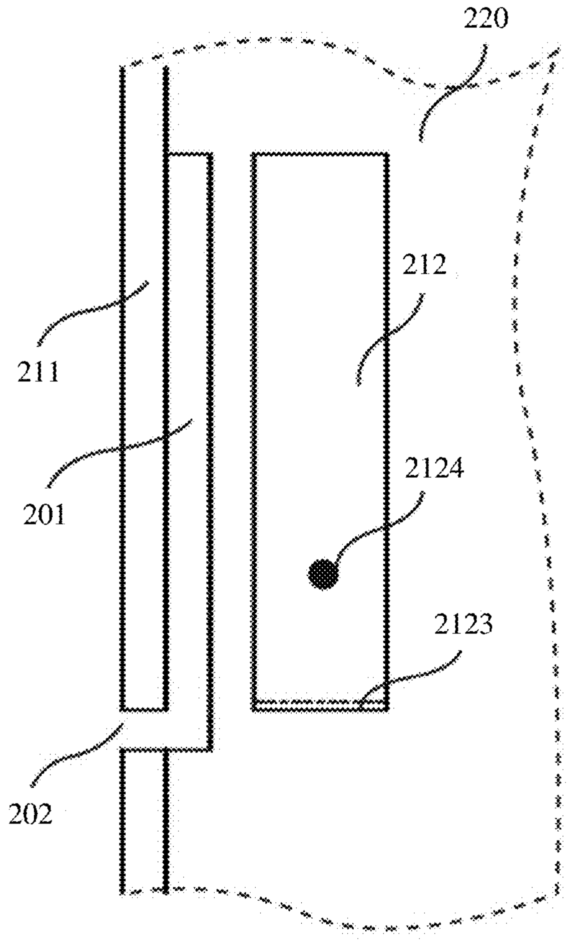
FIG. 24A and FIG. 24B are a schematic diagram of a structure of another electronic device according to an embodiment of this application.
Figure 24B:
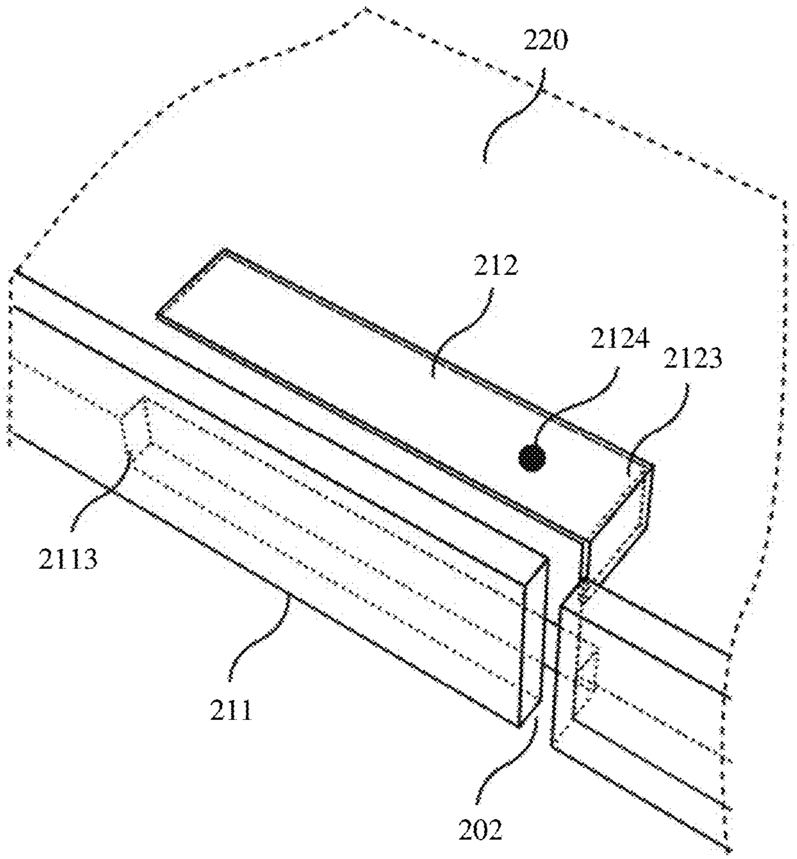

FIG. 24A and FIG. 24B are a schematic diagram of a structure of another electronic device according to an embodiment of this application.

As shown in FIG. 24A and FIG. 24B, the feed point 2124 may alternatively be disposed on the second antenna unit 212, and the feed unit may be electrically connected to the second antenna unit 212 at the feed point 2124 to feed the antenna structure.

Optionally, a distance between the feed point 2124 and the second ground point 2123 is less than a quarter of a first wavelength, and the first wavelength is a wavelength at which the antenna structure operates when the feed unit performs feeding.

Figure 25A:
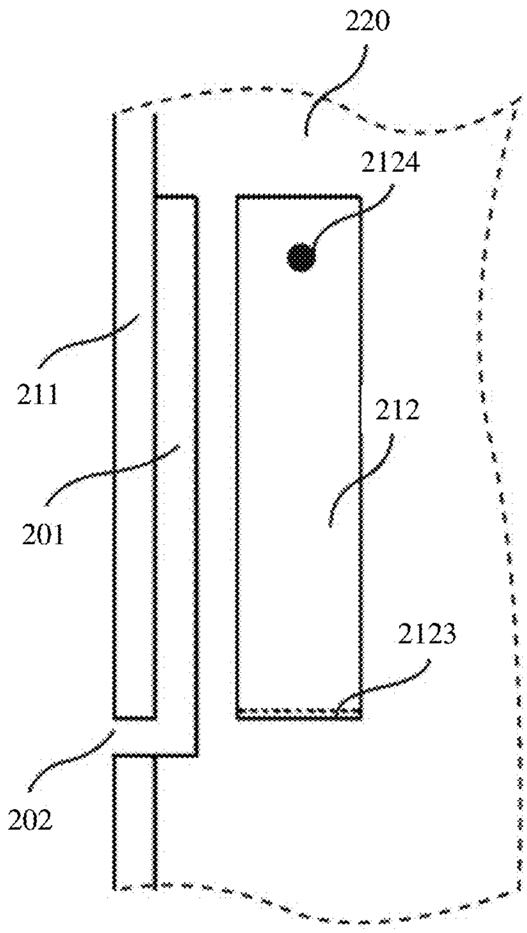
FIG. 25A and FIG. 25B are a schematic diagram of a structure of another electronic device according to an embodiment of this application.
Figure 25B:
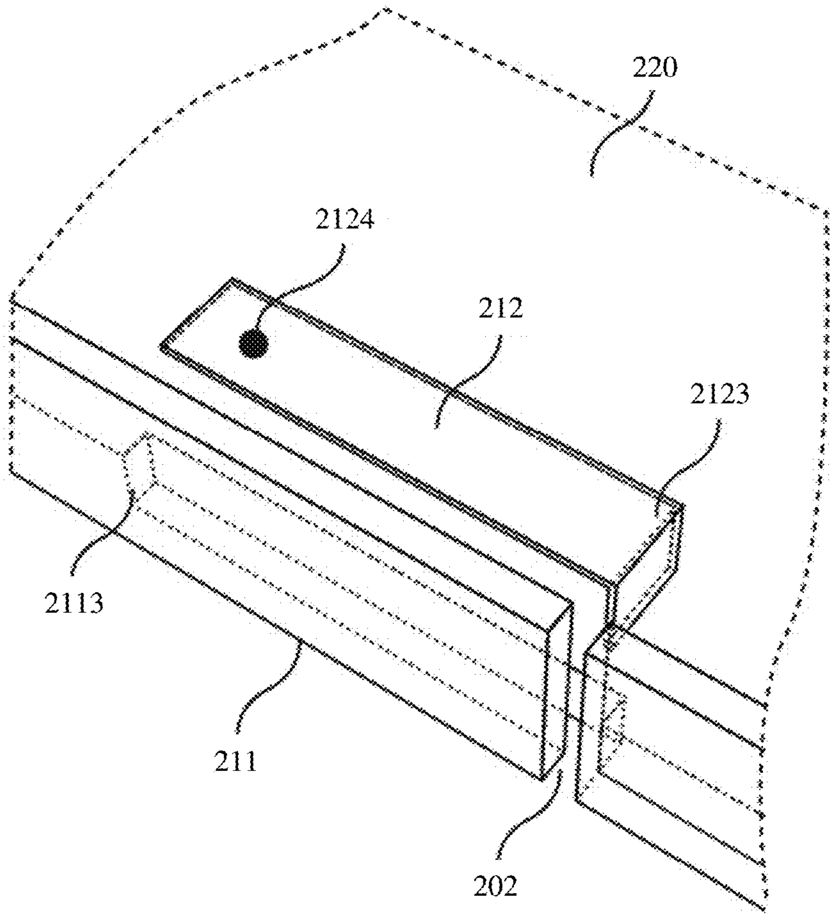

FIG. 25A and FIG. 25B are a schematic diagram of a structure of another electronic device according to an embodiment of this application.

As shown in FIG. 25A and FIG. 25B, the feed point 2124 may alternatively be disposed at the second end 2112 of the second antenna unit 212.

Optionally, to implement better impedance matching, a capacitor may be connected in series between the feed unit and the second antenna unit 212, or the feed unit feeds the antenna structure at the feed point 2124 in a capacitive indirect coupling feeding manner.

It should be understood that the antenna structures shown in FIG. 20A to FIG. 20C and FIG. 23A and FIG. 23B to FIG. 25A and FIG. 25B are all in parallel layouts, where each first antenna unit is a metal frame antenna, and the second antenna unit is correspondingly disposed on the ground of the electronic device, to form the parallel layout. The parallel layout in the electronic device saves more space, but another layout manner may alternatively be used, for example, a series layout and an orthogonal layout.

Figure 26:
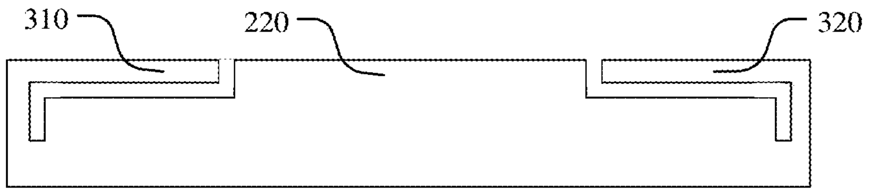
FIG. 26 is a schematic diagram of an antenna structure of a series layout according to an embodiment of this application.

FIG. 26 is a schematic diagram of an antenna structure of a series layout according to an embodiment of this application.

As shown in FIG. 26, both a first antenna unit 310 and a second antenna unit 320 may be metal frame antennas. The first antenna unit 310 and the second antenna unit 320 may be respectively disposed at two joints (corners) between any frame of the electronic device and two adjacent frames.

It should be understood that, because a part of a ground is introduced into the antenna structure provided in this embodiment of this application to carry a mode current of the antenna structure, that is, the first antenna unit 310 and the second antenna unit 320 are strongly coupled by using the ground 220. Therefore, the first antenna unit 310 and the second antenna unit 320 may be far away from each other, and may also generate the HWM and the OWM, without affecting a coupling amount between the first antenna unit 310 and the second antenna unit 320.

Figure 27:
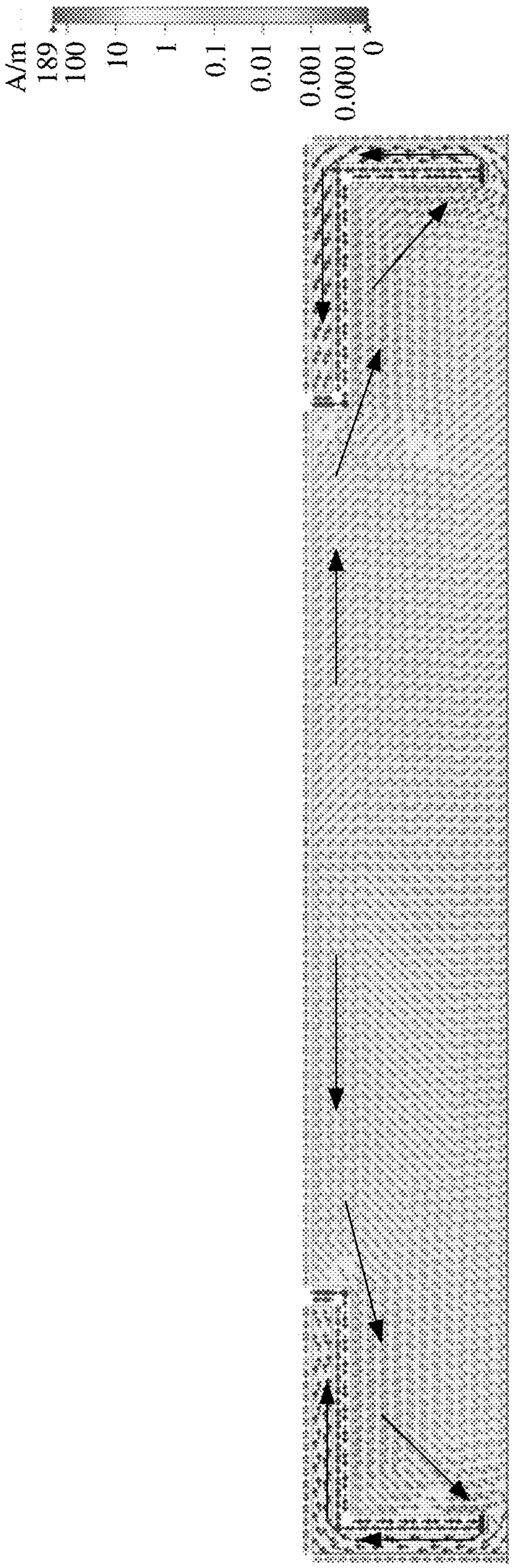
FIG. 27 is a schematic diagram of current distribution of the antenna structure shown in FIG. 26.

FIG. 27 is a schematic diagram of current distribution of the antenna structure shown in FIG. 26.

As shown in FIG. 27, in the antenna structure provided in this embodiment of this application, the ground bears a part of the mode current. Therefore, different from a conventional excitation unit and a parasitic unit, the first antenna unit and the second antenna unit are strongly coupled by using the ground. In addition, due to this structure, currents of the first antenna unit and the second antenna unit are evenly distributed, and radiation energy is not concentrated on an excitation unit to cause a high SAR.

Figure 28A:
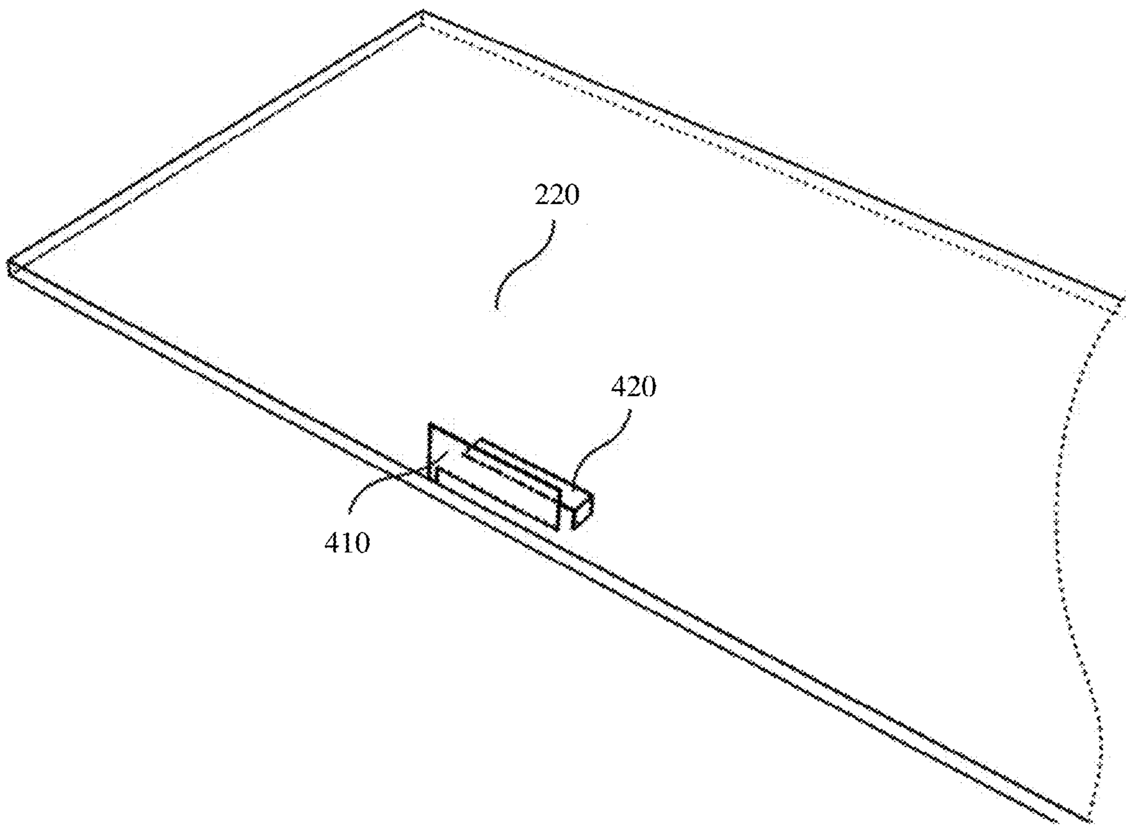
FIG. 28A to FIG. 28C are a schematic diagram of a structure of another electronic device according to an embodiment of this application.
Figure 28B:
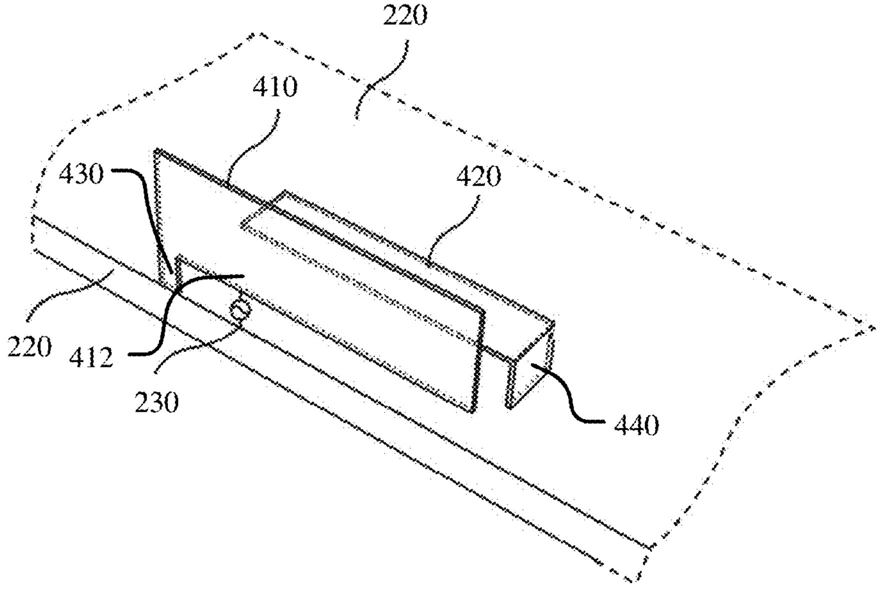
Figure 28C:
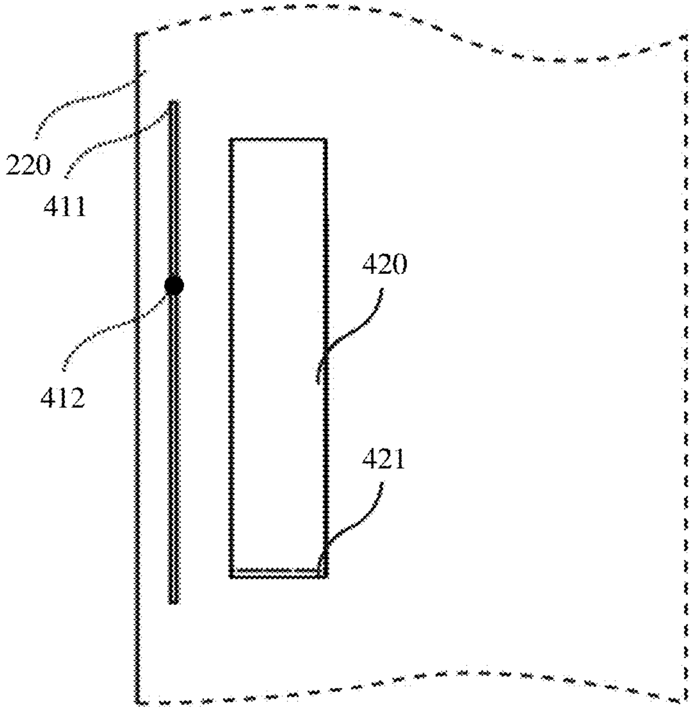

FIG. 28A to FIG. 28C are a schematic diagram of a structure of another electronic device according to an embodiment of this application.

As shown in FIG. 28A to FIG. 28C, a first antenna unit 410 and a second antenna unit 420 may be disposed on the ground 220. The first antenna unit 410 and the second antenna unit 420 may be in a parallel layout. Because the first antenna unit 410 is also disposed on the ground 220, antenna clearance of the first antenna unit 410 is zero, that is, a projection that is of the first antenna unit 410 and that is on a plane on which the ground 220 is located is on the ground 220, so that space occupied in the electronic device may further be reduced.

Optionally, the first antenna unit 410 and the second antenna unit 420 may be LDS antennas, FPC antennas, or FLM antennas, or may be PCB antennas. In addition, because neither the first antenna unit 410 nor the second antenna unit 420 uses a frame of the electronic device as an antenna, a distance between the frame of the electronic device and a display can be reduced, a screen-to-body ratio can be further improved, a bezel-less full screen design can be implemented, and user experience can be improved.

Optionally, a distance between a feed point 412 and a first ground point 411 is less than a quarter of a first wavelength, and the first wavelength is a wavelength at which the antenna structure operates when the feed unit performs feeding.

Optionally, the antenna structure may further include a first connecting piece 430 and a second connecting piece 440. One end of the first connecting piece 430 is electrically connected to the first antenna unit at the first ground point, and the other end of the first connecting piece 430 is electrically connected to the ground 220. One end of the second connecting piece 440 is electrically connected to the second antenna unit at a second ground point, and the other end of the second connecting piece 440 is electrically connected to the ground 220.

Figure 29:
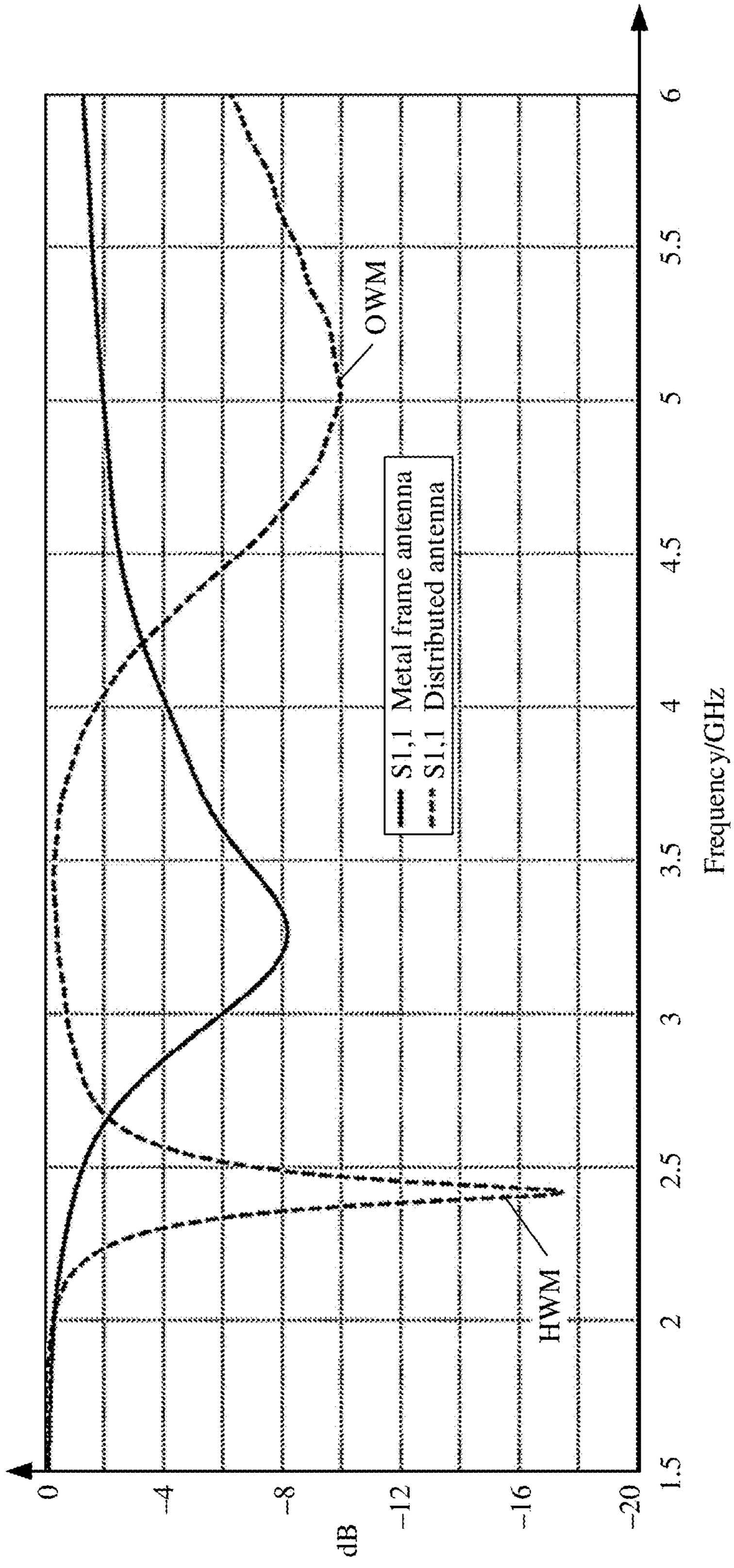
FIG. 29 is a simulation diagram of an S parameter of the antenna structure shown in FIG. 28A to FIG. 28C.
Figure 30:
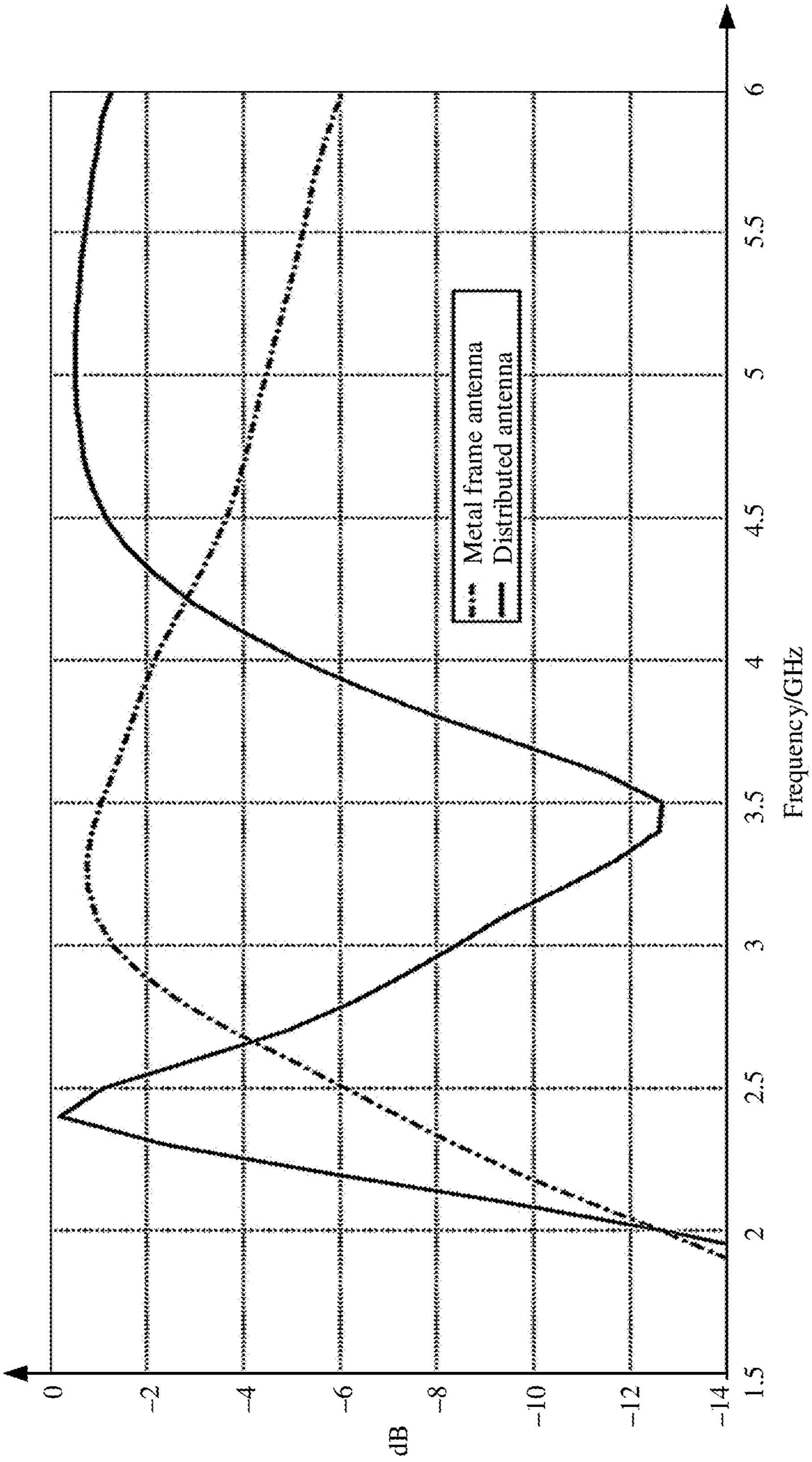
FIG. 30 is a simulation diagram of system efficiency of the antenna structure shown in FIG. 28A to FIG. 28C.

FIG. 29 and FIG. 30 are diagrams of simulation results corresponding to the antenna structure shown in FIG. 28A to FIG. 28C. FIG. 29 is a simulation diagram of an S parameter of the antenna structure shown in FIG. 28A to FIG. 28C. FIG. 30 is a simulation diagram of system efficiency of the antenna structure shown in FIG. 28A to FIG. 28C.

It should be understood that, in the simulation results shown in FIG. 29 and FIG. 30, a conventional metal frame antenna corresponding to the antenna structure point size provided in this embodiment of this application is added as a comparison, to show performance of the antenna structure provided in this embodiment of this application.

As shown in FIG. 29, in the antenna structure shown in FIG. 28A to FIG. 28C, the ground bears a part of a mode current, and energy is transferred, by using the ground, between two antenna units disposed on the ground, to implement strong coupling, and the HWM and the OWM may be generated at the same time, to meet a communication requirement.

As shown in FIG. 30, in a corresponding operating frequency band, system efficiency of the operating frequency band may also meet a requirement.

Figure 31A:
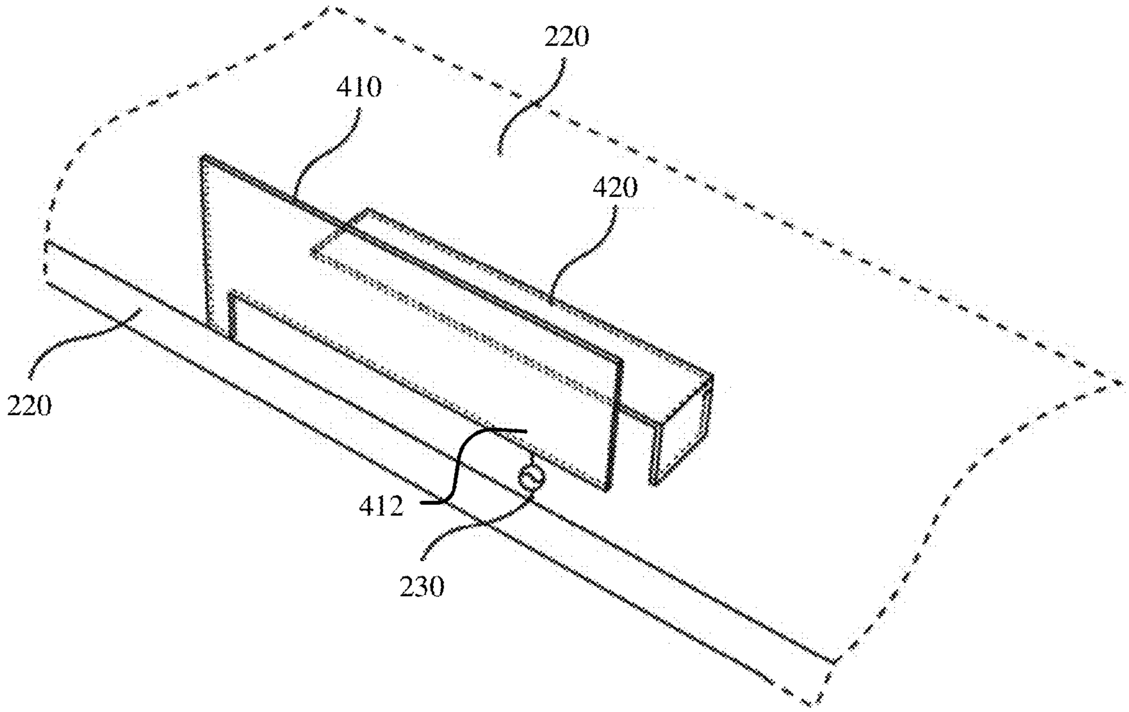
FIG. 31A to FIG. 31C are a schematic diagram of a structure of another electronic device according to an embodiment of this application.
Figure 31B:
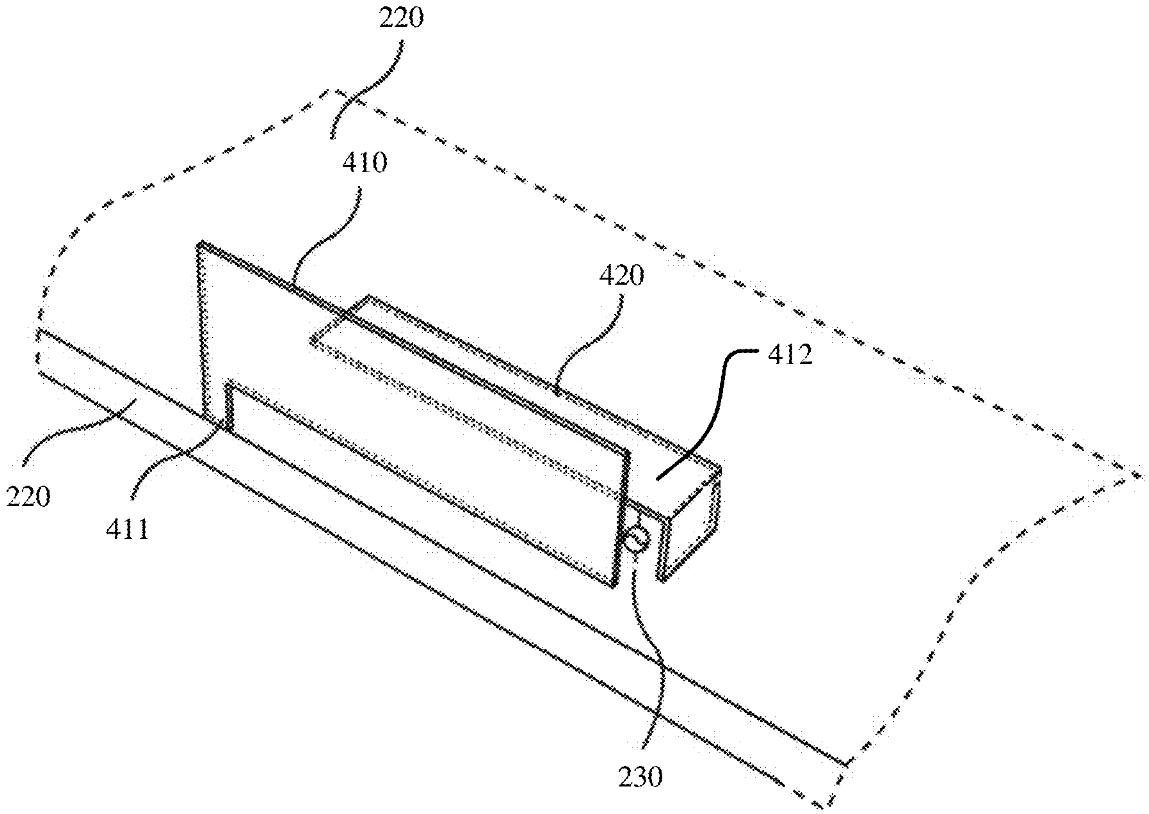
Figure 31C:
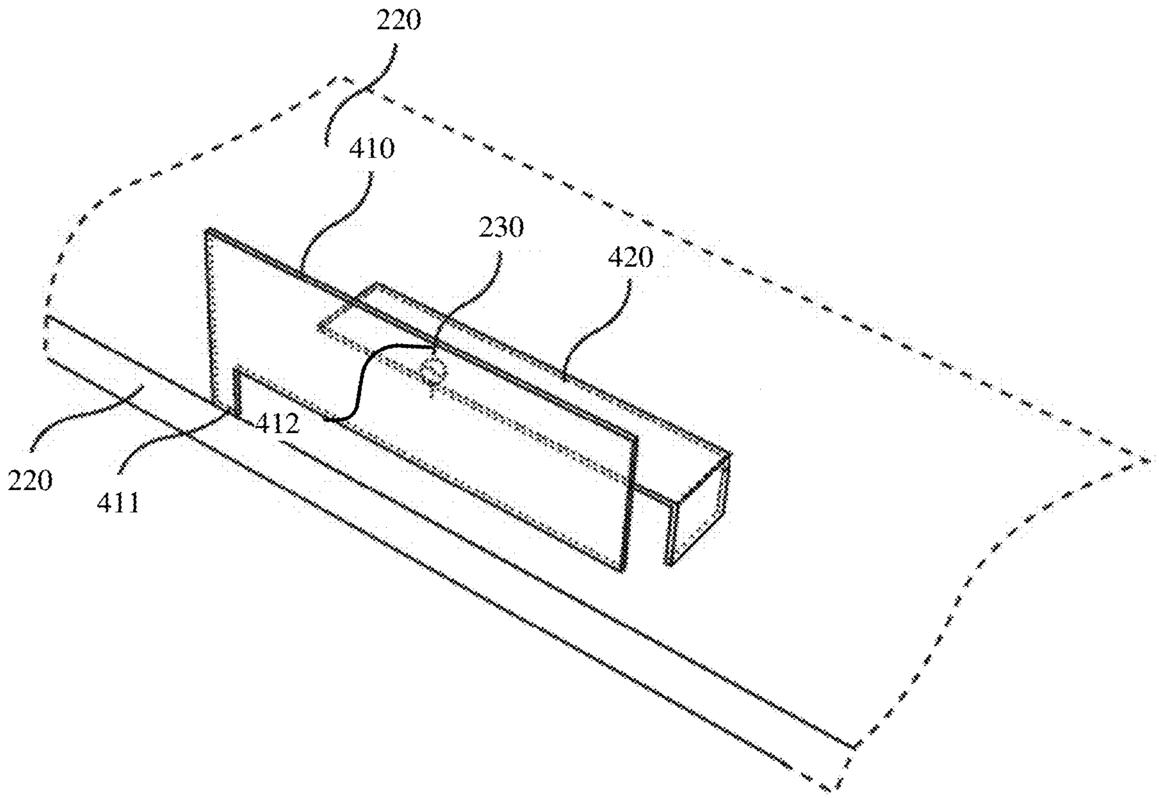

It should be understood that, for the antenna structure shown in FIG. 28A to FIG. 28C, the feed point may be alternatively disposed at another location, and may also stimulate the HWM and the OWM of the antenna structure. Refer to FIG. 31A to FIG. 31C.

FIG. 31A to FIG. 31C are a schematic diagram of a structure of another electronic device according to an embodiment of this application.

Optionally, the feed point 412 may be disposed at a second end of the first antenna unit 410. To implement better impedance matching, a capacitor may be connected in series between the feed unit 230 and the first antenna unit 410, or the feed unit 230 feeds the antenna structure at the feed point 412 in a capacitive indirect coupling feeding manner, as shown in FIG. 31A.

It should be understood that the feed point 412 may alternatively be disposed on the second antenna unit 420, the second antenna unit 420 is used as an excitation unit, and the first antenna unit 410 is used as a parasitic unit.

Optionally, the feed point 412 may alternatively be disposed on a side that is of the second antenna unit 420 and that is close to the second ground point, and the feed unit 230 may be electrically connected to the second antenna unit 420 at the feed point 412 to feed the antenna structure. A distance between the feed point 412 and the second ground point is less than a quarter of a first wavelength, and the first wavelength is a wavelength at which the antenna structure operates when the feed unit performs feeding, as shown in FIG. 31B.

Optionally, the feed point 412 may alternatively be disposed at a second end of the second antenna unit 420. To implement better impedance matching, a capacitor may be connected in series between the feed unit 230 and the second antenna unit 420, or the feed unit 230 feeds the antenna structure at the feed point 412 in a capacitive indirect coupling feeding manner, as shown in FIG. 31C.

Figure 32A:
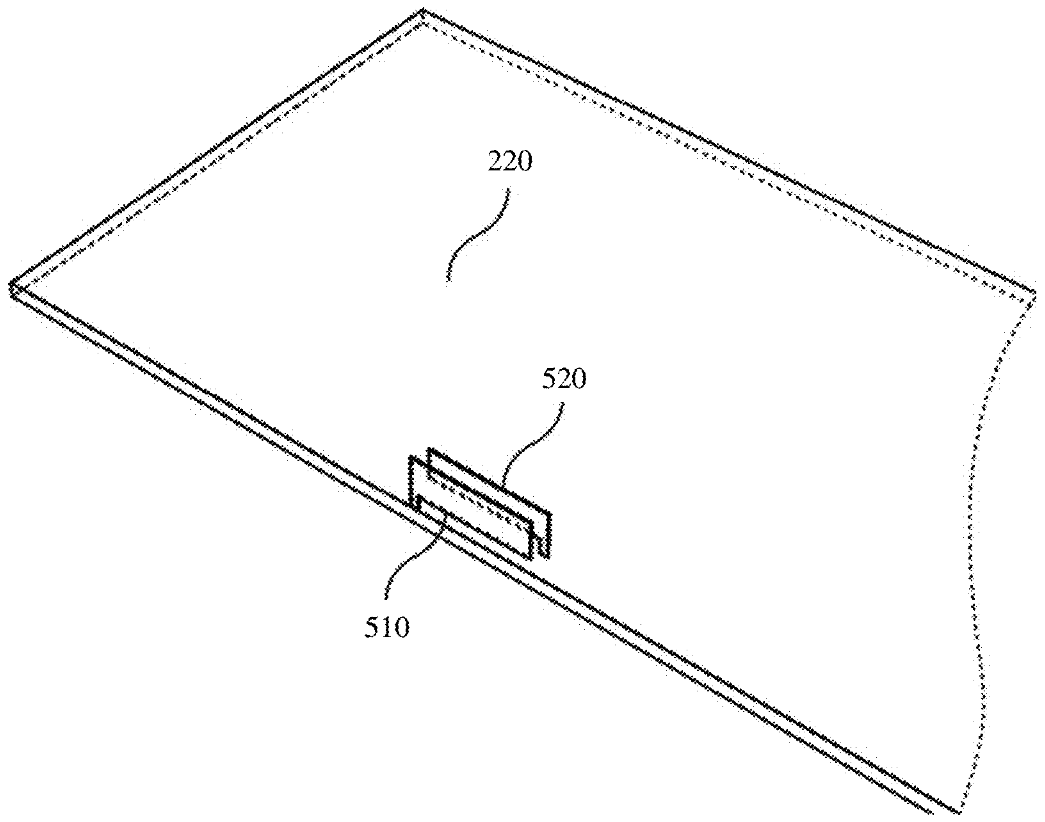
FIG. 32A and FIG. 32B are a schematic diagram of a structure of another electronic device according to an embodiment of this application.
Figure 32B:
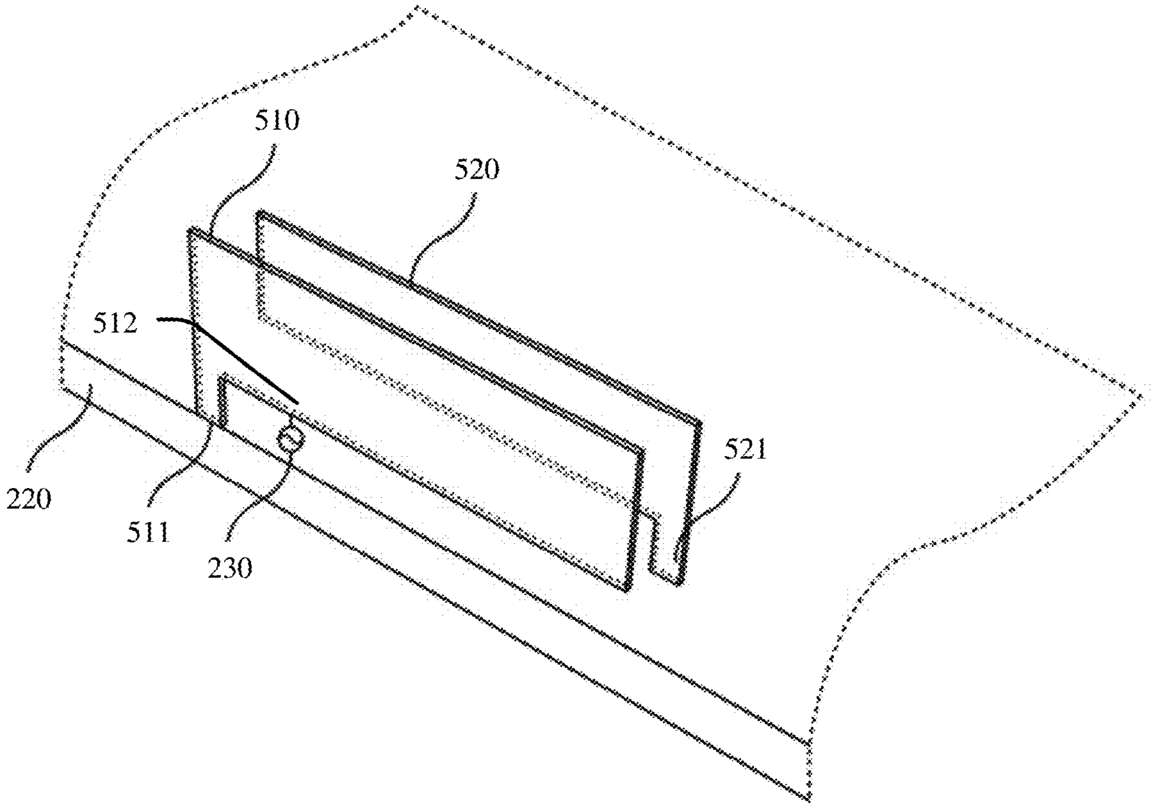

FIG. 32A and FIG. 32B are a schematic diagram of a structure of another electronic device according to an embodiment of this application.

As shown in FIG. 32A and FIG. 32B, a first antenna unit 510 and a second antenna unit 520 may be vertically disposed on the ground 220, and a radiator of the first antenna unit 510 and a radiator of the second antenna unit 520 may be parallel with each other.

It should be understood that, because the radiator of the first antenna unit 510 and the radiator of the second antenna unit 520 are disposed in parallel, compared with the antenna structure shown in FIG. 28A to FIG. 28C, space occupied in the electronic device may be further reduced.

Figure 33A:
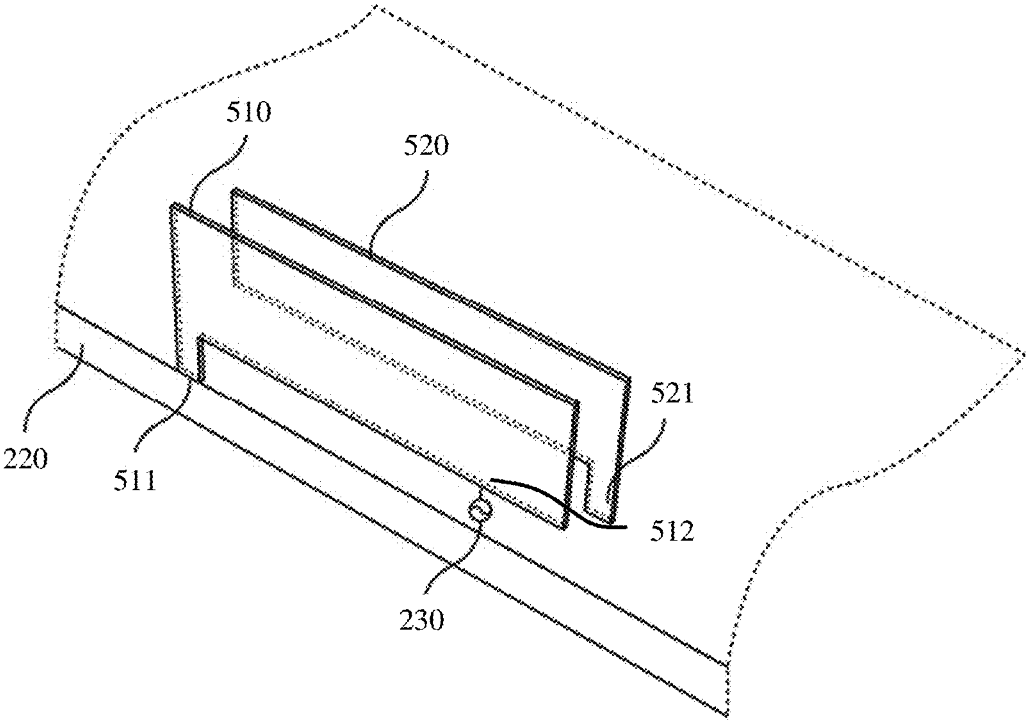
FIG. 33A to FIG. 33C are a schematic diagram of a structure of another electronic device according to an embodiment of this application.
Figure 33B:
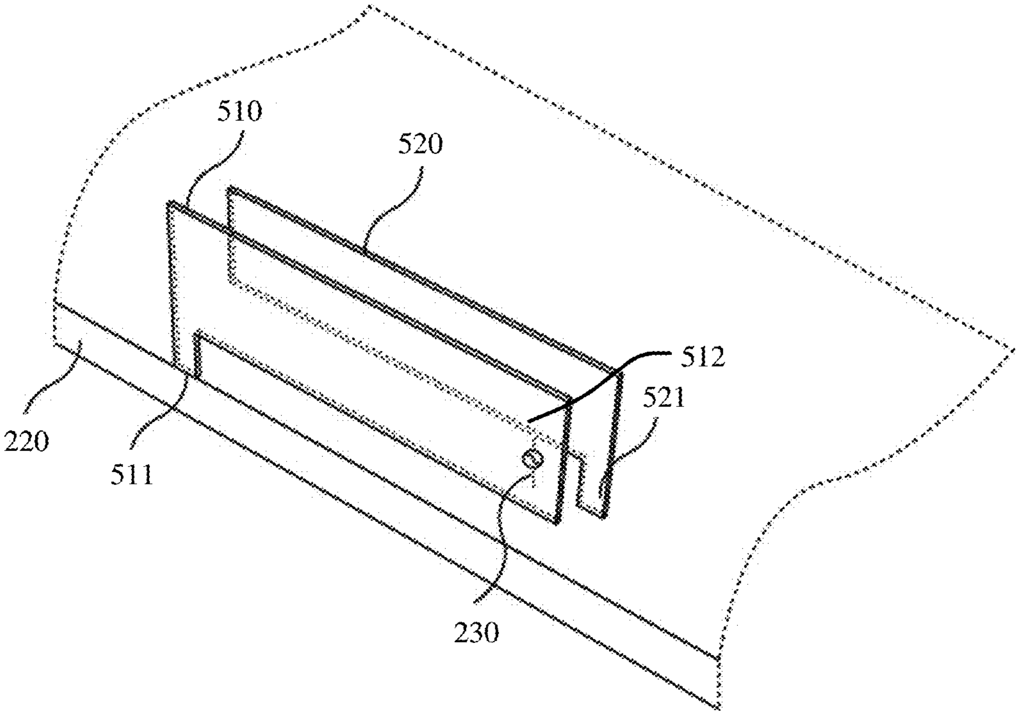
Figure 33C:
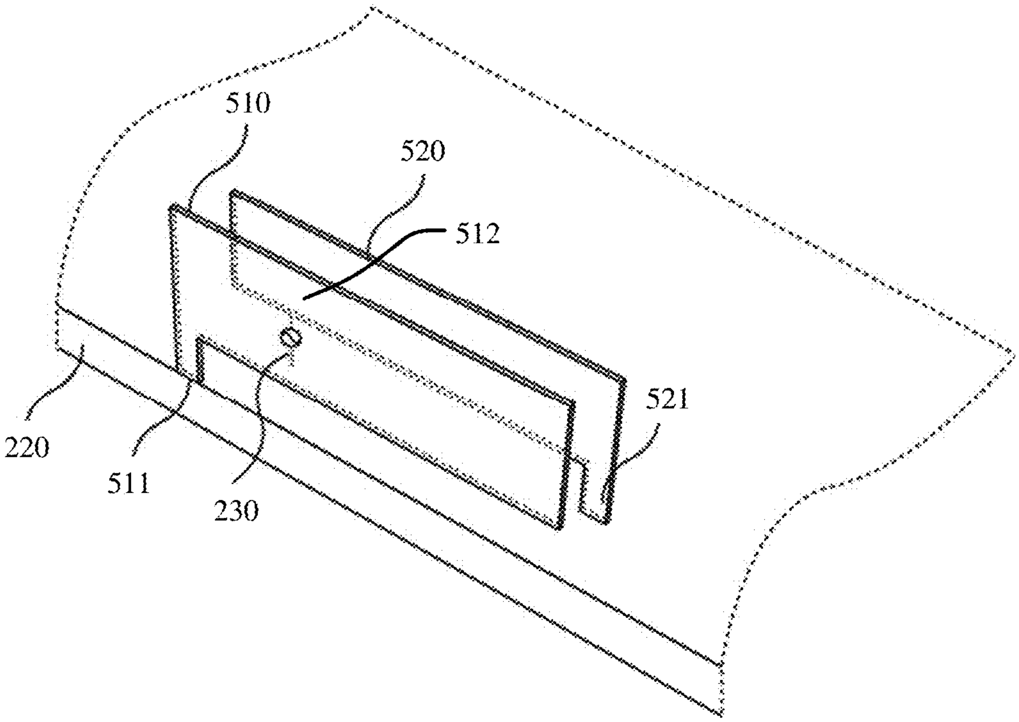

It should be understood that, for the antenna structure shown in FIG. 32A and FIG. 32B, the feed point may be alternatively disposed at another location, and may also stimulate the HWM and the OWM of the antenna structure. Refer to FIG. 33A to FIG. 33C.

FIG. 33A to FIG. 33C are a schematic diagram of a structure of another electronic device according to an embodiment of this application.

Optionally, a feed point 512 may be disposed at a second end of the first antenna unit 510. To implement better impedance matching, a capacitor may be connected in series between the feed unit 230 and the first antenna unit 510, or the feed unit 230 feeds the antenna structure at the feed point 512 in a capacitive indirect coupling feeding manner, as shown in FIG. 33A.

It should be understood that the feed point 512 may alternatively be disposed on a second antenna unit 520, the second antenna unit 520 is used as an excitation unit, and the first antenna unit 510 is used as a parasitic unit.

Optionally, the feed point 512 may alternatively be disposed on a side that is of the second antenna unit 520 and that is close to a second ground point, and the feed unit 230 may be electrically connected to the second antenna unit 520 at the feed point 512 to feed the antenna structure. A distance between the feed point 512 and a second ground point 521 is less than a quarter of a first wavelength, and the first wavelength is a wavelength at which the antenna structure operates when the feed unit performs feeding, as shown in FIG. 33B.

Optionally, the feed point 512 may alternatively be disposed at a second end of the second antenna unit 520. To implement better impedance matching, a capacitor may be connected in series between the feed unit 230 and the second antenna unit 520, or the feed unit 230 feeds the antenna structure at the feed point 512 in a capacitive indirect coupling feeding manner, as shown in FIG. 33C.

Figure 34A:
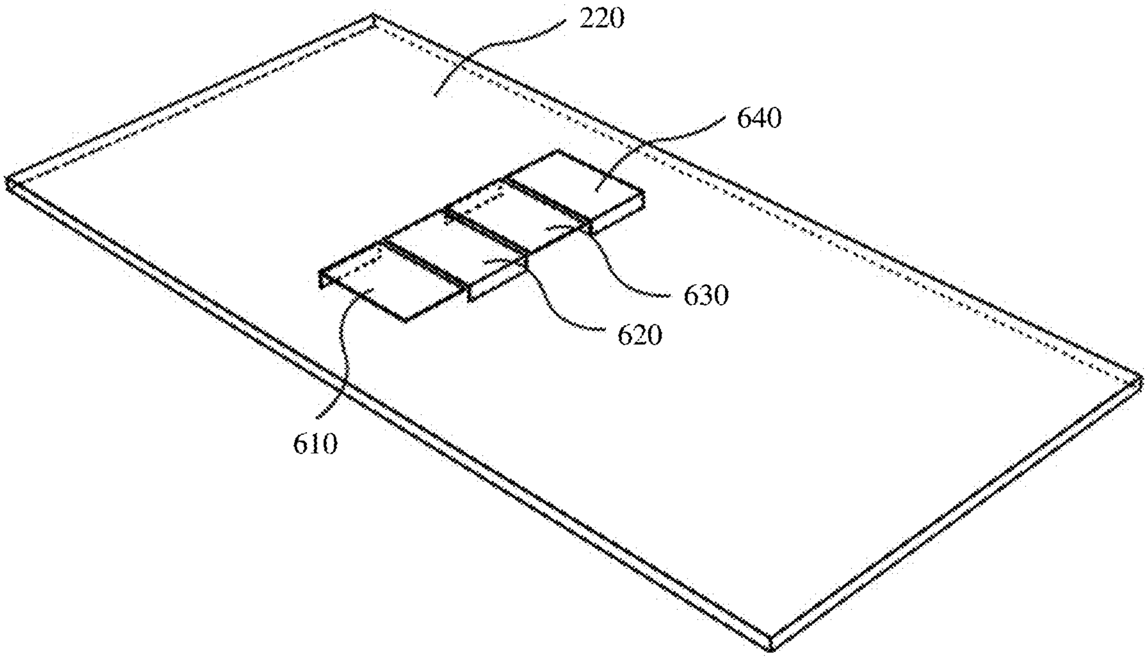
FIG. 34A to FIG. 34C are a schematic diagram of a structure of another electronic device according to an embodiment of this application.
Figure 34B:
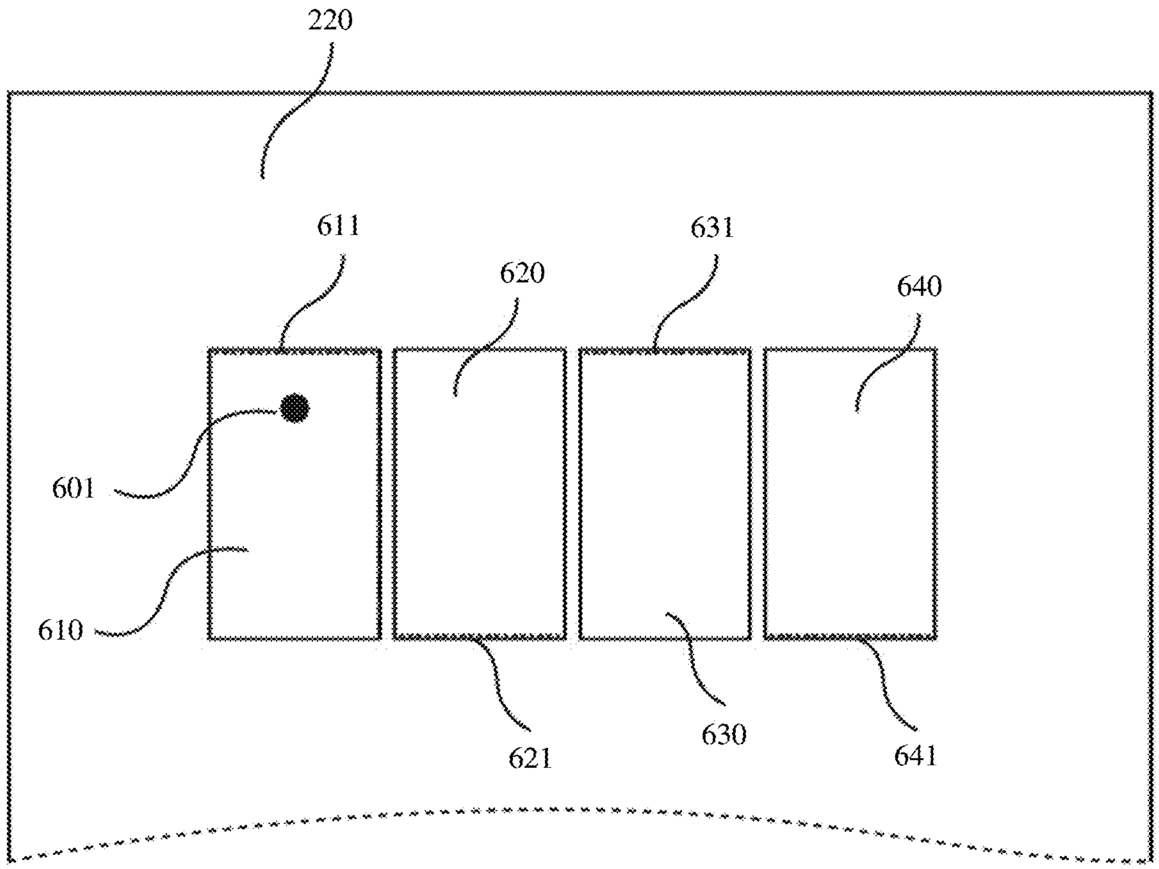
Figure 34C:
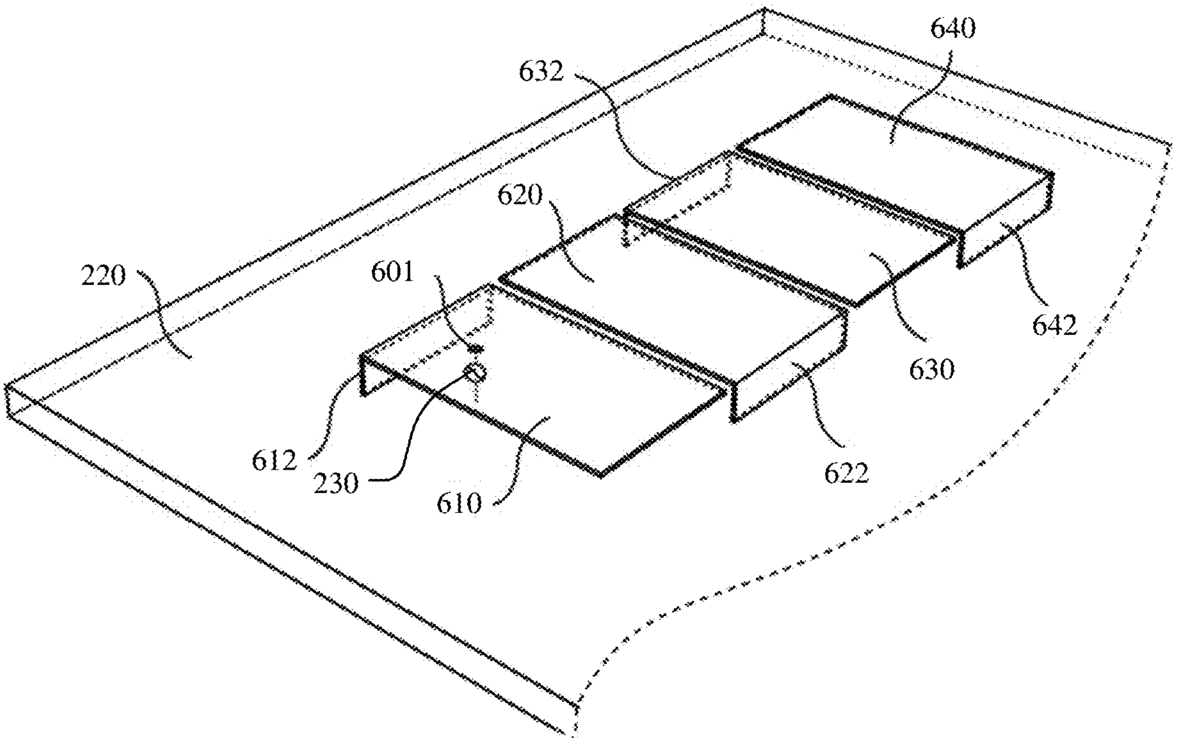

FIG. 34A to FIG. 34C are a schematic diagram of a structure of another electronic device according to an embodiment of this application.

As shown in FIG. 34A to FIG. 34C the antenna structure may include a first antenna unit 610, a second antenna unit 620, a third antenna unit 630, and a fourth antenna unit 640. The first antenna unit 610, the second antenna unit 620, the third antenna unit 630, and the fourth antenna unit 640 are sequentially arranged on the ground 220, and the first antenna unit 610, the second antenna unit 620, the third antenna unit 630, and the fourth antenna unit 640 are in a parallel layout in the foregoing embodiment. A first ground point 611 is disposed at a first end of the first antenna unit 610. A second ground point 621 is disposed at a first end of the second antenna unit 620. A third ground point 631 is disposed at a first end of the third antenna unit 630. A fourth ground point 641 is disposed at a first end of the fourth antenna unit 640. The first antenna unit 610 is electrically connected to the ground 220 at the first ground point 611. The second antenna unit 620 is electrically connected to the ground 220 at the second ground point 621. The third antenna unit 630 is electrically connected to the ground 220 at the third ground point 631. The fourth antenna unit 640 is electrically connected to the ground 220 at the fourth ground point 641. The first ground point 611, the second ground point 621, the third ground point 631, and the fourth antenna unit 640 are arranged in a staggered manner, that is, adjacent ground points are away from each other.

Optionally, the antenna structure may further include a first connecting piece 612, a second connecting piece 622, a third connecting piece 632, and a fourth connecting piece 642. One end of the first connecting piece 612 is electrically connected to the first antenna unit 610 at the first ground point 611, and the other end of the first connecting piece 612 is electrically connected to the ground 220. One end of the second connecting piece 622 is electrically connected to the second antenna unit 620 at the second ground point 621, and the other end of the second connecting piece 622 is electrically connected to the ground 220. One end of the third connecting piece 632 is electrically connected to the third antenna unit 630 at the third ground point 631, and the other end of the third connecting piece 632 is electrically connected to the ground 220. One end of the fourth connecting piece 642 is electrically connected to the fourth antenna unit 640 at the fourth ground point 641, and the other end of the fourth connecting piece 642 is electrically connected to the ground 220.

Optionally, a feed point 601 may be disposed on the first antenna unit 610, and the feed unit 230 may be electrically connected to the first antenna unit 610 at the feed point 601.

Optionally, a distance between the feed point 601 and the first ground point 611 is less than a quarter of a first wavelength, and the first wavelength is a wavelength at which the antenna structure operates when the feed unit 230 performs feeding.

Figure 35:
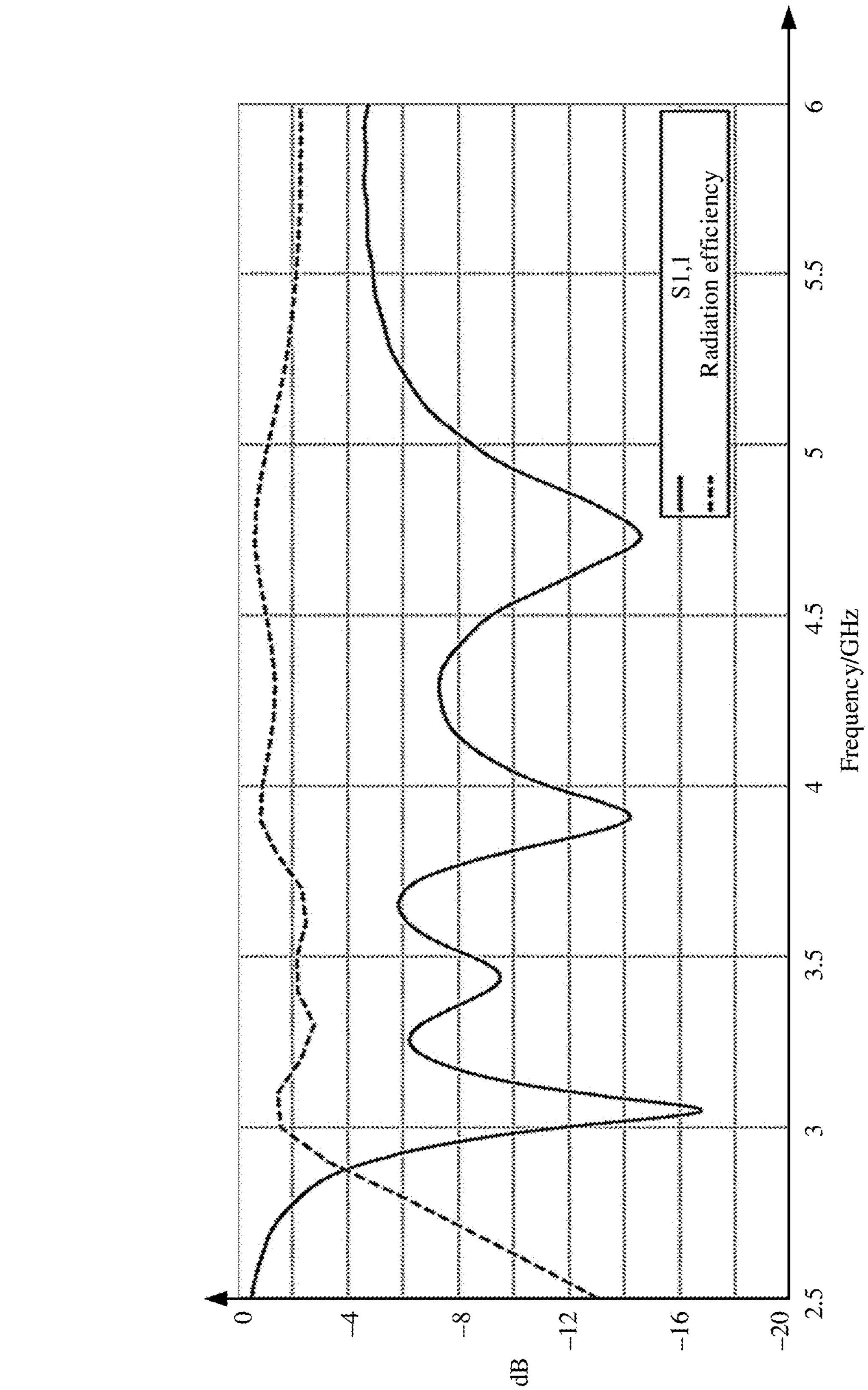
FIG. 35 is a simulation diagram of an S parameter and system efficiency of the antenna structure shown in FIG. 34A to FIG. 34C.

FIG. 35 is a simulation diagram of an S parameter and system efficiency of the antenna structure shown in FIG. 34A to FIG. 34C.

As shown in FIG. 35, the antenna structure may generate four modes at the same time, and a bandwidth of the four modes may cover 3 GHz. In addition, in a corresponding operating frequency band, system efficiency of the operating frequency band may also meet a requirement.

FIG. 36A to FIG. 36D are a schematic diagram of current distribution of the antenna structure shown in FIG. 34A to FIG. 34C at each resonance point.

Figure 36A:
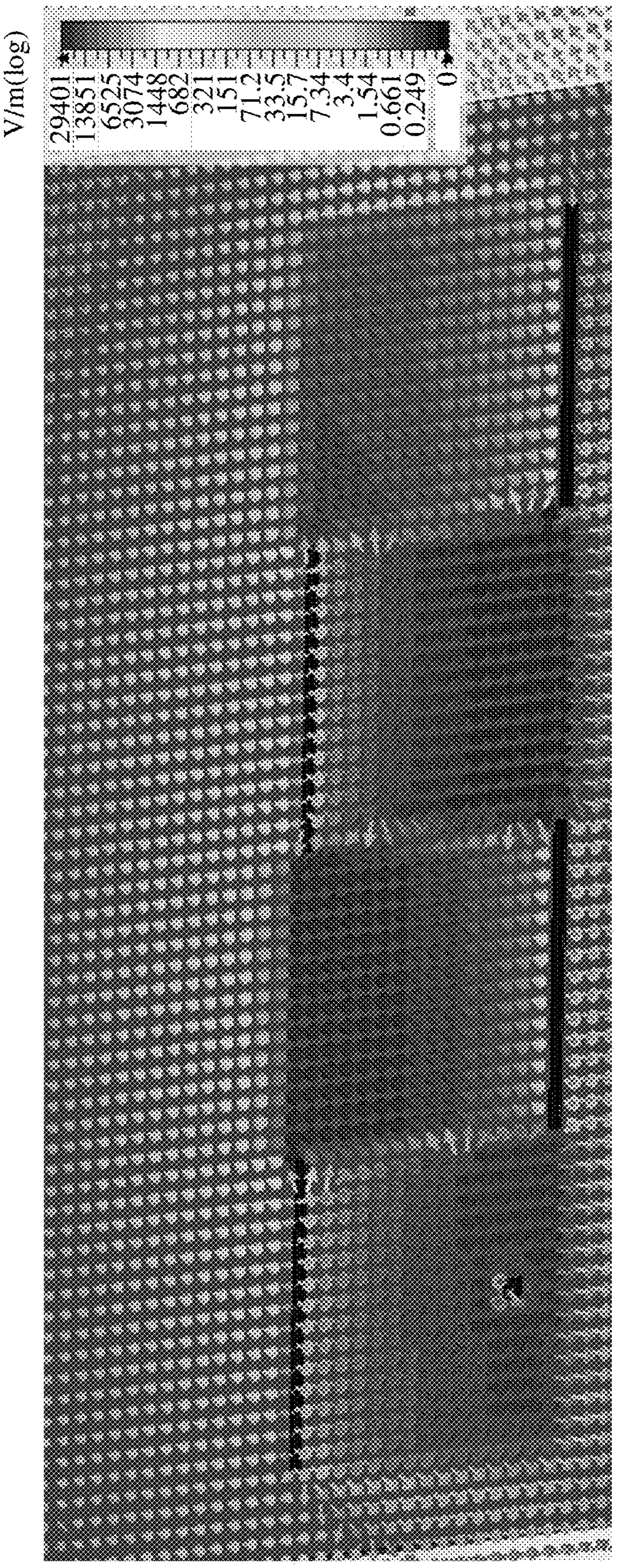
FIG. 36A to FIG. 36D are a schematic diagram of current distribution of the antenna structure shown in FIG. 34A to FIG. 34C at each resonance point.
Figure 36B:
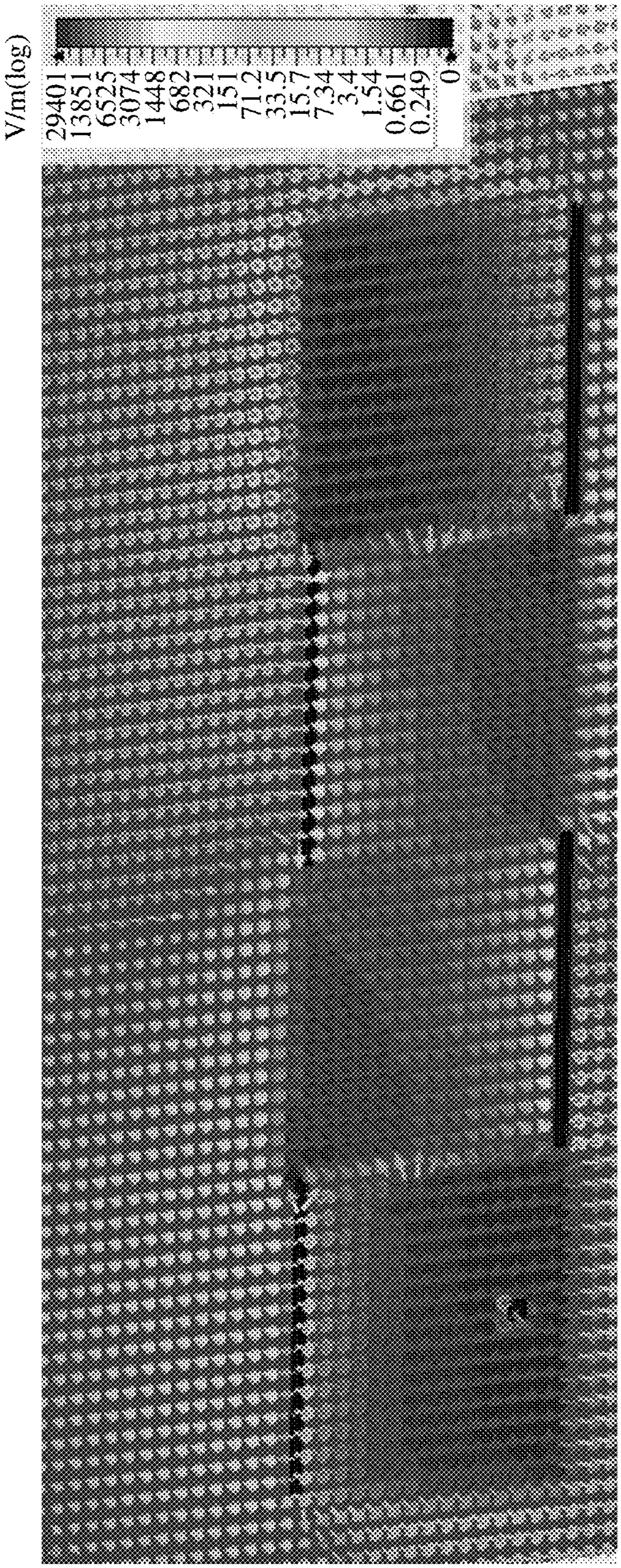
Figure 36C:
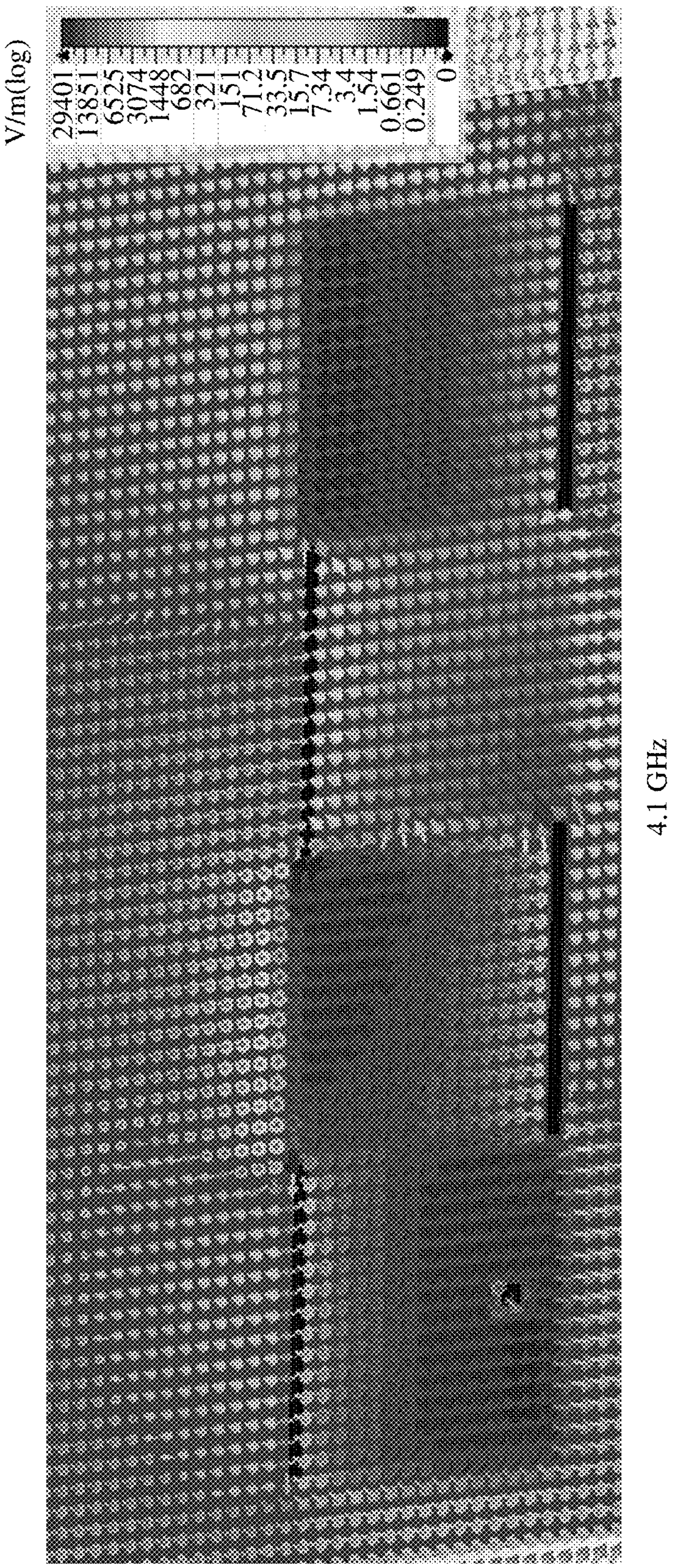
Figure 36D:
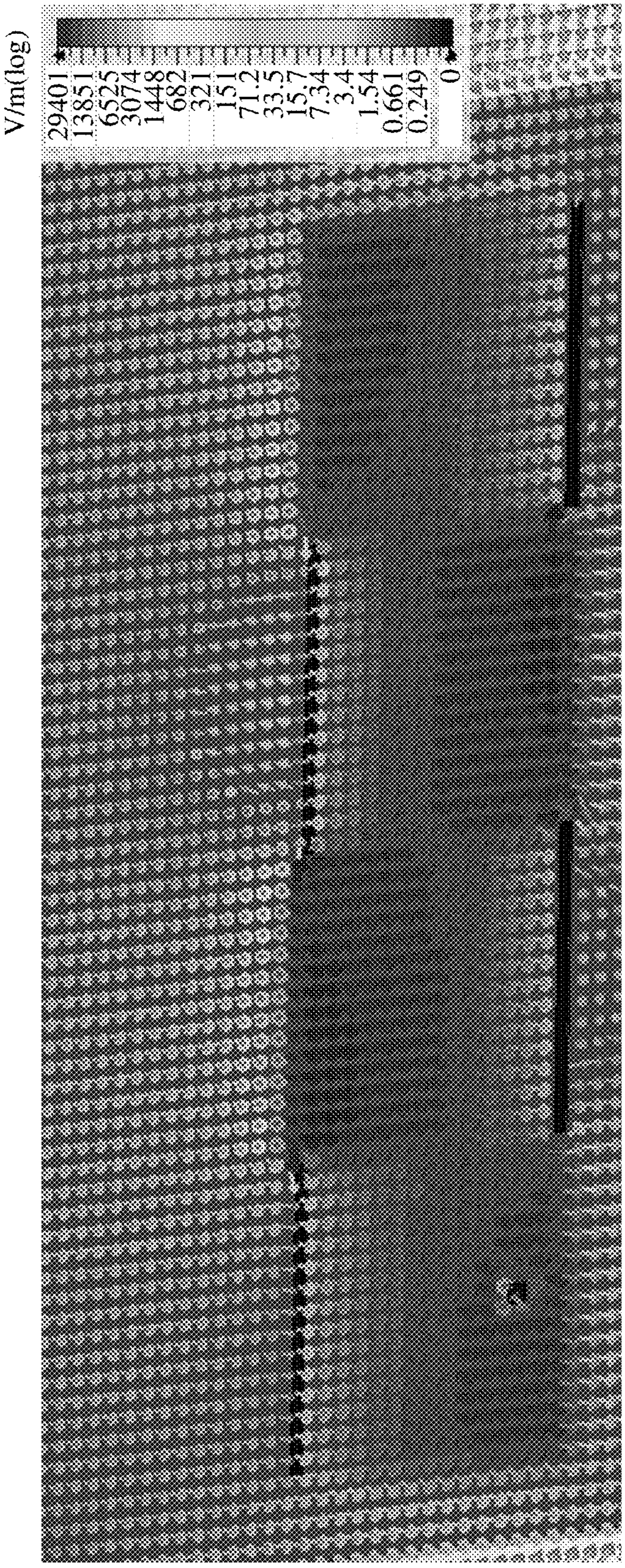

FIG. 36A is a schematic diagram of current distribution of an antenna structure at 3.52 GHz. FIG. 36B is a schematic diagram of current distribution of an antenna structure at 3.78 GHz. FIG. 36C is a schematic diagram of current distribution of an antenna structure at 4.1 GHz. FIG. 36D is a schematic diagram of current distribution of an antenna structure at 4.5 GHz.

As shown in FIG. 36A to FIG. 36D, when the feed unit feeds the antenna structure, currents are evenly distributed on the antenna units. This is different from a conventional excitation unit and a parasitic unit, and a case in which currents are concentrated on the excitation unit does not occur.

It should be understood that in the antenna structure provided in this embodiment of this application, the ground bears a part of a mode current between the antenna units, that is, strong coupling is implemented between the antenna units by using the ground. Therefore, radiation energy is not concentrated on an excitation unit to cause a high SAR.

In addition, the feed point 610 may alternatively be disposed on another antenna unit, the another antenna unit serves as the excitation unit, and the first antenna unit 410 and remaining antenna units serve as parasitic units.

Figure 37A:
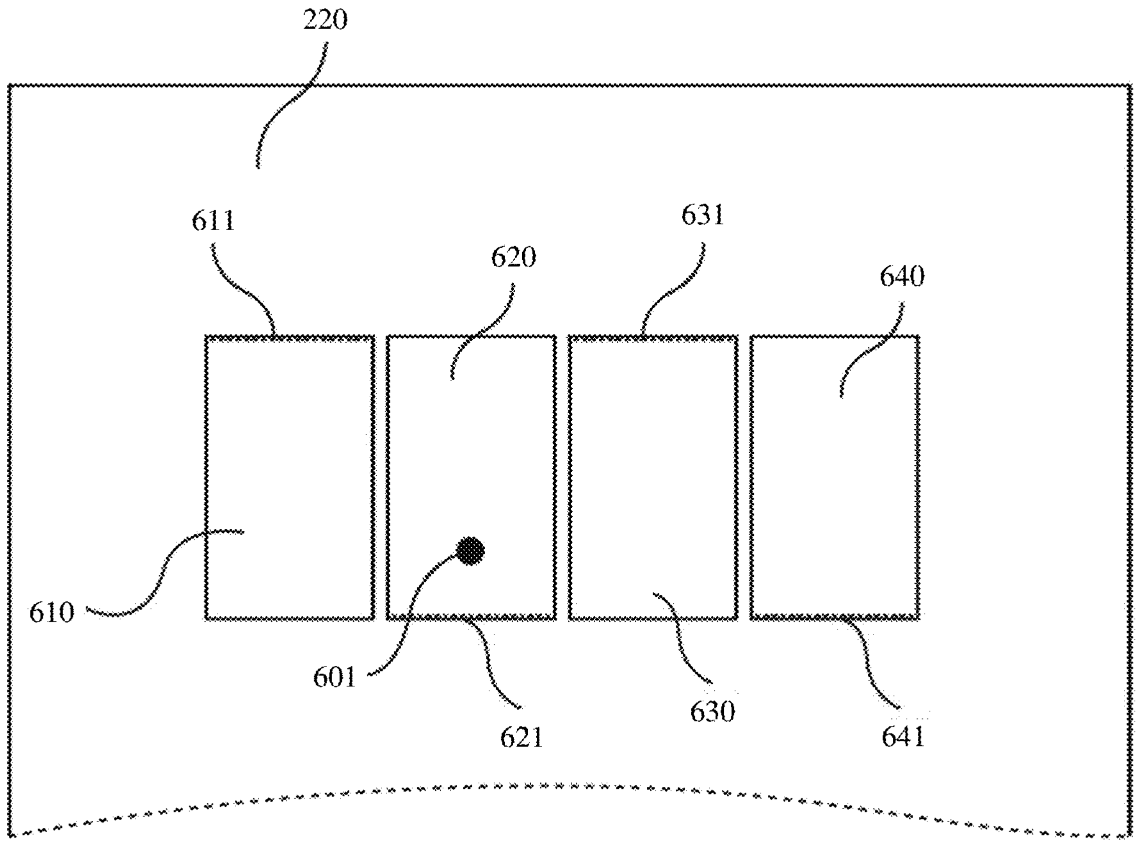
FIG. 37A and FIG. 37B are a schematic diagram of a structure of another electronic device according to an embodiment of this application.
Figure 37B:
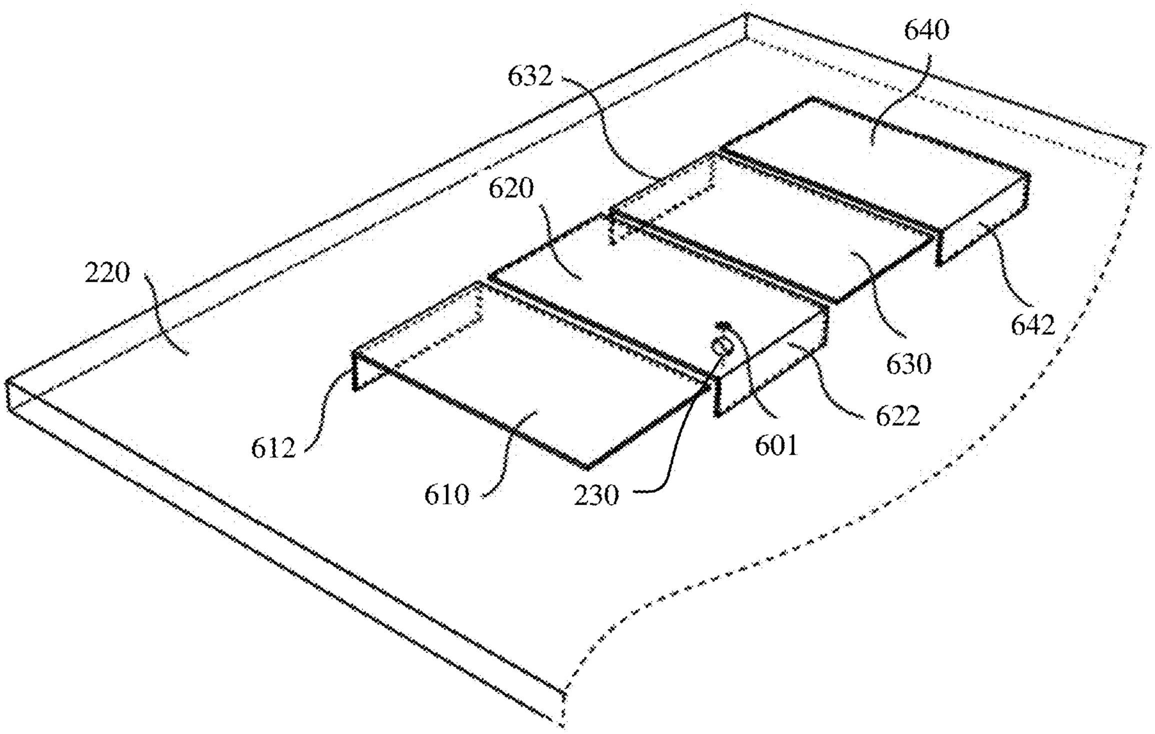

FIG. 37A and FIG. 37B are a schematic diagram of a structure of another electronic device according to an embodiment of this application.

As shown in FIG. 37A and FIG. 37B, the feed point 601 may be disposed on a side that is of the second antenna unit 420 that is close to the second ground point 621, a distance between the feed point 601 and the second ground point 621 is less than a quarter of a first wavelength, and the first wavelength is a wavelength at which the antenna structure operates when the feed unit 230 performs feeding.

It should be understood that this embodiment of this application is described by using only an example in which the feed point 601 may be disposed on a side that is of the second antenna unit 420 and that is close to the second ground point 621, and the feed point 610 may also be disposed on the third antenna unit 630 or the fourth antenna unit 640. This is not limited in this application, and may be selected according to an actual production or design requirement.

Figure 38:
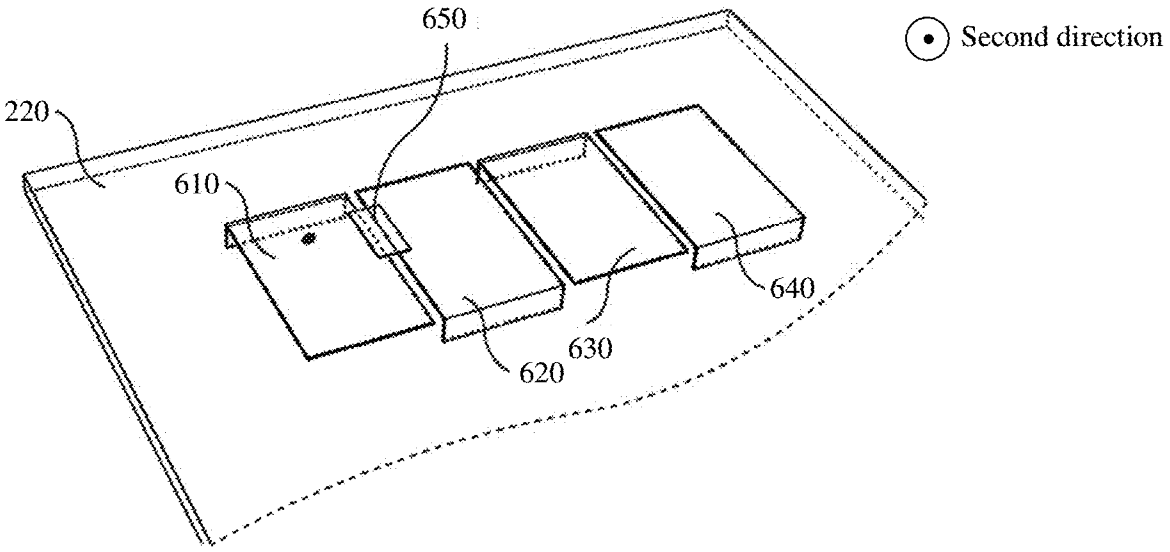
FIG. 38 is a schematic diagram of a structure of another electronic device according to an embodiment of this application.

FIG. 38 is a schematic diagram of a structure of another electronic device according to an embodiment of this application.

As shown in FIG. 38, the antenna structure further includes a floating metal piece 650.

The floating metal piece 650 may be disposed on a side that is of the first antenna unit 610 and the second antenna unit 620 and that is away from the ground 220, that is, disposed on top of the first antenna unit 610 and the second antenna unit 620. The floating metal piece 650 may be located between the first antenna unit 610 and the second antenna unit 620. The floating metal piece 650 partially overlaps the first antenna unit 610 and the second antenna unit 620 in a second direction. That is, from a top view, the floating metal piece 650 covers a gap formed between the first antenna unit 610 and the second antenna unit 620, and the second direction is a direction perpendicular to the ground 220.

It should be understood that, after the floating metal piece 650 is added between the first antenna unit 610 and the second antenna unit 620, a coupling area between the two antenna units increases, and a coupling amount between the first antenna unit 610 and the second antenna unit 620 may be increased. This may be used to control a frequency of a resonance point of resonance generated by the first antenna unit 610 and the second antenna unit 620, that is, the frequency of the resonance point of the resonance generated by the first antenna unit 610 and the second antenna unit 620 is shifted towards a low frequency.

Optionally, when the first antenna unit 610 and the second antenna unit 620 are disposed on a surface of an antenna support, the floating metal piece 650 may be disposed on a rear cover of the electronic device, or the floating metal piece 650 may be disposed on a surface opposite to the surface in which the antenna support and the antenna unit is located.

Figure 39A:
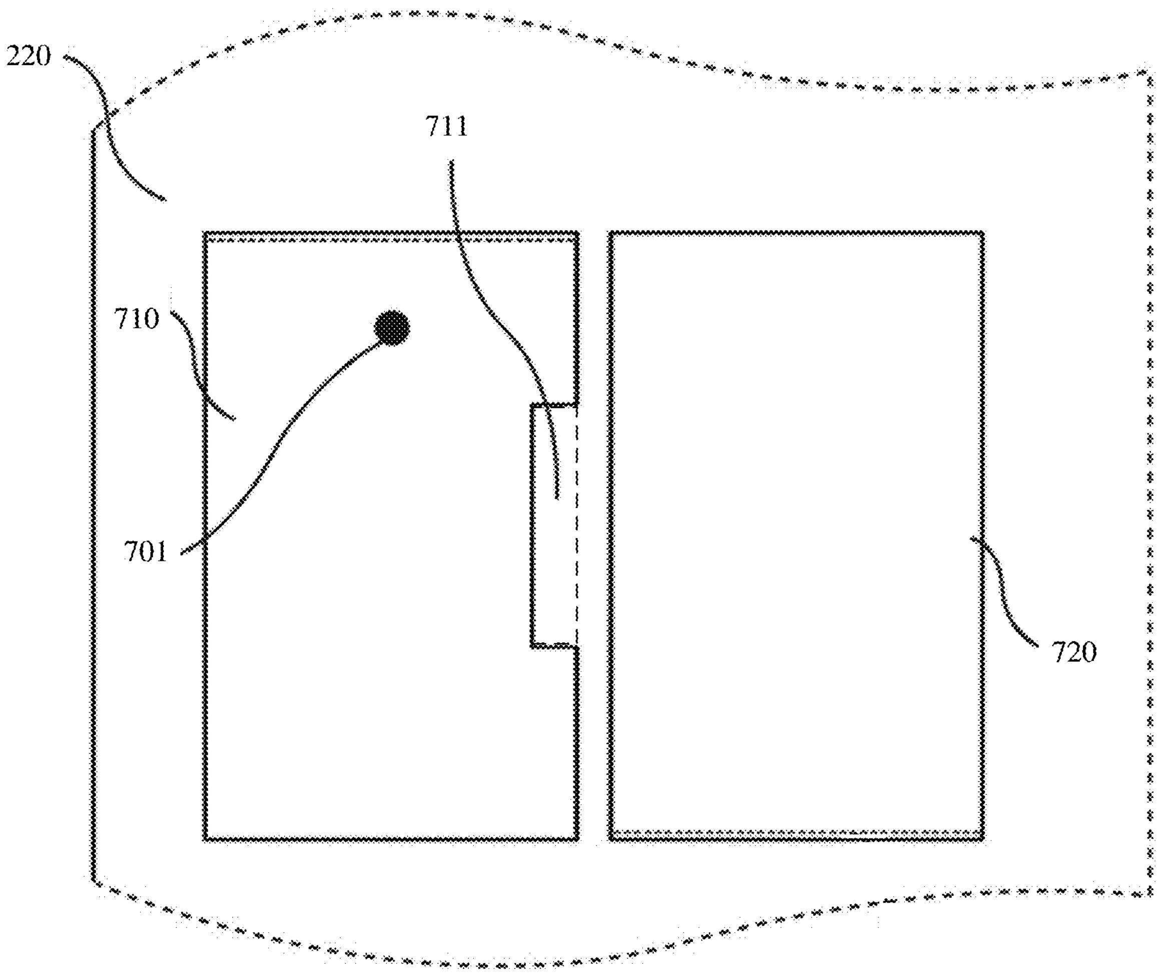
FIG. 39A and FIG. 39B are a schematic diagram of a structure of another electronic device according to an embodiment of this application.
Figure 39B:
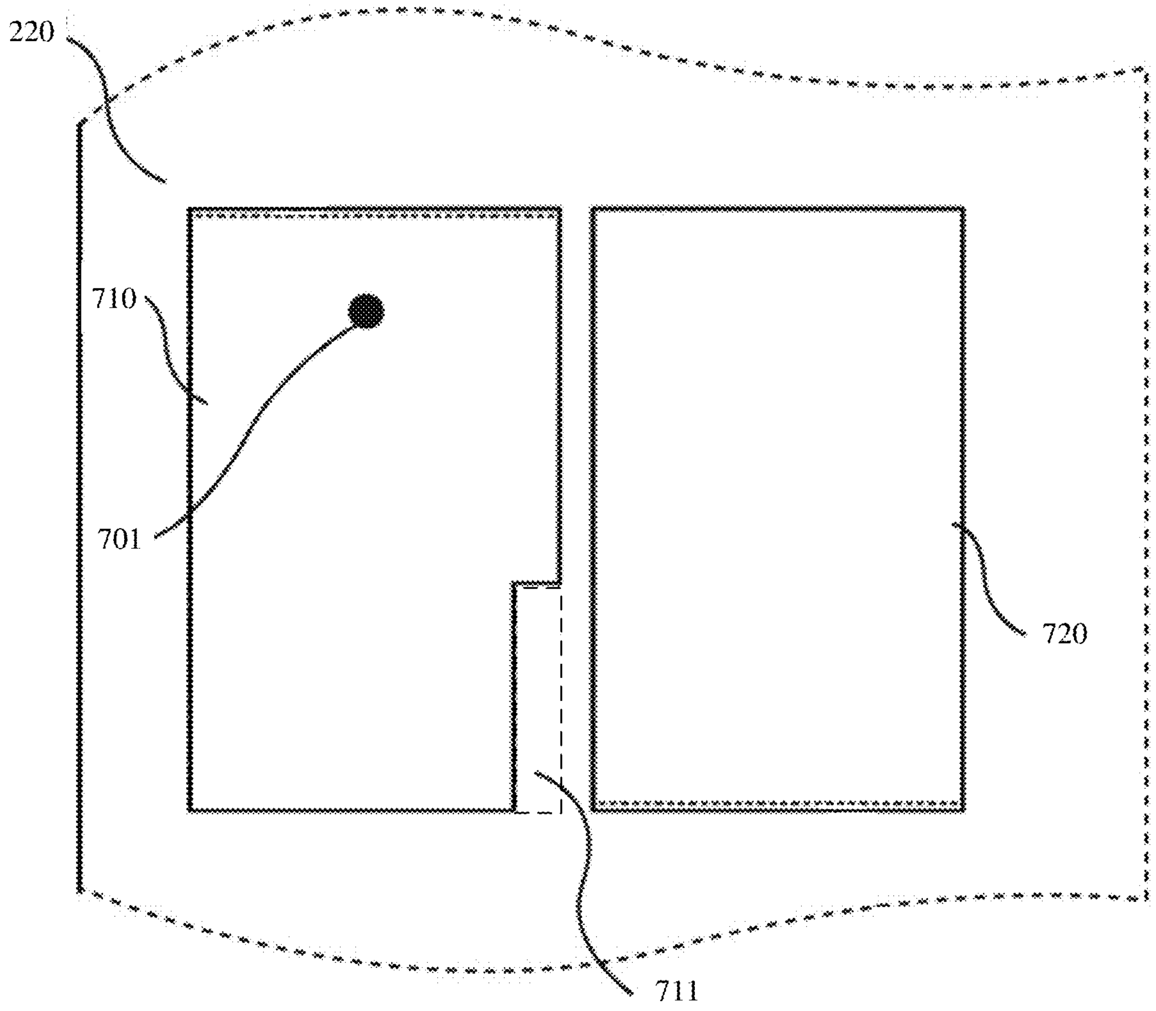

FIG. 39A and FIG. 39B are a schematic diagram of a structure of another electronic device according to an embodiment of this application.

As shown in FIG. 39A and FIG. 39B, an opening 711 is disposed on a side that is of a first antenna unit 710 and that is close to a second antenna unit 720.

Optionally, the opening 711 may be disposed in the middle of an edge that is of the first antenna unit 710 and that is close to the second antenna unit 720, as shown in FIG. 39A; or the opening 711 may also be disposed at a position that is of the first antenna unit 710 and that is close to a second end, as shown in FIG. 39B.

Optionally, an opening may also be disposed on a side that is of the second antenna unit 720 that is close to the first antenna unit 710.

It should be understood that, after the opening is disposed on the first antenna unit 710 or the second antenna unit 720, a coupling area between the two antenna units is reduced, and a coupling amount between the first antenna unit 710 and the second antenna unit 720 may be reduced. This may be used to control a frequency of a resonance point of resonance generated by the first antenna unit 710 and the second antenna unit 720, that is, the frequency of the resonance point of the resonance generated by the first antenna unit 710 and the second antenna unit 720 is shifted towards a high frequency.

It should be understood that common methods for adjusting the frequency of the resonance point of the resonance generated by the antenna structure shown in FIG. 38 and FIG. 39A and FIG. 39B are merely used as examples. In actual application, another adjustment method may be selected based on space in the electronic device or another reason. This is not limited in this application.

Figure 40A:
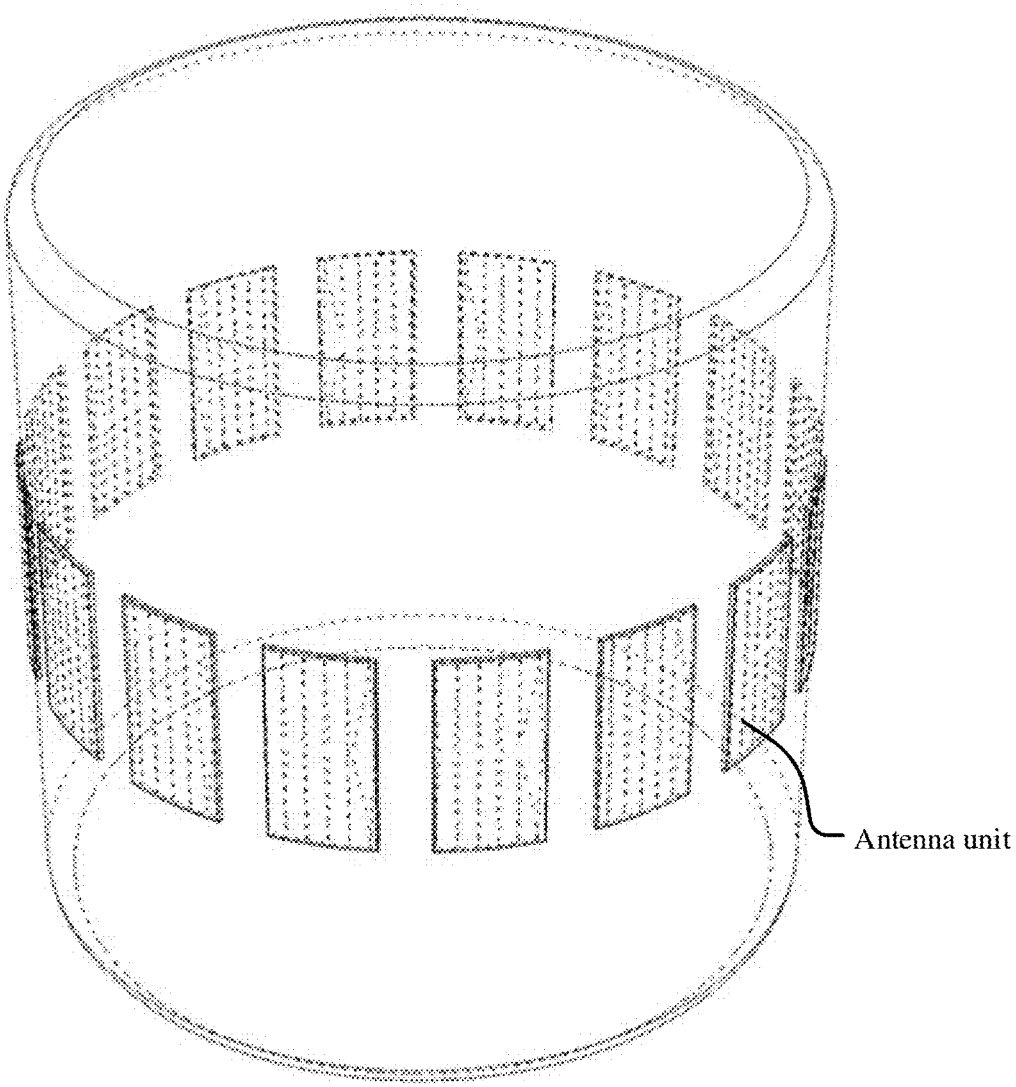
FIG. 40A and FIG. 40B are a schematic diagram of a structure of another electronic device according to an embodiment of this application.
Figure 40B:
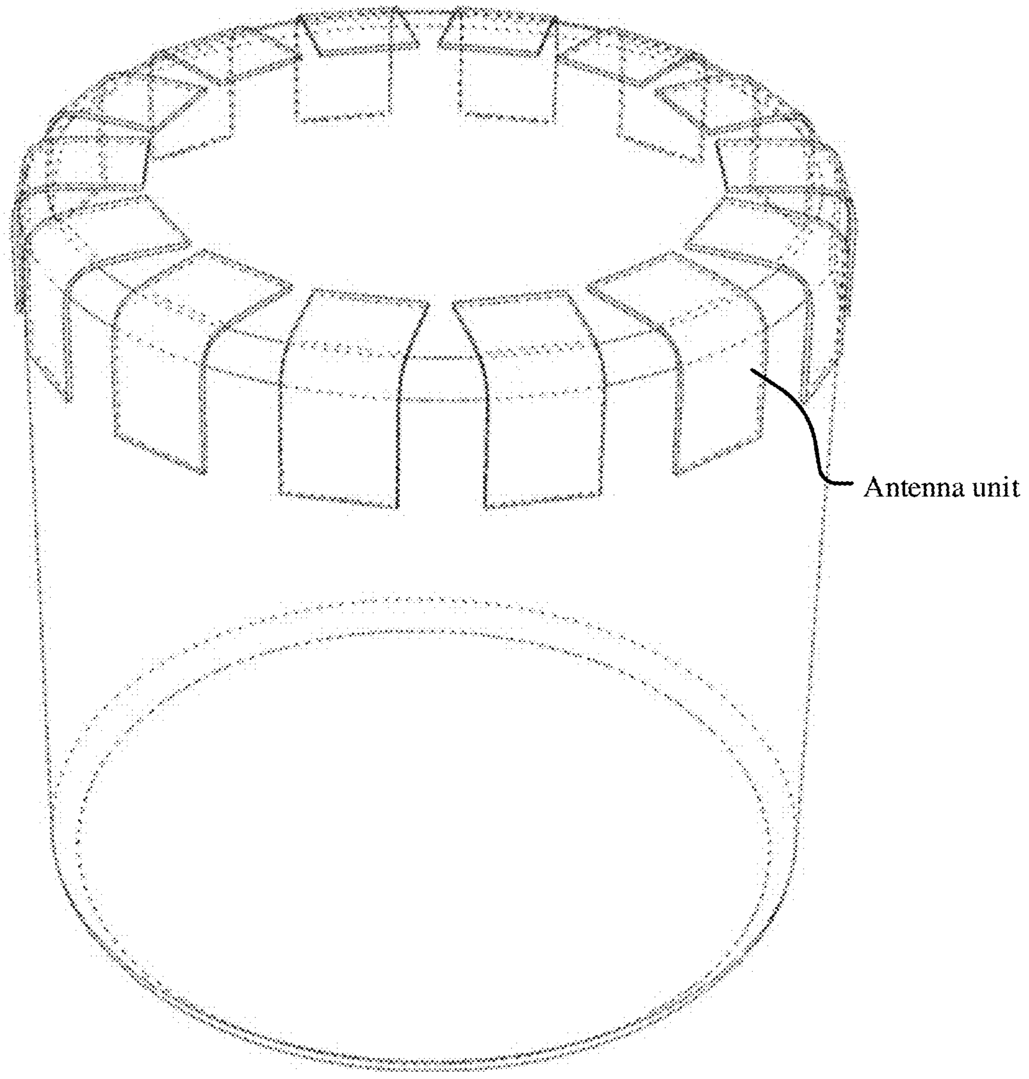

FIG. 40A and FIG. 40B are a schematic diagram of a structure of another electronic device according to an embodiment of this application.

It should be understood that the foregoing embodiment uses a one-dimensional or two-dimensional arrangement structure, and the antenna structure provided in this embodiment of this application may also use a three-dimensional structure.

As shown in FIG. 40A and FIG. 40B, an antenna structure may be applied to the Internet of Things (the internet of things, IoT). This embodiment is described by using only a speaker as an example.

As shown in FIG. 40A and FIG. 40B, antenna units may be distributed on a surface of a cylindrical structure of the speaker, and may be located in a middle part of the cylindrical structure, or may be located at a top or a bottom. The antenna units are in a parallel layout, or in a parallel-series-orthogonal hybrid layout, to implement a three-dimensional distributed antenna. This is not limited in this embodiment of this application.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:

a ground;

a first antenna comprising a first end; and a second antenna comprising a first end and a second end, wherein the second antenna and the first antenna do not contact each other;

wherein a first ground point is disposed at the first end of the first antenna, and the first antenna is electrically connected to the ground at the first ground point;

a second ground point is disposed at the first end of the second antenna, and the second antenna is electrically connected to the ground at the second ground point;

a distance between the second ground point and the first ground point is greater than a distance between the second end of the second antenna and the first ground point;

a feed point is disposed on the first antenna or the second antenna, and the feed point is configured to feed an electrical signal, wherein a distance between the feed point and the first ground point or the second ground point is less than a quarter of a first wavelength, and the first wavelength is an operating wavelength of the electronic device; and wherein an electrical length of the first antenna is the same as an electrical length of the second antenna.

2. The electronic device according to claim 1, wherein projections that are of a part of the first antenna and a part of the second antenna and that are on a plane on which the ground is located are parallel with each other in a first direction, and a spacing of the projections in a second direction is less than a quarter of the first wavelength, wherein the first direction is an extension direction of the part of the first antenna and the part of the second antenna, the second direction is perpendicular to the first direction.

3. The electronic device according to claim 2, wherein the projections that are of the part of the first antenna and the part of the second antenna and that are on the plane on which the ground is located are disposed along a same straight line.

4. The electronic device according to claim 3, wherein both the first antenna and the second antenna are disposed on a first side of the ground, and at least one of the first antenna and the second antenna is completely projected on the ground in a third direction, wherein the third direction is perpendicular to the plane on which the ground is located.

5. The electronic device according to claim 4, wherein the first antenna is a metal frame antenna of the electronic device, and the part of the first antenna is a long straight section of the metal frame antenna.

6. The electronic device according to claim 1, wherein projections that are of a part of the first antenna and a part of the second antenna and that are on a plane on which the ground is located are parallel with each other in a first direction, and an overlapping length of the projections in a second direction is greater than a quarter of the first wavelength, wherein the first direction is an extension direction of the part of the first antenna and the part of the second antenna, the second direction is perpendicular to the first direction.

7. The electronic device according to claim 6, wherein the projections that are of the part of the first antenna and the part of the second antenna and that are on the plane on which the ground is located completely overlap in the second direction.

8. The electronic device according to claim 1, wherein projections that are of a part of the first antenna and a part of the second antenna and that are on a plane on which the ground is located are perpendicular to each other, and an extension line of the part of the second antenna intersects with the part of the first antenna on the first antenna.

9. The electronic device according to claim 8, wherein the extension line of the part of the second antenna intersects with the part of the first antenna at a midpoint of the part of the first antenna.

10. The electronic device according to claim 1, wherein the first antenna and the second antenna each are one or more of a laser-direct-structuring (LDS) antenna, a flexible printed circuit (FPC) antenna, a floating metal (FLM) antenna, and a printed circuit board (PCB) antenna.

11. The electronic device according to claim 1, wherein:

the first antenna further comprises a second end; and the feed point is disposed at the second end of the first antenna or the second end of the second antenna.

12. The electronic device according to claim 1, wherein:

when the feed point feeds the electrical signal, the first antenna and the second antenna generate resonance; and the resonance is determined by the electrical length of the first antenna, the electrical length of the second antenna, and an electrical length between electrical connection points between the ground and the first antenna and the second antenna.

13. The electronic device according to claim 1, wherein a dipole antenna is formed between the first antenna, the second antenna, and a part of the ground.

14. The electronic device according to claim 1, further comprising:

a floating metal piece disposed between the first antenna and the second antenna, wherein the floating metal piece partially overlaps the first antenna and the second antenna in a first direction, and the first direction is perpendicular to a plane on which the ground is located.

15. The electronic device according to claim 1, wherein an opening is on a side of the first antenna that faces the second antenna.

16. The electronic device according to claim 1, further comprising:

a first connecting piece and a second connecting piece;

wherein a first end of the first connecting piece is electrically connected to the first antenna at the first ground point, and a second end of the first connecting piece is electrically connected to the ground; and a first end of the second connecting piece is electrically connected to the second antenna at the second ground point, and a second end of the second connecting piece is electrically connected to the ground.

17. The electronic device according to claim 1, wherein:

the first antenna is an inverted L antenna (ILA), an inverted F antenna (IFA), or a planar inverted F antenna (PIFA); and the second antenna is an ILA, an IFA, or a PIFA.

18. An electronic device, comprising:

a middle frame configured to act as a ground;

a first antenna comprising a first end; and a second antenna comprising a first end and a second end, wherein the second antenna and the first antenna do not contact each other;

wherein a first ground point is disposed at the first end of the first antenna, and the first antenna is electrically connected to the ground at the first ground point;

a second ground point is disposed at the first end of the second antenna, and the second antenna is electrically connected to the ground at the second ground point;

a distance between the second ground point and the first ground point is greater than a distance between the second end of the second antenna and the first ground point;

a feed point is disposed on the first antenna or the second antenna, and the feed point is configured to feed an electrical signal, wherein a distance between the feed point and the first ground point or the second ground point is less than a quarter of a first wavelength, and the first wavelength is an operating wavelength of the electronic device; and wherein an electrical length of the first antenna is the same as an electrical length of the second antenna.

19. The electronic device according to claim 18, wherein projections that are of a part of the first antenna and a part of the second antenna and that are on a plane on which the ground is located are parallel with each other in a first direction, and a spacing of the projections in a second direction is less than a quarter of the first wavelength, wherein the first direction is an extension direction of the part of the first antenna and the part of the second antenna, the second direction is perpendicular to the first direction.

* * * * *